US006985878B1

(12) United States Patent
Yamazaki et al.

(10) Patent No.: US 6,985,878 B1
(45) Date of Patent: Jan. 10, 2006

(54) INTEGRATED FINANCE RISK MANAGER AND FINANCIAL TRANSACTION MODELING DEVICE

(75) Inventors: Hiroshi Yamazaki, Tokyo (JP); Yoshiaki Nakanishi, Funabashi (JP); Masaya Usuha, Yokohama (JP); Tsukasa Yamashita, Yokohama (JP); Hideyuki Sunami, Tokyo (JP)

(73) Assignee: Future System Consulting Corporation, Tokyo (JP)

( * ) Notice: Subject to any disclaimer, the term of this patent is extended or adjusted under 35 U.S.C. 154(b) by 0 days.

(21) Appl. No.: 09/486,341

(22) PCT Filed: Jun. 30, 1999

(86) PCT No.: PCT/JP99/03507

§ 371 (c)(1),
(2), (4) Date: Feb. 25, 2000

(87) PCT Pub. No.: WO00/00919

PCT Pub. Date: Jan. 6, 2000

(30) Foreign Application Priority Data

Jun. 30, 1998 (JP) ................................ 10-183133

(51) Int. Cl.
*G06F 17/60* (2006.01)
(52) U.S. Cl. .......................................... 705/35; 705/36
(58) Field of Classification Search ............ 705/24–44; 707/1, 10
See application file for complete search history.

(56) References Cited

U.S. PATENT DOCUMENTS 5,497,317 A * 3/1996 Hawkins et al. .............. 705/37
5,630,127 A * 5/1997 Moore et al. ............. 707/103 R
6,119,103 A * 9/2000 Basch et al. .................. 705/35
6,134,536 A * 10/2000 Shepherd ...................... 705/37
6,347,307 B1 * 2/2002 Sandhu et al. ................ 705/35

FOREIGN PATENT DOCUMENTS

EP 0 817 091 A2 * 7/1998
WO WO 94/20912 9/1994

OTHER PUBLICATIONS

Paula Eissfeldt, "Modeling is more than fashionable", Hoosier Banker, Indianapolis: Sep. 1999, vol. 83, Iss. 9; p. 26.*
"Derivative Software Simplifies Swaps"—*Insurance Account*, vol. 4, No. 15 (Apr. 18, 1994) pp. 4.
S. Schwartzman—"*One Standard for One-Off Deals—Sanwa Bank Ltd. Uses Custom Software for Security Trading*"—*Wall Street & Technology*, vol. 11, No. 1 (July 1993) pp. 10.
T. Eggenschwiler—"*ET++SwapsManager: Using Object Technology in the Financial Engineering Domain*"—*ACM Sigplan Notices*, vol. 27, No. 10 (Oct. 1992) pp 166-177.

(Continued)

*Primary Examiner*—Frantzy Poinvil
(74) *Attorney, Agent, or Firm*—Westerman, Hattori, Daniels & Adrian, LLP

(57) ABSTRACT

A class corresponding to a plurality of transaction entities are collectively processed to realize a virtual transaction. A cash flow type transaction entity is managed as a set of cash flow elements (CashFlowLet) for each unit transaction period on each of the receipt side and the payment side, and a current price evaluating operation for each element is commonly operated. An option transaction is realized by a class storing a class of an original asset transaction as a container. A financial curve definition function and a function of realizing a virtual curve by combining a plurality of financial curves are implemented. A user interface capable of easily changing a parameter for use in risk management and displaying a simulation result thereof can be provided.

18 Claims, 57 Drawing Sheets

OTHER PUBLICATIONS

Translated by S. Hon'ida—"Stratergy"—*Tokyo: Softbank Corp.* (Oct. 16, 1995).

Zhang et al.—*"Financial Software Design Pattern"—Journal of Object-Oriented Programming*, vol. 8, No. 9 (Feb. 96), pp. 6-12.

M. Benaroch—*"Toward the Notion of a Knowledge Repository for Financial Risk Management"—IEEE Transactions on Knowledge and Data Engineering*, vol. 9, No. 1 (Jan.-Feb. 1997) pp. 161-167.

* cited by examiner

InterestRateSwap001

```
TRANSACTION TYPE: INTEREST
                    SWAP
CONTRACT WITH: ABC BANK

EFFECTIVE DATE: 19XX  MONTH  DAY

CONTRACT PERIOD: Y YEARS FROM
                       EFFECTIVE DATE
AGREED RATE: z%

NOTIONAL PRINCIPAL: 1 BILLION YEN
```

InterestRateSwap002

```
TRANSACTION TYPE: INTEREST
                    SWAP
CONTRACT WITH: DEF BANK

EFFECTIVE DATE: 19XX  MONTH  DAY

CONTRACT PERIOD: Y YEARS FROM
                       EFFECTIVE DATE
AGREED RATE: z%

NOTIONAL PRINCIPAL: 2 BILLION YEN
```

FIG. 9

| VIRTUALDEAL | | |
|---|---|---|
| FIELD NAME | TYPE | REMARKS |
| VIRTUAL_ID | INTEGER | VIRTUAL TRANSACTION INSTANCE IDENTIFICATION CODE (AUTOMATIC GENERATION) |
| FREE_ID1 | VARCHAR | USER DEFINITION ID<br>USE RECOMMENDED AS TRANSACTION IDENTIFICATION CODE |
| FREE_ID2 | VARCHAR | USER DEFINITION ID<br>USE RECOMMENDED AS TRANSACTION CLASSIFICATION CODE |
| FLDR1_NAME | VARCHAR | TRANSACTION STORAGE PARENT FOLDER NAME |
| FLDR2_NAME | VARCHAR | TRANSACTION STORAGE CHILD FOLDER NAME |
| FREE_NAME | VARCHAR | USER DEFINITION NAME<br>USE RECOMMENDED AS NAME FOR INDIVIDUAL TRANSACTION |
| REGISTDATE | DATE | ENTRY DATE AND TIME (AUTOMATIC GENERATION) |
| CTRPTY_ID | VARCHAR | TRANSACTION PARTY ID |

| INDIVDEAL | | |
|---|---|---|
| FIELD NAME | TYPE | REMARKS |
| INDIV_ID | INTEGER | ENTITY TRANSACTION INSTANCE IDENTIFICATION CODE (AUTOMATIC GENERATION) |
| KIND | VARCHAR | TRANSACTION TYPE NAME |

| DEAL KIND | | |
|---|---|---|
| FIELD NAME | TYPE | REMARKS |
| KIND | VARCHAR | TRANSACTION TYPE NAME |
| TYPE | CHAR | CLASS IDENTIFICATION CODE IN CLASS LIBRARY |

| LINKLIST | | |
|---|---|---|
| FIELD NAME | TYPE | REMARKS |
| VIRTUAL_ID | INTEGER | VIRTUAL TRANSACTION INSTANCE IDENTIFICATION CODE (AUTOMATIC GENERATION) |
| INDIV_ID | INTEGER | ENTITY TRANSACTION INSTANCE IDENTIFICATION CODE (AUTOMATIC GENERATION) |

FIG. 12

| ATTRIBUTE | EXPLANATION |
|---|---|
| PaymCenters | HOLIDAY EXCLUSION CITY LIST FOR RECEIPT/PAYMENT DATE |
| FixCenters | HOLIDAY EXCLUSION CITY LIST FOR PRICE SETTLEMENT DATE |
| EDate | EFFECTIVE DATE |
| TDate | MATURITY DATE |
| FDate | NEXT RECEIPT/PAYMENT DATE |
| BDConv | HOLIDAY EXCLUSION SYSTEM (Preceding / Following / Modified , ETC.) |
| EndEnd | END-OF-MONTH ROLL SPECIFICATION |
| AdjTDate | HOLIDAY EXCLUSION SPECIFICATION FOR MATURITY DATE |
| CFFrq | RECEIPT/PAYMENT FREQUENCY |
| ResetFrq | RESET FREQUENCY |
| FixingOffset | OFFSET DATE FOR PRICE SETTLEMENT DATE |
| FixingBasis | BASE FOR DETERMINING PRICE SETTLEMENT DATE |
| PayIn | BASE FOR DETERMINING RECEIPT/PAYMENT DATE |
| CFList | REFERENCE TO TCF INSTANCE LIST |
| AppliedUnit | UNIT OF APPLICABLE CURRENCY, SECURITIES, GOODS, ETC. |
| DiscCurve | DISCOUNT CURVE |
| PriceCurve | PRICE CURVE |
| IniPrincAmnt | INITIAL PRINCIPAL EXCHANGE AMOUNT |
| FinPrincAmnt | FINAL TERM PRINCIPAL EXCHANGE AMOUNT |
| VarNotional | SPECIFYING Variable Notional Principal |
| AddMargin | SPECIFYING MARGIN CARRY-OVER SYSTEM |
| NotionalAmnt | NOTIONAL PRINCIPAL AMOUNT |
| IndexType | INDEX TYPE (IntRate/Return/Price) |
| FloatIndex | VARIABLE/FIXED INDEX SECTION |
| IndexVal | INDEX VALUE |
| IndexUnit | INDEX UNIT (%/b.p./decimal) |
| DayCount | DAILY COMPUTATION SYSTEM (Bond / Act/360/ Act/Act, Act/365Fixed,EuroBond, ETC.) |
| Rounding | ROUNDING OFF/TRUNCATION SPECIFICATION |
| DecPlaces | ROUNDING OFF/TRUNCATION DIGIT SPECIFICATION |

FIG. 14

| TCFCHAIN | | |
|---|---|---|
| FIELD NAME | TYPE | REMARKS |
| TCFCHAIN_ID | INTEGER | TCFCHAIN INSTANCE IDENTIFICATION CODE |
| INDIV_ID | INTEGER | ENTITY TRANSACTION INSTANCE IDENTIFICATION CODE |
| SIDE_ID | CHAR | RECEIPT/PAYMENT SECTION CODE |
| EDATE | DATE | EffectiveDate |
| TDATE | DATE | TerminationDate |
| FDATE | DATE | FirstDate WHEN Stub IS SPECIFIED |
| BDCONV | SMALLINT | BusinessDayConvention IDENTIFICATION CODE |
| ENDEND | CHAR | EndRoll SPECIFICATION (LOGIC TYPE) |
| ADJTDATE | CHAR | TerminationDate AMENDMENT SPECIFICATION (LOGIC TYPE) |
| CFFRQ | SMALLINT | PaymentFrequency |
| RESETFRQ | SMALLINT | ResetFrequency |
| FIXINGOFFSET | INTEGER | NUMBER OF DAYS FOR Fixingdate |
| FIXINGBASIS | SMALLINT | ORIGINATING POINT OF Fixingdate |
| PAYIN | SMALLINT | Payment SYSTEM (Advance/Arrear) |
| UNIT_CODE | VARCHAR | RECEIPT/PAYMENT CURRENCY |
| DISCCURVE | DATE | DISCOUNT CURVE, INSTANCE IDENTIFICATION CODE NOTE) USING DATE VALUE AS CODE |
| PRICECURVE | DATE | PRICE CURVE, INSTANCE IDENTIFICATION CODE NOTE) USING DATE VALUE AS CODE |
| INIPRINCAMNT | NUMERIC(15,2) | ACTUAL EXCHANGE PRINCIPAL (Initial) |
| FINPRINCAMNT | NUMERIC(15,2) | ACTUAL EXCHANGE PRINCIPAL (Final) |
| VARNOTIONAL | CHAR | VariableNotionalPrincipal SPECIFICATION (LOGIC TYPE) |
| ADDMARGIN | CHAR | MARGIN CARRY-OVER SPECIFICATION (LOGIC TYPE) |
| NOTIONALAMNT | NUMERIC(15,2) | NotionalAmount |
| INDEXTYPE | SMALLINT | INDEX TYPE RULE (Interest/Return/Price) |
| FLOATINDEX | CHAR | VARIABLE INDEX SPECIFICATION (LOGIC TYPE) |
| INDEXVAL | DOUBLE | INDEX VALUE (InterestRate,ReturnValue,Price) |
| INDEXUNIT | SMALLINT | INDEX UNIT (%/b.p./dec) |
| DAYCOUNT | SMALLINT | DayCountBasis (Act_365Fix/Act_Act/Act_360/30E_360/30_360) |
| ROUNDING | CHAR | ROUNDING OFF SPECIFICATION (LOGIC TYPE) |
| DECPLACES | SMALLINT | ROUNDING POSITION (NUMBER OF DIGITS OF DECIMAL POSITION) |

FIG. 15

| ATTRIBUTE | EXPLANATION |
|---|---|
| FloatIndex | VARIABLE/FIXED INDEX SECTION |
| DateFrom | ACCOUNTING PERIOD STARTING DATE |
| DateTo | ACCOUNTING PERIOD ENDING DATE |
| PreFixing | PRIOR TERM VALUE SETTLEMENT DATE |
| Fixing | CURRENT TERM VALUE SETTLEMENT DATE |
| Days | NUMBER OF DAYS OF ACCOUNTING PERIOD |
| Years | NUMBER OF YEARS OF ACCOUNTING PERIOD |
| PaymDate | RECEIPT/PAYMENT DATE |
| PrePrice | PRIOR TERM PRICE INDEX |
| Price | CURRENT TERM PRICE INDEX |
| Return | EARNING RATE |
| IntRate | INTEREST VALUE |
| Margin | MARGIN VALUE |
| Weight | WEIGHT INDEX |
| NotionalAmnt | NOTIONAL PRINCIPAL AMOUNT |
| IndexCF_FV | RECEIPT/PAYMENT AMOUNT BASED ON INDEX |
| MarginCF_FV | RECEIPT/PAYMENT AMOUNT BASED ON MARGIN |
| NonIndexCF_FV | RECEIPT/PAYMENT AMOUNT INDEPENDENT OF INDEX |
| TotalCF_FV | TOTAL RECEIPT/PAYMENT AMOUNT |
| TotalCF_PV | CURRENT VALUE OF TOTAL RECEIPT/PAYMENT AMOUNT |
| DF | DISCOUNT FACTOR (METHOD POINTER TO GetFactor) |

FIG. 16

| TCF | | |
|---|---|---|
| FIELD NAME | TYPE | REMARKS |
| TCF_ID | INTEGER | TCF INSTANCE IDENTIFICATION CODE |
| INDIV_ID1 | INTEGER | ENTITY TRANSACTION INSTANCE IDENTIFICATION CODE |
| SIDE_ID | CHAR | RECEIPT/PAYMENT SECTION CODE |
| FLOATINDEX | CHAR | VARIABLE INDEX SPECIFICATION (LOGIC TYPE) |
| DATEFROM | DATE | CalculationPeriod STARTING DATE |
| DATETO | DATE | CalculationPeriod ENDING DATE |
| DAYS | INTEGER | NUMBER OF DAYS OF PERIOD |
| YEARS | DOUBLE | YearFraction |
| PAYMDATE | DATE | RECEIPT/PAYMENT DATE |
| PREFIXING | DATE | PREVIOUS FixingDate<br>NOTE) EFFECTIVE ONLY FOR FloatIndex |
| FIXING | DATE | FixingDate<br>NOTE) EFFECTIVE ONLY FOR FloatIndex |
| PREPRICE | DOUBLE | PREVIOUS PRICE |
| PRICE | DOUBLE | PRICE |
| RETURN | DOUBLE | EARNING RATE |
| INTRATE | DOUBLE | INTEREST VALUE<br>NOTE) STORED ONLY FOR FixedRate |
| MARGIN | DOUBLE | MARGIN VALUE |
| WEIGHT | DOUBLE | WEIGHT VALUE |
| NOTIONALAMNT | NUMERIC(15,2) | NotionalAmount<br>NOTE) STORED ONLY FOR FixedNotional |
| INDEXCF_FV | NUMERIC(15,2) | INDEX RELATED CASH FLOW (FUTURE VALUE)<br>NOTE) EFFECTIVE ONLY WHEN FixedIndex |
| MARGINCF_FV | NUMERIC(15,2) | MARGIN CASH FLOW (FUTURE VALUE) |
| NONINDEXCF_FV | NUMERIC(15,2) | CASH FLOW FOR NON-INDEX (FUTURE VALUE) |
| TOTALCF_FV | NUMERIC(15,2) | TOTAL RECEIPT/PAYMENT AMOUNT ON CORRESPONDING RECEIPT/PAYMENT DATE (FUTURE VALUE)<br>NOTE) EFFECTIVE ONLY FOR FixedIndex |

FIG. 17

| CLASSIFICATION NUMBER | TRANSACTION CASES |
|---|---|
| 1 | EXCHANGE, SHARES, GOODS SPOT/OUTRIGHT FORWARD |
| 2 | DISCOUNT BOND, SHARES, FORWARD GOODS |
| 3 | INTEREST SWAP, COUPON SWAP |
| 4 | INTEREST BOND, CASH LOAN, SHARES, FORWARD GOODS |
| OTHER | CURRENCY SWAP |

FIG. 21

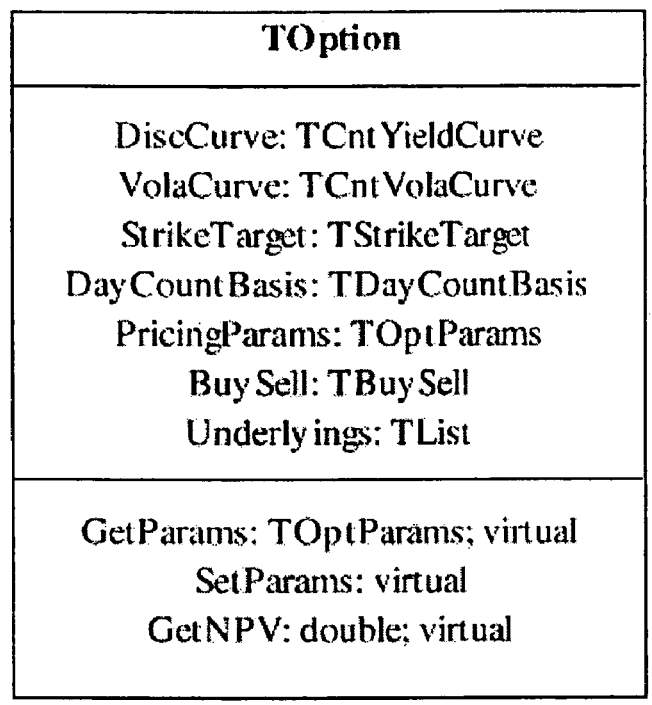
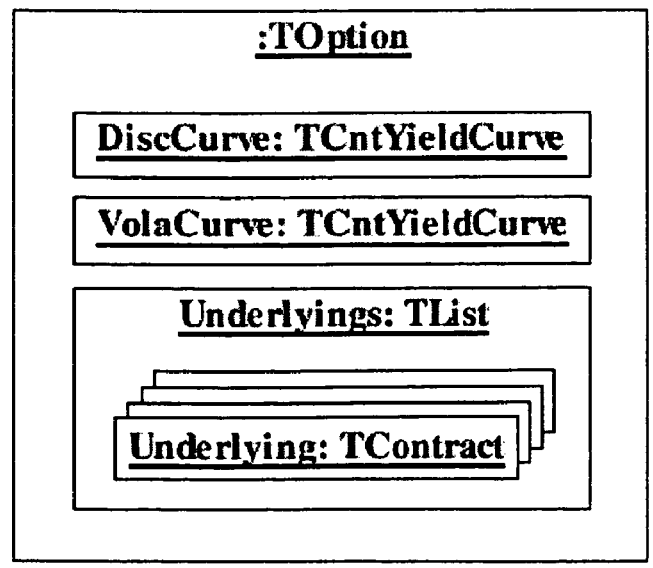
FIG. 22

| ATTRIBUTE | EXPLANATION |
|---|---|
| DiscCurve | DISCOUNT CURVE |
| VolaCurve | VOLATILITY CURVE |
| StrikeTarget | STRIKE TARGET (ATTRIBUTE FOR SPECIFICATION OF VARIABLE PARAMETER OF ORIGINAL ASSET TO BE COMPARED WITH OPTION RIGHT EFFECTIVE PRICE) |
| DayCountBasis | DAILY ACCOUNTING SYSTEM |
| PricingParams | PARAMETER GROUP NECESSARY FOR PRICE EVALUATING METHOD |
| BuySell | BUY/SELL SECTION |
| Underlyings | CONTAINER FOR STORING ORIGINAL ASSET (LINK LIST) |
| METHOD | EXPLANATION |
| GetParams | OBTAINING PARAMETER GROUP FROM ATTRIBUTE PricingParams |
| SetParams | SETTING PARAMETER GROUP AT ATTRIBUTE PricingParams |
| GetNPV | PERFORMING PRICE EVALUATION (CURRENT PRICE EVALUATION) |

INTEGRATED FINANCE RISK MANAGER AND FINANCIAL TRANSACTION MODELING DEVICE

BACKGROUND OF THE INVENTION

1. Field of the Invention

The present invention relates to a financial risk management technology for totally managing the risk in financial transactions using computers, and more specifically to a financial risk management apparatus capable of freely designing desired financial goods by arbitrarily setting and combining parameters relating to actual or imaginary financial transactions, and quickly performing a simulation of imaginary financial transactions or an operation of actual financial goods (risk management), and to a financial transactions modeling apparatus applicable to the financial risk management apparatus.

2. Description of the Related Art

With the diversification of the financial market, the financial transactions also have become diversified and complicated, and the risk management of the financial transactions is required by persons engaged in financial facilities and their customers.

Especially required is the general risk management technology for compound transactions including a plurality of financial transaction entities such as cancelable swaps, swaps with a cap, etc.

To successfully manage the risk in each transaction entity which is the base of the above described compound transactions, there have conventionally been the necessity of programming a risk management module depending on the type of each transaction entity. With an increasing amount of development costs, the conventional technology has the problem that new financial transactions cannot be easily or quickly managed.

There are some typical conventional risk management systems provided with every function implementation. However, since these systems need to implement all functions of financial transactions such as foreign exchange spots, cash equities, discount bonds, interest rate swaps, coupon swaps, currency swaps, options, etc., a large amount of development cost is required, thereby exceedingly raising the sales cost involved.

The transactions of a cash flow type based on 'exchange' are in the majority of the actual financial transactions. However, the conventional systems do not utilize such common features and therefore are not efficient systems as a whole. As a result, they are subject to a raise in the cost as described above.

On the other hand, there has been the conventional technology referred to as tying with strings as the general risk management technology for compound transactions.

In this conventional technology, a common linked code is assigned to a plurality of transaction entities, and the linked code is used in a database to collectively manage the risk in a plurality of transaction entities as compound transactions.

In the above described conventional technology, to perform all operations required to manage the risk in compound transactions, each of the transaction entities forming part of the compound transactions is retrieved from a database using a linked code, a risk management operation is performed on each of the retrieved transaction entities, each operation result is stored in the database, and retrieving and aggregating procedures are necessary in the database based on the association between the transaction entities realized by any method.

Therefore, there has been the problem with the conventional technology that a large scale programming is required to develop a general risk management system for compound transactions, thereby incurring a raise in a development cost and an undesired large scale system.

In addition, a large volume of arithmetic operations are performed by a developed general risk management system, and the performance of the general risk management apparatus can hardly be improved.

Furthermore, there has been the problem that, with an increasing number of types and an increasing number of transaction entities forming financial transactions, a larger storage capacity is required to store the data.

To solve the above described problem, it has been necessary for the conventional technology to provide a large-capacity and high-performance computer in financial facilities, etc. which process a large volume of financial transactions, and the equipment funds and working cost for the general risk management has soared high.

The present invention has been developed to solve the above described problems, and aims at reducing the development and working cost for the general risk management system for financial transactions to improve the system performance.

SUMMARY OF THE INVENTION

First, such words as 'class', 'instance', 'method', 'container class', etc. in the specification and the attached drawings indicate predetermined functions and configurations in the well-known object-oriented concept. In addition, words other than the above listed words may also indicate predetermined functions in the object oriented concept. Furthermore, 'refer' indicates to read necessary data according to data storage address information directly stored in a referred-from program.

FIG. 1 is a block diagram showing the principle of the first aspect of the present invention.

The first aspect of the present invention is based on the general financial risk management apparatus for managing a risk in compound transactions (which may include only one transaction time point) including one or more transaction entities (swap transactions, option transactions, etc.) relating to financial goods.

Each of one or more transaction entity modeling units 103 includes a storage unit 102 for individually storing information about each transaction entity, and a current price evaluating operations unit 101 about transaction entities. For example, the transaction entity modeling unit 103 is a module (a class module 501, an RDBMS module 502, and an RDB module 503) for holding in the storage unit 102 a parameter for use in modeling a transaction entity as a class member, holding the current price evaluating operations unit 101 as a method (GetNPV method), and operating an instance (TContract instance) at a predetermined class in an object-oriented concept.

A virtual transaction unit 107 includes a reference information storage unit 105 containing a reference information group 104 for use in referring to each of the transaction entity modeling units 103; and a compound transactions characteristic computation unit 106 for sequentially referring to each of the transaction entity modeling units 103 from the reference information group 104 according to a predetermined instruction, obtaining operation results from the current price evaluating operations unit 101, and computing the characteristics of the compound transactions based on each of the operation results. The above described transaction entity modeling unit 103 is mounted as a list structure, and the virtual transaction unit 107 is a module (the class module 501, the RDBMS module 502, and the RDB module 503) for holding through the reference information storage unit 105 the reference information group 104 as a list member (link list LinkList), holding the compound transactions characteristic computation unit 106 as a virtual method (GetNPV), and operating an instance (TVirtual Contract instance) of a predetermined container class in the object oriented concept.

A financial characteristic computation unit 108 is described later.

With the configuration of the first embodiment of the present invention, the three requests to simplify the entire system, speed up risk management operations, and compress data, which have conventionally been hardly attained simultaneously, can be successfully attained simultaneously in managing the risk in compound transactions (compound goods) relating to financial goods containing one or more transaction entities.

That is, with the configuration according to the first aspect of the present invention, all transactions can be collectively processed by one virtual transaction unit 107 regardless of the type of a transaction to be managed, or regardless of whether a single or a plurality of components are contained in the transaction. Therefore, an application programmer can write computer programs without considering the type of transaction or the configuration.

Practically, all transactions can be constantly recognized as, for example, a TVirtualContract instance, etc. by realizing the transaction entity modeling unit 103 as an instance of a TContract class, and the virtual transaction unit 107 as a TVirtualContract class.

Then, an application programmer can easily develop various functions of managing risks only by individually develop methods for TVirtualContract instance, etc. for realizing the compound transactions characteristic computation unit 106 in the virtual transaction unit 107 without changing the structure of the TContract class, etc.

In addition, with the configuration according to the first aspect of the present invention, the current price evaluating operations unit 101 in the transaction entity modeling unit 103 can independently perform a current price evaluation operation through the reference information group 104, and the compound transactions characteristic computation unit 106 in the virtual transaction unit 107 can finally summarize the current price evaluating operations only by one of more transaction entity modeling units 103 having a simple structure referred to by the reference information group 104 such as a link list, etc. in the virtual transaction unit 107, and issuing an instruction to the virtual transaction unit 107. As a result, various operations performed in the risk management can be quickly performed by performing sequential accessing operations to each of the transaction entity modeling units 103 through the reference information group 104.

Practically, the transaction entity modeling unit 103 is realized as an instance of the TContract class to be held with the current price evaluating operations unit 101 as a GetNPV method, and the virtual transaction unit 107 is realized as an instance of the TVirtualContract container class with the reference information group 104 held as a link list and the compound transactions characteristic computation unit 106 held as a virtual method GetNPV. Thus, a high-sped risk management operation can be easily performed on memory.

Furthermore, with the configuration according to the first aspect of the present invention, since the virtual transaction unit 107 refers to one or more independent transaction entity modeling units 103, each of the transaction entity modeling units 103 respectively for swap transactions, option transactions, etc. can be referred to by a plurality of virtual transaction units 107. That is, the data of one transaction entity modeling unit 103 can be utilized by a plurality of financial transactions. As a result, in financial facilities, etc. which process a large volume of financial transactions, a large data compression effect can be obtained, thereby reducing the necessary amount of computer resources.

In this case, for example, a subtle difference in financial characteristics to each transaction entity modeling unit 103 can be absorbed for each of the financial transactions by assigning to the compound transactions characteristic computation unit 106 in the virtual transaction unit 107 the function of computing a new operation result by multiplying each operation result by a predetermined transform coefficient.

FIG. 2 shows the configuration of the second aspect of the present invention.

The second aspect of the present invention is based on the financial transactions modeling apparatus for modeling a transaction (cash flow type transaction) established by processing financial transactions (including financial goods other than currencies) in a predetermined transaction period 201. The configuration according to the second aspect of the present invention is not based on the configuration according to the first aspect of the present invention, but is a configuration realizing the transaction entity modeling unit 103 with the configuration according to the first aspect of the present invention.

Each of one or more unit transaction modeling units 207 includes a unit transaction information storage unit 206, provided for each of one or more unit transaction periods (CashFlowLet) 204 obtained by dividing a predetermined transaction period 201 for each receipt or payment in each of a receiver (receipt side) 202 and a payer (payment side) 203 relating to a financial transaction, for individually storing information about unit transactions, and a current price evaluating operation unit 205 for the unit transaction period 204. The unit transaction modeling unit 207 is a module (the class module 501, the RDBMS module 502, and RDB module 503) for holding, for example, as a class member a parameter for use in performing a current price evaluating operation for the unit transaction period 204 in the unit transaction information storage unit 206, holding the current price evaluating operation unit 205 (GetNPV) as a method, and operating an instance in a predetermined class (TCFSwap instance) in the object-oriented concept. The above described current price evaluating operation unit 205 performs, for example, a current price evaluating operation performed based on a future value index computed using one of the three types of indices of interest, earning rate, and price, and an evaluation value independent of any of the interest, earning rate, and price in the unit transaction period 204 corresponding to the unit transaction modeling unit 207. Furthermore, the current price evaluating operation unit 205 includes, for example, a discount rate multiplication unit for obtaining a current value as a current price evaluating operation result by multiplying the above described current price evaluating operation result by a predetermined discount rate.

A transaction sequence modeling unit 211 includes a reference information storage unit 209 containing a reference information group 208 for referring to the unit transaction modeling unit 207 corresponding to each of the receiver 202 and the payer 203 relating to a financial transaction; and a transaction sequence characteristic computation unit 210 for sequentially referring to each of the unit transaction modeling units 207 from the reference information group 208 in each of the receiver 202 and the payer 203 relating to the financial transaction at a predetermined instruction, obtaining operation results from the current price evaluating operation unit 205, and computing the characteristic of a transaction sequence based on each of the operation results. The unit transaction modeling unit 207 is mounted as a list structure. The transaction sequence modeling unit 211 is a module (the class module 501, the RDBMS module 502, and the RDB module 503) for holding, for example, the reference information group 208 in each of the receiver 202 and the payer 203 relating to the financial transaction as a list member (RecCashFlows, PayCashFlows), the transaction sequence characteristic computation unit 210 as a virtual method (GetNPV), and operating an instance (TCSwap instance) in a predetermined container class in the object-oriented concept.

A financial characteristic computation unit 213 is described later.

With the above described configuration according to the second aspect of the present invention, various financial transactions based on 'exchange' such as foreign exchange, lending/borrowing, bonds, shares, commodities, interest rate/currency swaps, equity swaps, commodity swaps, etc. can be integrated and modeled by a transaction sequence modeling unit 211. To be more concrete, cash flow type transaction entities are collectively managed as a set of cash flow elements (CashFlowLet) for each unit transaction period 204 in each of the receiver 202 and the payer 203. Each element is collected by the transaction sequence modeling unit 211 for referring to the elements. With the diversification of reference types, various 'exchange-based cash flow type transactions can be collectively modeled.

As a result, the system configuration of the financial transactions modeling apparatus can be compact, thereby considerably reducing development and sales costs.

It is not necessary that the payment for financial transactions should be made by currency. It can also be made by bonds, shares, commodities, etc. In this case, the current price evaluating operation unit 205 in the unit transaction modeling unit 207 can computes a future value index by performing a current price ratio operation in accordance with an interest, an earning rate, or a price in the payment unit of financial transactions (for example, the number shares) in the corresponding unit transaction period 204. That is, according to the second aspect of the present invention, the exchange-based cash flow type transactions can be collectively processed for any unit of financial transaction object.

With the configuration according to the second aspect of the present invention, a user interface unit 212 (TCFChain.BuildCF method) can be further included. The user interface unit 212 is designed to compute one or more unit transaction periods 204 by dividing a predetermined transaction period 201 for each receiver or payer based on the settings of date information by the user, etc., generate the unit transaction modeling unit 207 for each of the computed unit transaction periods 204 in each of the receiver 202 and the payer 203 of a financial transaction object, and generate the reference information group 208 in the transaction sequence modeling unit 211 corresponding to each of the receiver 202 and the payer 203.

With the configuration, the user can process various financial transactions based on the 'exchanging' as described above through a general user interface, thereby conspicuously improving the operability.

Furthermore, with the configuration according to the second aspect of the present invention, the user interface unit 212 (magic sheet) can further be included. For each unit transaction modeling unit 207, the user interface unit 212 amends a parameter for use in financial transactions modeled by the unit transaction modeling unit 207, and issues a predetermined instruction depending on the amendment.

With the above described configuration, the user can customize in detail the exchange-based cash flow type transactions.

FIG. 3 is a block diagram showing the principle of the third aspect of the present invention. The third aspect of the present invention is based on the financial transactions modeling apparatus for modeling option transactions relating to financial goods. The configuration according to the third aspect of the present invention is not based on the configuration according to the first aspect of the present invention, but realizes the transaction entity modeling unit 103 with the configuration according to the first aspect of the present invention.

An original asset modeling unit 303 includes a storage unit 302 for individually storing information about original assets of option transactions, and a current price evaluating operation unit 301 for the original assets. The original asset modeling unit 303 is a module (the class module 501, the RDBMS module 502, and the RDB module 503) for holding, for example, a parameter for user in modeling the original assets as a class member in the storage unit 302, holding the current price evaluating operation unit 301 as a method (GetNPV), and operating a predetermined instance (TOption instance) in the object-oriented concept.

An option modeling unit 308 includes a reference information storage unit 305 for containing reference information group 304 for reference to each of the original asset modeling units 303; and an option transaction characteristic computation unit 307 for computing the characteristic of option transactions based on each operation result obtained by the current price evaluating operation unit 301 in the original asset modeling unit 303 sequentially referred to by the reference information group 304 and/or a predetermined evaluation model (a black sholes model, etc.) 306. The original asset modeling unit 303 is mounted as, for example, a list structure. The option modeling unit 308 is a module (the class module 501, the RDBMS module 502, and the RDB module 503) for holding the reference information group 304 as a list member (Underlyings), holding the option transaction characteristic computation unit 307 as a virtual method (GetNPV, etc.), and operating an instance (TOption instance) of a predetermined container class in the object-oriented concept. For example, when a predetermined instruction is issued, the option modeling unit 308 sequentially refers to the original asset modeling unit 303 from the reference information group 304, obtains an operation result from the current price evaluating operation unit 301, and computes the characteristic of the option transaction based on each operation result and a predetermined evaluation model 306 when the date set for an option transaction refers to the in the money state of the option transaction, and computes the characteristic of the option transaction based on only the predetermined evaluation model 306.

The financial characteristic computation unit 213 is described later.

In the conventional option model definition, the characteristic of original assets is added to the evaluation model of the option itself to determine the model of the option. On the other hand, according to the third aspect of the present invention, the original asset modeling unit 303 can be designed and realized completely separately and independently from the evaluation model of an option, and the option modeling unit 308, which is the body of the option, can refer to any number of original asset modeling units 303 independently realized as described above through the reference information group 304. That is, only by issuing one instruction to the option modeling unit 308, the current price evaluating operation unit 301 in the original asset modeling unit 303 independently performs a current price evaluating operation through the reference information group 304, and finally the option transaction characteristic computation unit 307 in the option modeling unit 308 can compute the characteristic of option transactions based on each operation result, a predetermined evaluation model (in the money state) or only a predetermined evaluation model (out of the money). As a result, with the configuration according to the third aspect of the present invention, the system design of option transactions can be simplified, thereby improving the performance and reducing development and sales costs.

Furthermore, with the configuration according to the third aspect of the present invention, data of one original asset modeling unit 303 can be shared for a plurality of option transactions. As a result, in such banking facilities as process a large volume of similar option transactions, a large data compression effect can be obtained, thereby reducing a necessary amount of computer resources.

In addition, with the configuration according to the third embodiment of the present invention, the option modeling unit 308 computes the characteristic of an option transaction based on each of the operation results from the current price evaluating operation unit 301 in each of the original asset modeling units 303 and on a predetermined evaluation model 306 when the date set for the option transaction indicates the in-the-money state of the option transaction. When the date indicates the out-of-the-money state for the option transaction, the option modeling unit 308 computes the characteristic of the option transaction based on only the predetermined evaluation model 306. As a result, the switching between in-the-money state and the out-of-the-money state can be simply controlled, and a high-performance system can be successfully realized.

The fourth aspect of the present invention is based on the above described first, second or third aspect of the present invention.

The financial characteristic computation unit 108, 213, or 309 shown in FIG. 1, 2, or 3 computes the financial characteristic (containing real time data) at each of the current price evaluating operations performed by each of the current price evaluating operations units for each of the current price evaluating operations units 101, 205, or 301, and provides the obtained financial characteristic for each current price evaluating operations unit 101, 205, or 301. The financial characteristic computation unit 108, 213, or 309 is a module (the class module 501, the RDBMS module 502, or RDB module 503) for modeling, for example, the above described financial characteristic, and operating an instance (TCntYieldCurves, TCntpriceCurves, TCntVolsCurves, etc.) in a predetermined class in the object-oriented concept. The current price evaluating operations unit 101, 205, or 301 contains reference information (DiscCurve, PriceCurve, etc.) stored by the above described instance in a predetermined class in reference to a predetermined method for computing the above described financial characteristic.

A financial characteristic definition unit for defining the above described financial characteristic can be further included in the configuration according to the fourth aspect of the present invention.

With the above described fourth aspect of the present invention, the user can freely design and introduce each of the financial characteristics such as a unit of financial transactions, a holiday exclusion city, an yield curve, a price curve, a volatility curve, etc. to a current price evaluating operation.

With the configuration according to the fourth aspect of the present invention, the financial characteristic computation unit 108, 213, or 309 can be designed to comprise a plurality of single financial characteristic computation units for computing each of a plurality of single financial characteristics obtained when each current price evaluating operation is performed by each of the current price evaluating operations units 101, 205, and 301; and a virtual financial characteristic computation unit for computing a new virtual financial characteristic by composing the above described plurality of single financial characteristics, and providing the virtual financial characteristics for each of the current price evaluating operations unit 101, 205, and 301. In this case, each single financial characteristic computation unit is a module (the class module 501, the RDBMS module 502, and the RDB module 503) for operating each instance (TAbsCurve) in each of a plurality of predetermined classes in the object-oriented concept. The virtual financial characteristic computation unit is, for example, a module for operating an instance (TCntVirtual Curve) in a predetermined super class inherited by a plurality of predetermined classes. The current price evaluating operations unit 101, 205, or 301 contains reference information stored in the super class in reference to a predetermined method for computing a virtual financial characteristic.

With the configuration, the user can compose a more effective financial characteristic from a plurality of financial characteristics, and introduce it to a current price evaluating operation.

Furthermore, the present invention can be designed as a computer-readable storage medium used to direct a computer to perform functions similar to those realized by the above described aspects of the present invention.

BRIEF DESCRIPTION OF THE DRAWINGS

FIG. 9 shows data compression (1);

FIG. 12 shows the configuration (1) of a table on the RDB;

FIG. 14 shows the outline of the attributes in the TCFChain class;

FIG. 15 shows the configuration (2) of a table on the RDB;

FIG. 16 shows the outline of the attributes in the TCF class;

FIG. 17 shows the configuration (3) of a table on the RDB;

FIG. 21 is a chart showing the classification of transactions;

FIG. 22 shows the data structure and an instance image of the TOption;

FIG. 23 is a chart showing the outline of the attributes and methods of the TOption;

FIG. 32 shows an example (6) of a screen on which an interest rate swap transaction is processed;

FIG. 37 shows an example (2) of a screen on which an equity swap transaction is processed;

DESCRIPTION OF THE PREFERRED EMBODIMENTS

The preferred embodiments of the present invention are described below by referring to the attached drawings.

Figure 4:
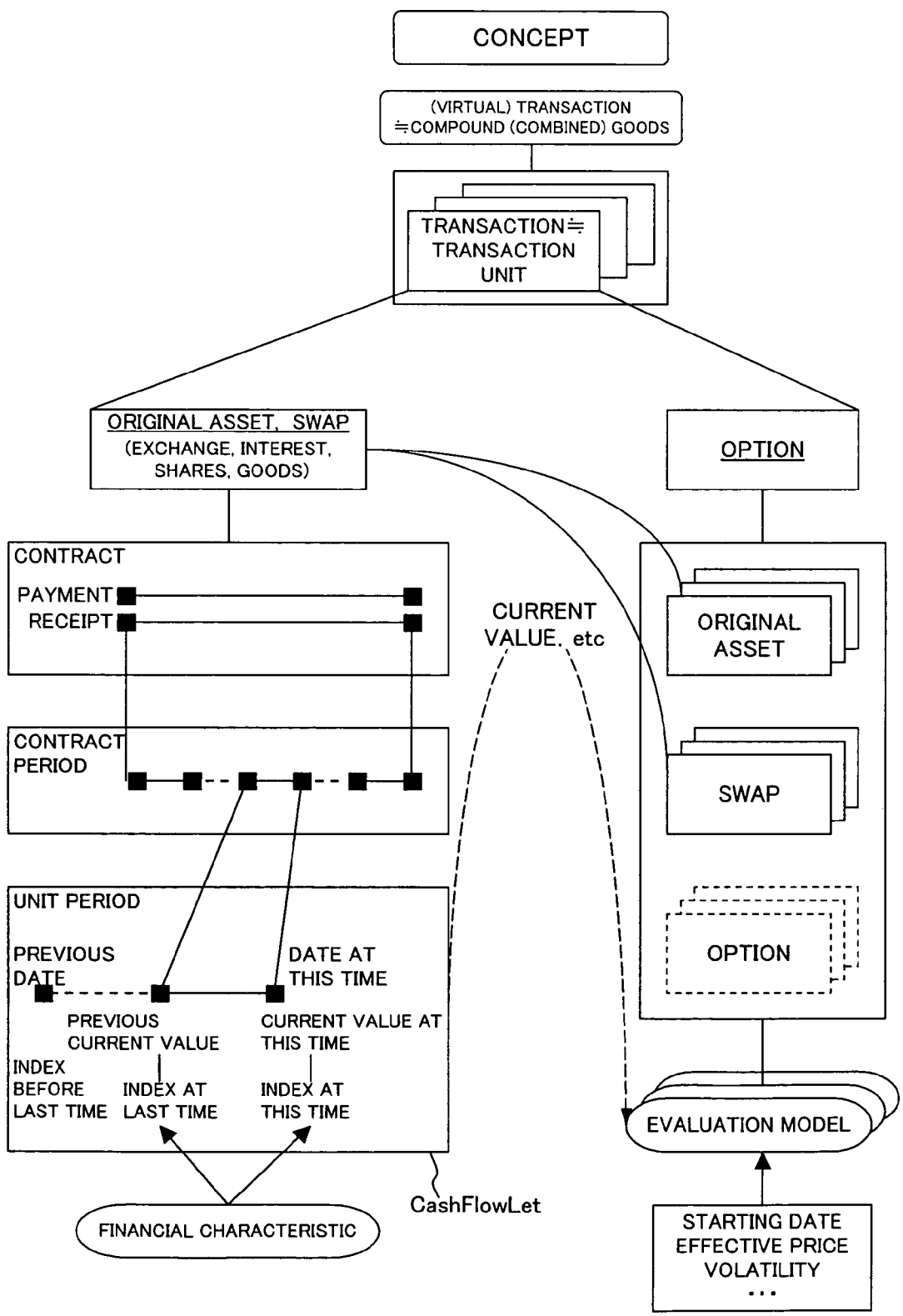
FIG. 4 shows the concept of the present invention.
Figure 5:
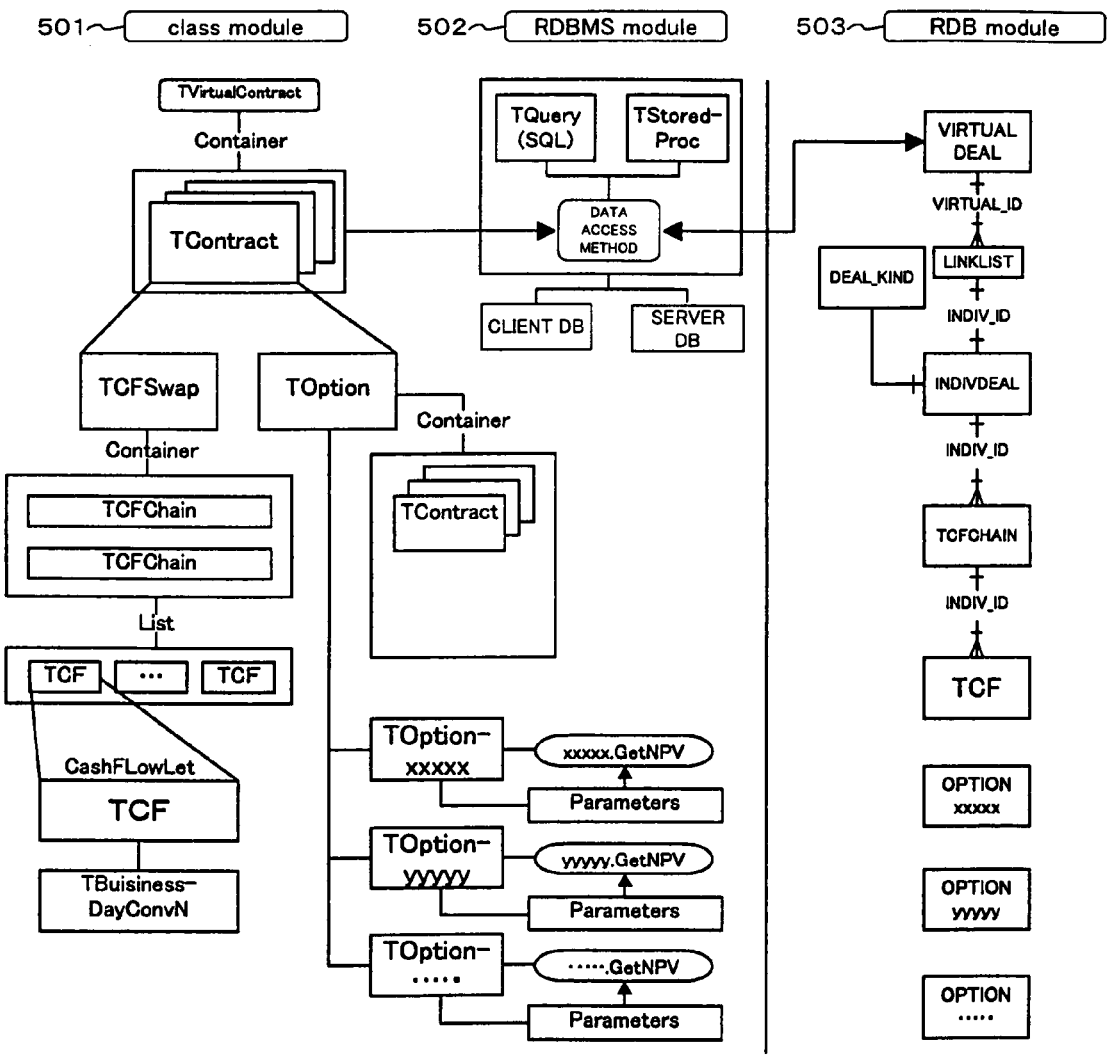
FIG. 5 shows the entire configuration according to an embodiment of the present invention.

FIG. 4 shows the concept of an embodiment of the present invention. FIG. 5 shows the entire configuration of an embodiment of the present invention. The concept and the details of the embodiment of the present invention are sequentially described below by referring to the drawings.

0. Features of the Present Invention

The number of features of the present invention is 6 as follows.

1. Frame of the TVirtualContract container class for realizing a virtual transaction composed of classes (TCFSwap/TOption classes) corresponding to a plurality of transaction entities (virtual transaction management system)
2. Frame of the TCFSwap container class for managing cash flow type transaction entities as a set of cash flow elements (CashFlowLet) for each unit transaction period in each of the receipt side and the payment side, and realizing a cash flow type transaction entities composed of the TCF classes corresponding to each CashFlowLet
3. Current price evaluating operation process shared among the TCF classes (CashFlowLet)
4. Frame of each TOption (container) class
5. Financial curve defining function
6. User interface for easily changing a parameter for risk management and displaying a simulation result of the change Each of the above described features 1 through 6 of the present invention are described below in detail by referring to each of the embodiments.

1. TVirtualContract Container Class for Realizing Virtual Transactions (Virtual Transaction Management System)

Described below is the first feature 'TVirtualContract container class'.

1.1 According to the Present Embodiment, it is Assumed that Financial Transactions are Normally Compound Transactions (Compound Goods) Comprising a Plurality of Transaction Entities as Shown in 4.

Based on this assumption, according to the present embodiment, financial transactions are encoded based on the object-oriented concept in a computer, and the general risk management is realized based on the object-oriented concept. According to the present invention, the object-oriented concept is not required. However, since it is a concept for efficiently supporting the structure of a general risk management system using a computer according to the present invention, the present embodiment is described below using an example of a system configuration based on the object-oriented concept.

In the present embodiment, an abstract class 'TContract' corresponding one to one to each of the transaction entities is defined as shown in FIG. 5. The financial transactions obtained as compound transactions comprising the transaction entities are expressed by the container class TVirtualContract capable of holding any number of TContract instances. According to the present embodiment, the financial management controlled by such an object-oriented concept is referred to as a 'virtual transaction management', and the above described compound transactions as 'virtual transactions'.

Figure 6:
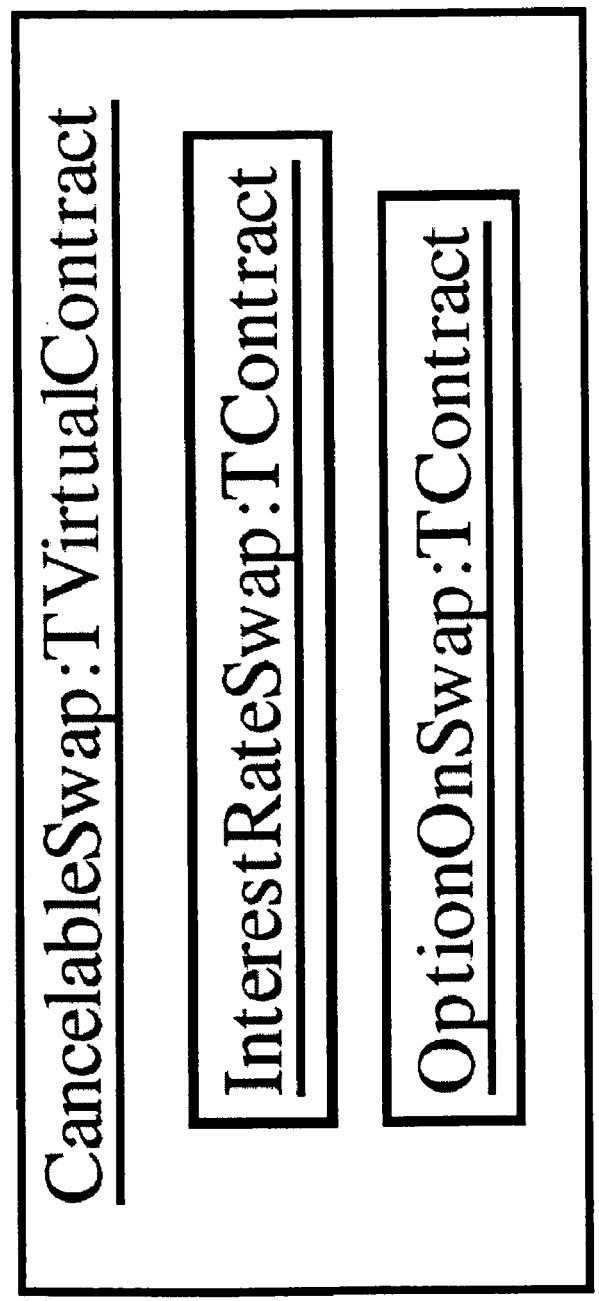
FIG. 6 shows the virtual transaction management for cancelable swaps.

For example, in the instance image of the 'cancelable swaps', the TContract instance named 'InterestRateSwap' corresponding to the first transaction entity and the TContract instance named 'OptionOnSwap' corresponding to the second transaction entity are elements of the set of TVirtualContract instance corresponding to a virtual transaction 'cancelable swaps' as shown in FIG. 6.

The virtual transaction management system is apparently complicated, but correctly reflects on a computer the procedure of a person recognizing a set of financial transaction entities as virtual compound transactions. That is, when a person recognizes such compound transactions as the above described cancelable swaps, he or she first recognizes the name indicating what transactions they are (cancelable swaps), that is, first recognizes the virtual transactions by a collective name, and then takes interest in the transaction entities that are components (elements of a set).

Figure 7:
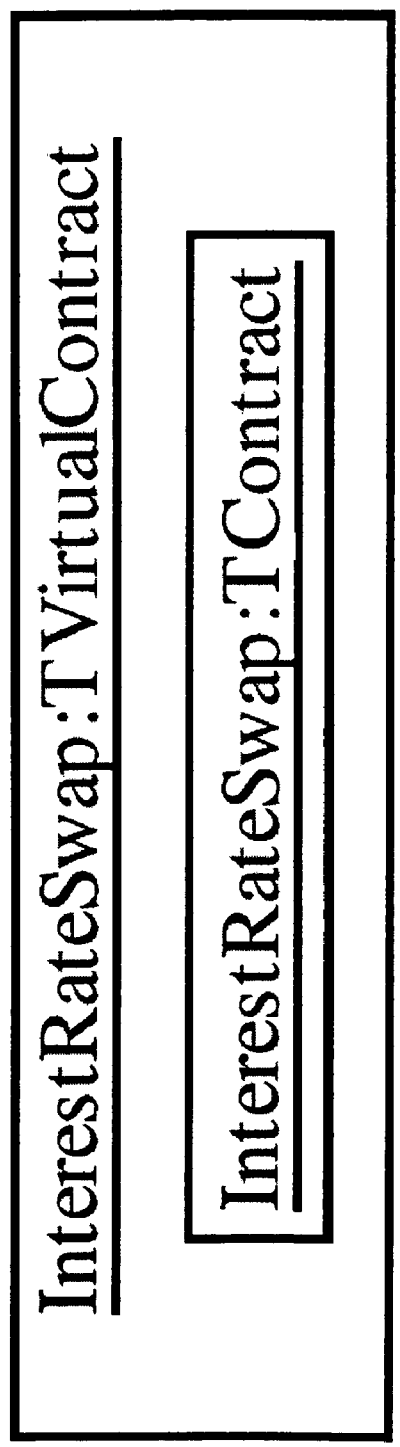
FIG. 7 shows the virtual transaction management for plain vanilla swaps.

A person unconsciously recognizes a set of things by its collective name using a method of simplifying a complicated event. This method refers to a basic concept indispensable to satisfy the functional requirements of the present embodiment in which virtual transactions are processed regardless of single or compound transactions. That is, in this concept, common financial transactions are compound transactions. Therefore, for example, when a plain vanilla swap which is one of the simple formatted transactions is expressed, it is expressed as a virtual transaction named 'InterestRateSwap' containing only one element named 'InterestRateSwap' as a transaction entity as shown in FIG. 7.

Thus, according to the present embodiment, the general risk management can be performed on various financial transactions using a simple algorithm by a virtual transaction container holding a single transaction as well as compound transactions.

1.2 Class Structure for Realizing Virtual Transactions

Figure 8:
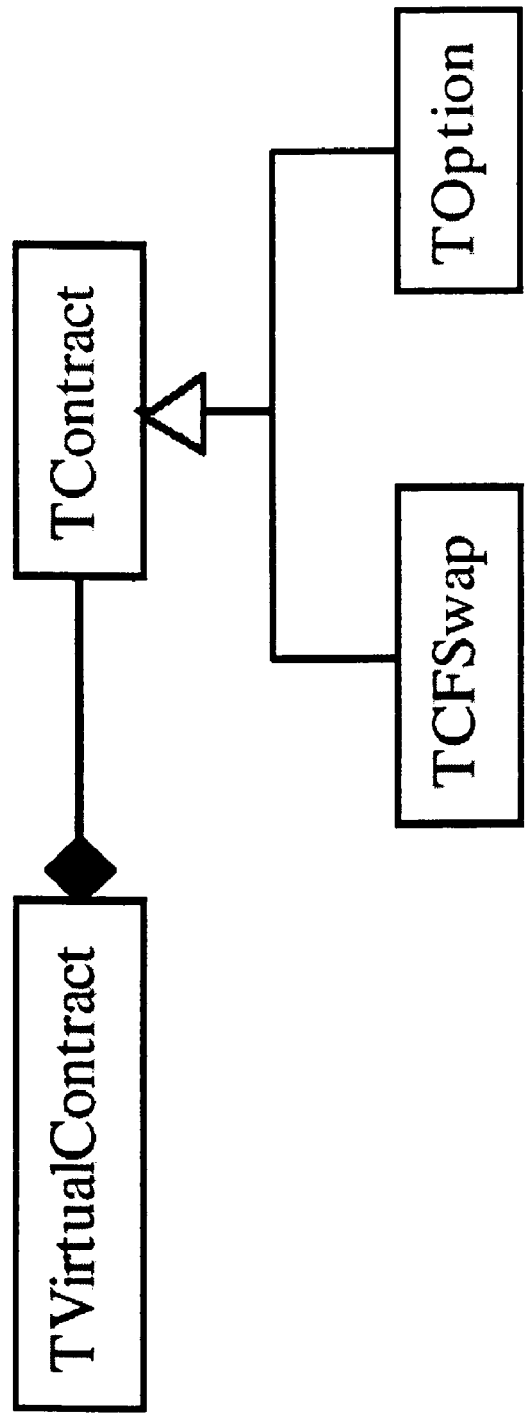
FIG. 8 shows the structure of a class for realizing a virtual transaction.

FIGS. 5 and 8 show the structure of the class of virtual transactions according to the present embodiment in the object-oriented concept.

In FIGS. 5 and 8, TCFSwap refers to a container class holding a cash flow element of various cash flow type transactions. TOption also indicates an abstract class representing each type of option. Thus, according to the present embodiment, a class inheriting the TContract class and corresponding to each of the transaction entities is defined.

The TVirtualContract class is a container class having the function of holding an instance of the TCFSwap/TOption class corresponding to each of the transaction entities. The TVirtualContract instance holds a link list referring to the list structure of each TCFSwap/TOption instance as one of the members.

Each of the class structures relating to the TCFSwap and TOption is described later.

The excellent characteristics of the class structure shown in FIGS. 5 through 8 can be easily understood by assuming the procedure of performing current price evaluating operations on, for example, the compound transactions as shown in FIG. 6.

The TContract class holds a virtual method GetNPV( ) for performing a current price evaluating operation. The TCFSwap class and the TOption class override the virtual method. Therefore, when the CancelableSwap (cancelable swaps) instance belonging to the TVirtualContract class becomes active, the result of the current price evaluating operation on the cancelable swap can be obtained by sequentially issuing the virtual method GetNPV( ) to the instances InterestRateSwap and OptionOnSwap of the transaction entity classes TCFSwap and TOption each stored in the list structure and inheriting the TContract class.

Thus, according to the present embodiment, various arithmetic operations can be performed for the general risk management without a conditional branch used in the conventional management with strings regardless of whether a financial transaction to be processed is a single transaction or a compound transaction only by holding the TCFSwap instance or the TOption instance through a link list in the TVirtual Contract. That is, the present embodiment has the class structure reflecting the highest operation efficiency from the variations of aspects in the object-oriented concept.

1.3 Advantage of Virtual Transactions

The advantage of the virtual transaction management system over the conventional technology is represented by the following three points.

1.3.1 Simple Program Structure
    1.3.2 High-speed Operations on Compound Transactions
    1.3.3 Data Compression Sequentially described below are the above described points of the advantage of the virtual transaction management system.

1.3.1 Simple Program Structure

According to the present embodiment, all transactions can be expressed by one TVirtualContract instance without exception regardless of the type of transaction to be processed, or regardless of a single component or a plurality of components. Therefore, an application programmer can write a program without considering the type or configuration of a transaction.

1.3.2 High-Speed Operation on Compound Transactions

Regardless of the introduction of the object-oriented concept as a system designing means, it is necessary, when the virtual transaction management system is not adopted, to perform a retrieving process and an aggregating process based on the association between transaction entities to be realized by any method after performing operations on each of the transaction entities to complete all operations for compound transactions. On the other hand, in the virtual transaction management system, the portion corresponding to the above described association is realized using a link list. Therefore, the above mentioned procedure can be replaced with the procedure of sequentially accessing each pointer entered in the link list.

Accordingly, with the increasing number of compound transactions to be processed, that is, the more complicated the compound transactions becomes, a larger difference in performance between the operations performed according to the present embodiment and the conventional technology can be expected.

1.3.3 Data Compression

The virtual transaction management system also provides the function of compressing the size of the transaction attribute data in the memory or database. Described below is the means for realizing the function in a simple case.

In financial facilities in which a large volume of interest rate swaps are processed, it is assumed that two interest rate swap objects as shown in FIG. 9 are generated as a most probable case. To identify an actual interest rate swap contract, more detailed attribute information is required. However, only attributes required in explaining the data compression effect of virtual transactions are set in this example.

The difference between the two contracts resides in contents of attributes of contractors and notional principals. For convenience, it is assumed that the first interest rate swap is named InterestRateSwap001, and the second interest rate swap is named InteredtRateSwap002.

Figure 10:
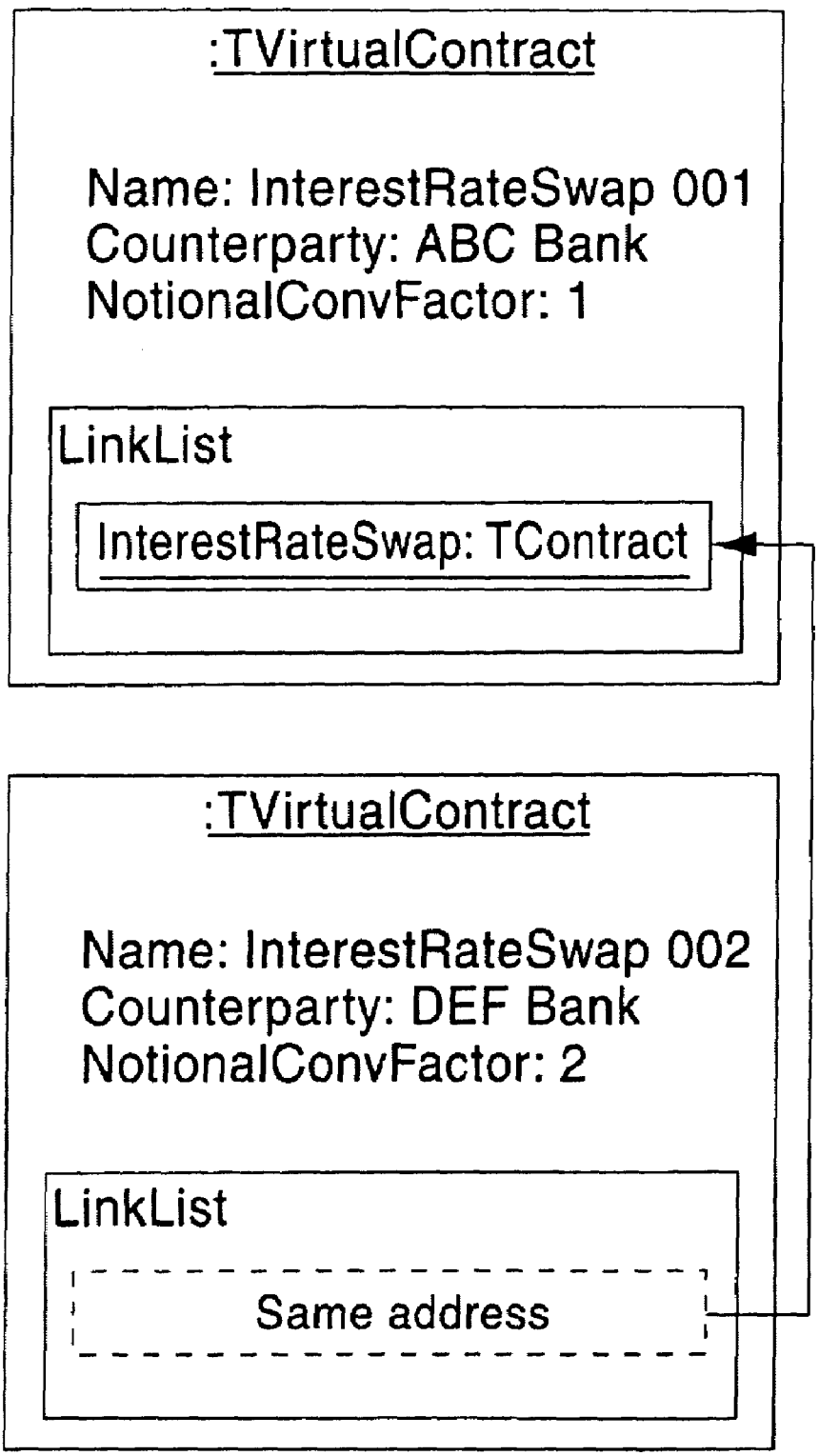
FIG. 10 shows data compression (2)

FIG. 10 shows a generated image of the two objects. FIG. 10 shows that each of the two TVirtualContract instances has the three pieces of attribute data, that is, Name, Counterparty, and NotionalConvFactor, and the link list (LinkList) making reference to the TCFSwap instance InterestRateSwap. In this example, the reference address (the portion noted as SameAddress) to the InterestRateSwap instance stored in the link list of the TVirtualContract instance InterestRateSwap002 is the key to the data compression. The data compression can be realized with the TCFSwap instance InterestRateSwap shared by storing the same address as the reference address to the InterestRateSwap instance stored in the link list of the TVirtualContract instance InterestRateSwap002.

However, if the above described reference address stored in the link list of the TVirtualContract instance InterestRateSwap002 is used as is, the notional principal of the InterestRateSwap002 equals 1 billion yen which is equal to the notional principal of the InterestRateSwap001 instance. Therefore, according to the present embodiment, a conversion factor NotionalConvFactor for use in converting a basic notional principal (in this example, the notional principal of the InterestRateSwap001 instance) into the assumed principal of each instance is defined in each TVirtualContract class. That is, the value of 1 is stored in the InterestRateSwap001 instance as a conversion factor NotionalConvFactor, and the value of 2 is stored in the InterestRateSwap002 instance as a conversion factor NotionalConvFactor. Described above is the case in which the data compression is effective only with the same contract term, interest payment date structure, and stipulated rate, but with a different contractor and notional principal. However, in the virtual transaction management system according to the present embodiment, the function can be extended depending on the requested data compression effect. For example, if the stipulated rate is also different between the two contracts in the above described case, the attribute of storing the conversion factor of the stipulated rate can be defined. Similarly, a higher data compression effect can be obtained by increasing the number of attributes which can be reproduced using conversion factors or functions.

The data compression in the virtual transaction system according to the present embodiment contributes not only to the reduction of hardware resources but also to higher speed operations.

For example, when the interest sensitivity of the two interest rate swaps in the case shown in FIG. 9 is measured, it is necessary to update the current values of the cash flow elements on each payment day of the interest rate swaps. In this case, in the method shown in FIG. 10, the update procedure is followed only on the InterestRateSwap001 instance. On the InterestRateSwap002 instance, the update procedure is completed after multiplying the value obtained in the above described update procedure by the conversion factor NotionalConvFactor. Normally, the data compression is a negative factor in the operation speed of an application, but a positive factor in the virtual transaction management system according to the present embodiment.

1.4 Realizing Virtual Transaction Management System Using RDBMS/RDB

In a program installed based on the object-oriented concept, the OODBMS (object-oriented database management system) is normally used to permanently hold an instance generated in the memory. However, the RDBMS (relational database management system) is also adopted in many cases with the implementation cost, the utilization of existing resources, the stable operation results, etc. taken into account. In this embodiment, an example of realizing a virtual transaction management system applied when the RDBMS is used to permanently hold an instance.

To manage virtual transactions using the RDBMS, three tables are required to store at least the following three instances or lists.

TVirtualContract instance

TContract instance

Link list in TVirtualContract instance

Figure 11:
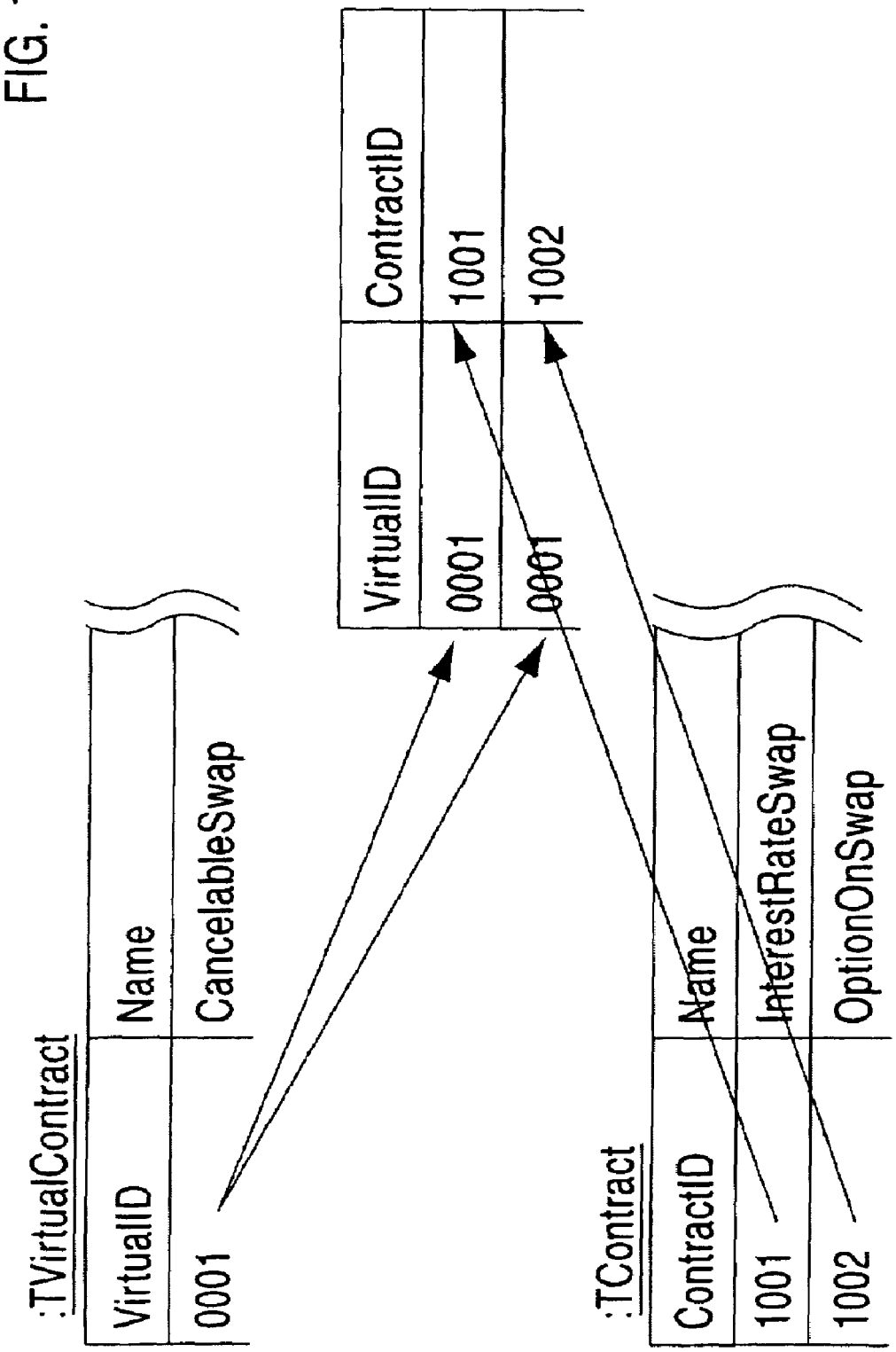
FIG. 11 shows the structure of realizing a virtual transaction on the RDBMS.

These tables can be easily managed as shown in FIG. 11, by applying the third normalization commonly used in the RDB (relational database) managed by the RDBMS. That is, by installing the intermediate table LinkList comprising only external keys, the information stored in the container of the TVirtualContract instance can be stored.

FIG. 12 shows the data structure of each record in a VIRTUALDEAL table which is managed by the RDBMS module shown in FIG. 5, stored in the RDB module shown in FIG. 5, and stores a TVirtualContract instance; an INDIVDEAL table and a DEAL_KIND table for storing a TContract instance; and a LINKLIST table for storing a link list in the TVirtualContract instance. A TCFCHAIN table, a TCF table, and each OPTION table in the RDB module shown in FIG. 5 store an instance in the TRCSwap class inherited from the TContract class, an instance in the TCF class linked to the above described instance, and an instance in the TOption class inherited from the TContract class. These instances are described later.

The VIRTUALDEAL table stores the contents of the TVirtualContract instance in each record assigned each virtual transaction instance identification code VIRTUAL_ID (corresponding to the VirtualID shown in FIG. 11) for unique identification of a TVirtualContract instance. Other field names shown in FIG. 12 are provided for convenience of a managing user.

Each record in the INDIVDEAL table holds an entity transaction instance identification code INDIV_ID (corresponding to the Contract ID shown in FIG. 11) for unique identification of a TContract instance, and a transaction type name KIND (corresponding to the Name for each ContractID shown in FIG. 11) which can be freely named by a user for each TContract instance.

Each record in the DEAL_KIND table holds a transaction type name KIND and a corresponding class identification code TYPE for identification of a class type (TCFSwap class or TOption class) in a class library.

Each record in the LINKLIST table holds a virtual transaction instance identification code VIRTUAL_ID and an entity transaction instance identification code INDIV_ID, thereby associating a record stored in the VIRTUALDEAL table with corresponding records in the INDIVDEAL table, TCFCHAIN table/TCF table, and each OPTION table. In this case, each entity information about an instance in each TCFSwap class inherited from the TContract class, each TCF instance linked to the above described instance, and an instance in each TOption class inherited from the TContract class is stored in the TCFSwap table, the TCF table, and each OPTION table described later through the above described INDIV_ID.

With the above described table configuration, a TContract instance (TCFSwap/TOption instance) identified by the entity transaction instance identification code INDIV_ID in the INDIVDEAL table can be associated with a plurality of TVirtualContract instances in the VIRTUALDEAL table through the LINKLIST table, thereby allowing the data compression described above by referring to FIGS. 9 and 10.

As described above, when the OODBMS is adopted as a database management system, the class structure shown in FIGS. 5 and 8 can be stored directly in the OODB without adopting the table configuration shown in FIGS. 5 and 12.

A current price evaluating operation is performed on a virtual transaction entered in the RDB module shown in FIGS. 5 and 12.

step 1: When a BookOut method which is one of the data access methods managed by the RDBMS module shown in FIG. 5 is activated, a record containing an identifier ID specified from the VIRTUALDEAL table is extracted, and a virtual transaction instance identification code VIRTUALDEAL.VIRTUAL_ID is obtained from the record.

step 2: A record containing the above described virtual transaction instance identification code is extracted from the LINKLIST table, and an entity transaction instance identification code LINKLIST.INDIV_ID is obtained from the record. There can be a plurality of records each of which contains a virtual transaction instance identification code. In this case, a plurality of LINKLIST.INDIV_ID codes are obtained. Next, each record having an entity transaction instance identification code is extracted from the INDIVDEAL table, and a transaction type name INDIVDEAL.KIND is obtained from each record.

step 3: Each record corresponding to each of the above described transaction type names is extracted from the DEAL_KIND table, and each class identification code DEAL_KIND.TYPE is obtained from each record.

step 4: Each record containing each of the entity transaction instance identification codes LINKLIST.INDIV_ID obtained from the LINKLIST table in step 2 is extracted from the TCFCHAIN table and the TCF table or each OPTION table, and each TCFSwap instance and each TCF instance, or each TOption instance is generated on the memory according to each piece of entity information contained in each record and each piece of class definition information retrieved from a class library based on each class identification code obtained in step 3.

step 5: Based on the contents of the record on the VIRTUALDEAL table extracted in step a TVirtualContract instance is generated on the memory, and a reference address to each TCFSwap instance or each TOption instance generated in the above described step 4 is entered in the link list in the TVirtualContract instance.

step 6: The virtual method GetNPV( ) of each TCFSwap instance or a TOption instance referred to from the above described link list is followed.

Thus, according to the present embodiment, a current price evaluating operation is performed on compound transactions only by following one virtual method GetNPV( ) regardless of the transaction entities of compound transactions.

When the OODBMS is adopted, the operation in step 6 can be directly performed without performing the operations in the above described steps 1 through 5.

2. TCFSwap Container Class for Realizing a Cash Flow Type Transaction Entity

Described next is the frame of the TCFSwap container class which is the second feature of the present invention.

2.1 Feature of TCFSwap Container Class

As described by referring to FIG. 8, a TCFSwap container class is defined as a class corresponding to a cash flow type transaction entity inheriting the TContract class according to the present embodiment.

The most outstanding feature of the TCFSwap container is that various financial transactions based on 'exchange' such as an foreign exchange, lending/borrowing, bonds, shares, commodities, interest/currency swaps, equity swaps, commodity swaps, etc. can be realized in this single class. In the conventional technology, corresponding classes are normally defined for the above described transactions. When transactions not corresponding to currently realized transaction entity classes are to be newly processed, it is necessary to add (newly develop) corresponding classes. On the other hand, according to the present embodiment, a cash flow type transaction entity is managed as a set of cash flow elements (hereinafter referred to as CashFlowLet) for each unit transaction period on each receipt side and payment side, and a TCFSwap container class is prepared to collectively process the TCF classes corresponding to respective CashFlowLets. Then, with the diversification of the storage format of each TCF class in the TCFSwap container class, various 'exchange-based cash flow type transactions' can be realized.

2.2 Structure of TCFSwap Container Class

Figure 13:
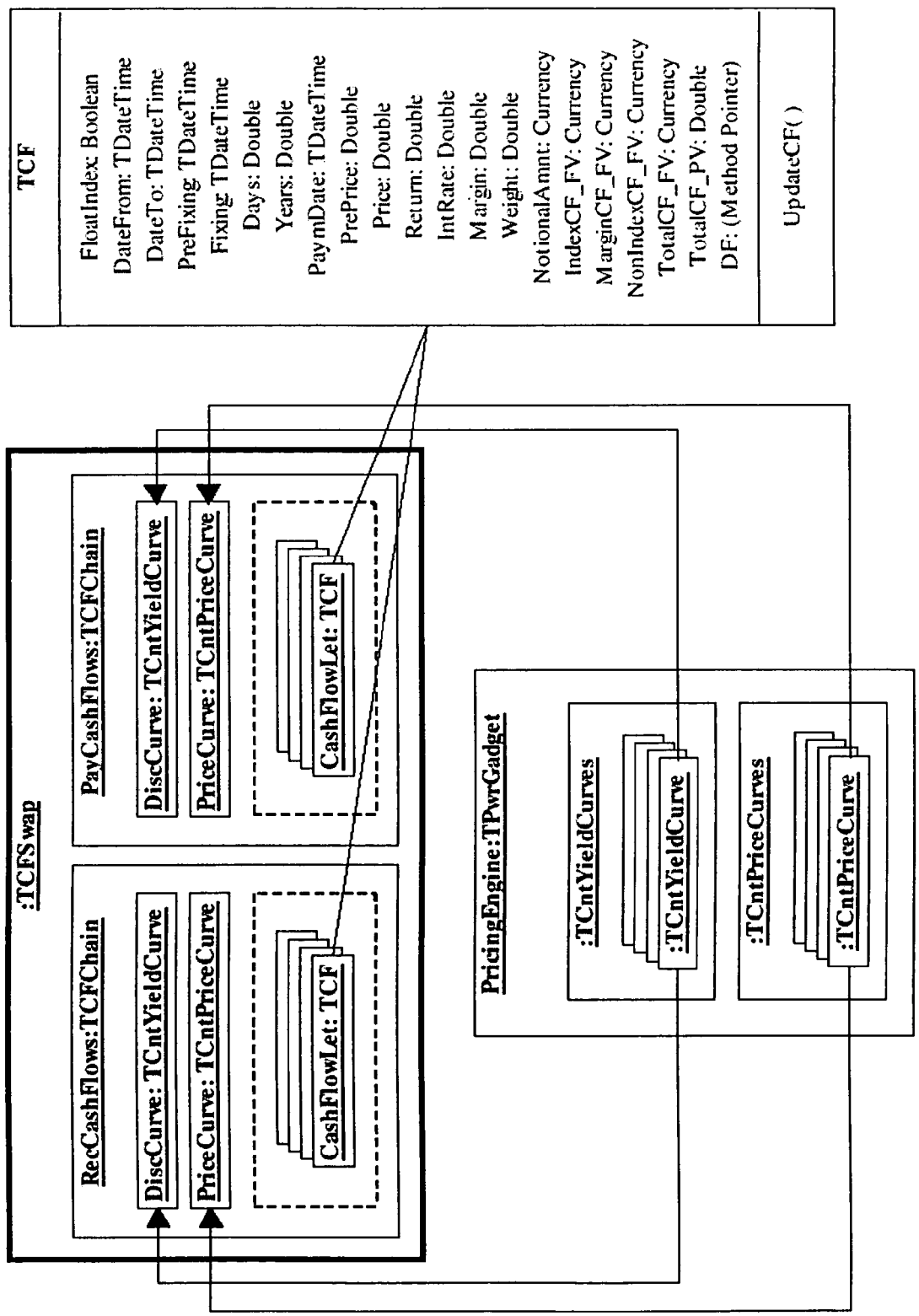
FIG. 13 shows the TCFSwap instance image and the structure of data in the TCF class.

The TCFSwap is a container class in which a set of CashFlowLets are stored, and the image of the instance is shown in FIG. 13.

In FIG. 13, each of the instances in two TCFChain classes named 'RecCashFlows' and 'PayCashFlows' stores a link list for reference to the link structure and for storing a set of instances in the TCF class referring to the CashFlowLet. The RecCashFlows instance stores a link list for the TCF instance group referring to a group of CashFlowLets of the receipt side. The PayCashFlows instance stores a link list for the TCF instance group referring to a group of CashFlowLets of the payment side.

The above described instances in the two TCFChain classes respectively store reference to an instance in the TCntYieldCurve class named 'DiscCurve' and an instance in the TCntPriceCurve class named 'PriceCurve' respectively inherited from the TPwrGadget class named 'Pricing Engine'. The TPwrGadget class provides the function of performing an operation of financial characteristics to realize a current price evaluating operation for each CashFlowLet, and can arbitrarily define, generate, and store the information about an yield curve (discount curve), a price curve, a volatility curve, a transaction unit of currencies, goods, policies, etc. and holiday exclusion cities. FIG. 13 shows only the yield curve and the price curve in the above described information. That is, the TCntYieldCurve class is a class in which an yield curve (discount curve) is defined. A discount factor at a requested date can be obtained by a GetFactor method installed in the method. The TCntPriceCurve class is a class in which a price curve is defined, and a price index on a requested date can be obtained by a GetFactor method installed in the class. The TPwrGadget class also has a virtual curve function described later.

FIG. 14 shows the details of an attribute group stored as a class member group in the TCFChain class. In FIG. 14, the CFList attribute corresponds to the link list to the link structure of the TCF instance (CashFlowLet) shown in FIG. 13, and the DiscCurve attribute corresponds to the reference to the DiscCurve (TCntYieldCurve) instance shown in FIG. 13. Other attribute groups shown in FIG. 14 define the general characteristics of the cash flow on the receipt or payment side.

These attribute groups are set through the user interface described later.

It is obvious that the attribute groups are similar to the transaction attributes of interest/currency swaps. That is, the spot and forward transactions such as an foreign exchange, lending/borrowing, bonds, shares, commodities, etc. are assumed to be an aspect of swaps. Actually, most transactions in a cash flow based on exchanging can be expressed by a collective format of the TCF instance and an attribute which defines the state of an instance.

FIG. 15 shows the data structure of each record in the TCFCHAIN table corresponding to the TCFChain class. Using the class member name shown in FIG. 14 and the field name shown in FIG. 15, the same information is stored by the same spellings excluding the differences in upper and lower cases. However, in FIG. 15, the UNIT#CODE field corresponds to the AppliedUnit member shown in 14. In FIG. 15, the INDIV_ID field stores an identity transaction instance identification code, thereby linking the LINKLIST table or the INDIVDEAL table shown in FIG. 12 to the TCFCHAIN table, and realizing the process in step 4 of the current price evaluating operation described in 1.4 above. In FIG. 15, the TCFCHAIN_ID field stores a TCFChain instance identification code. Also in FIG. 15, the SIDE_ID field contains a receipt/payment side section code. Furthermore, the CFList attribute shown in 14 indicating the CashFlowLet link list is dynamically generated based on the values of the INDIV_ID field and the SIDE_ID field when the TCFChain instance is developed in the memory. Therefore, the field corresponding to the attribute does not exist in the TCFCHAIN table shown in 15.

Next, FIG. 16 shows the details of an attribute group stored as a class member group indicated within the frame of the TCF class shown on the right in 13, and defines necessary and sufficient items in performing each index calculation on the interest, earning rate, and price of cash flow element for each unit transaction period. FIG. 17 shows the data structure of each record in the TCF table corresponding to the TCF class stored in the RDB module shown in FIG. 5.

Using the class member name shown in FIG. 14 and the field name shown in FIG. 15, the same information is stored by the same spellings excluding the differences in upper and lower cases. In FIG. 17, the TCF_ID field stores the TCF instance identification code. In addition, in FIG. 17, the INDIV_ID field also stores an entity transaction instance identification code, and the TCFCHAIN_ID field stores the section code of the side (receipt side/payment side) of the TCFChain instance linked to the TCF instance. Thus, the LINKLIST table or the INDIVDEAL table shown in FIG. 12 is linked to the TCFCHAIN table, and the process in step 4 in the current price evaluating operation described in 1.4 above is realized. The TotalCF#PV attribute and the DF attribute shown in FIG. 16 are dynamically generated when the TCF instance is developed in the memory. Therefore, the field corresponding to the attribute does not exist on the TCF table shown in FIG. 17.

In FIG. 16, NotionalAmnt, NonIndexCF#FV, TotalCF#FV, and TotalCF#PV store not only the amount of money, but also the transaction amounts of shares and goods.

The specification of the TCF class is not limited to the class structure shown in FIGS. 13 and 16. For example, the can be a method in which the TCF class is a base class inherited by classes corresponding to the calculation of each index of an interest, earning rate, and price. That is, any method can be acceptable if a set of instances expresses various financial transactions.

2.3 Generating TCFSwap/TCFChain/TCF instances

The procedure of generating TCFSwap/TCFChain/TCF instances is classified into two types, that is, a formatted transaction and a non-formatted transaction.

The procedure of generating a formatted transaction is described below by referring to the explanatory chart shown in 18 and the process flowchart shown in FIG. 19.

Figure 18:
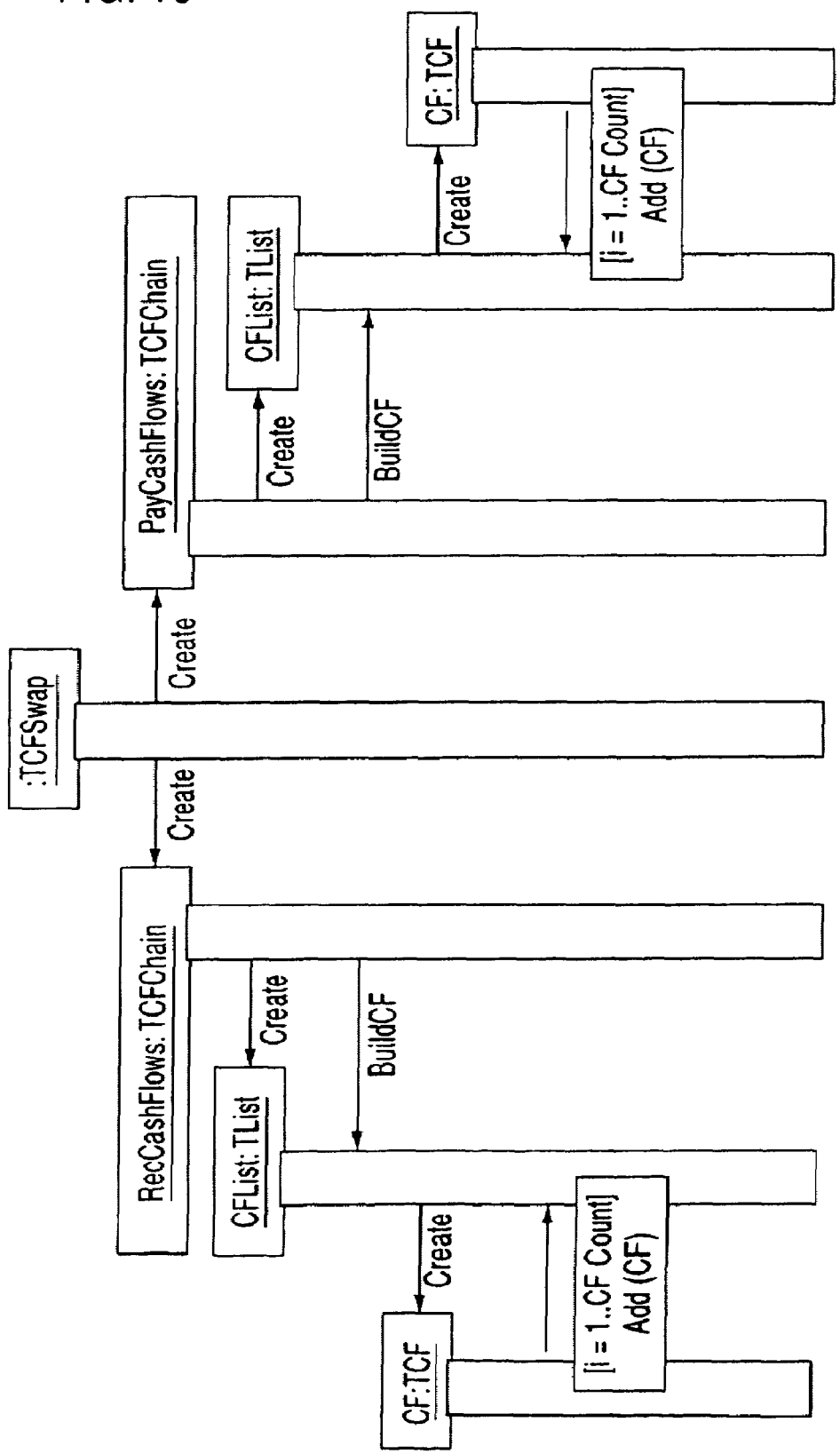
FIG. 18 shows the procedure of generating a TCFSwap instance.

First, the TCFSwap instance shown in FIG. 18 is generated by user specifying the generation of a cash flow type transaction through a user interface described later. Then, using the method of the TCFSwap instance, two TCFChain instances RecCashFlows and PayCashFlows shown in FIG. 18 are generated. Then, the constructor of each TCFChain instance generates the TList instance named 'CFList' shown in FIG. 18 and used as a link list to the link structure of the TCF instance (CashFlowLet) in each TCFChain instance.

Then, the user provides any necessary attribute values shown in FIG. 14 for the two TCFChain instances stored in the TCFSwap instance through the user interface described later.

Next, the user issues an instruction to execute the BuildCF method through the user interface described later. As a result, as shown in FIG. 18, one or more TCF instances are generated as necessary for two TCFChain instances, that is, RecCashFlows and PayCashFlows, and are linked (Add (CF)) to the link list CFList belonging to one of the two TCFChain instances.

Figure 19:
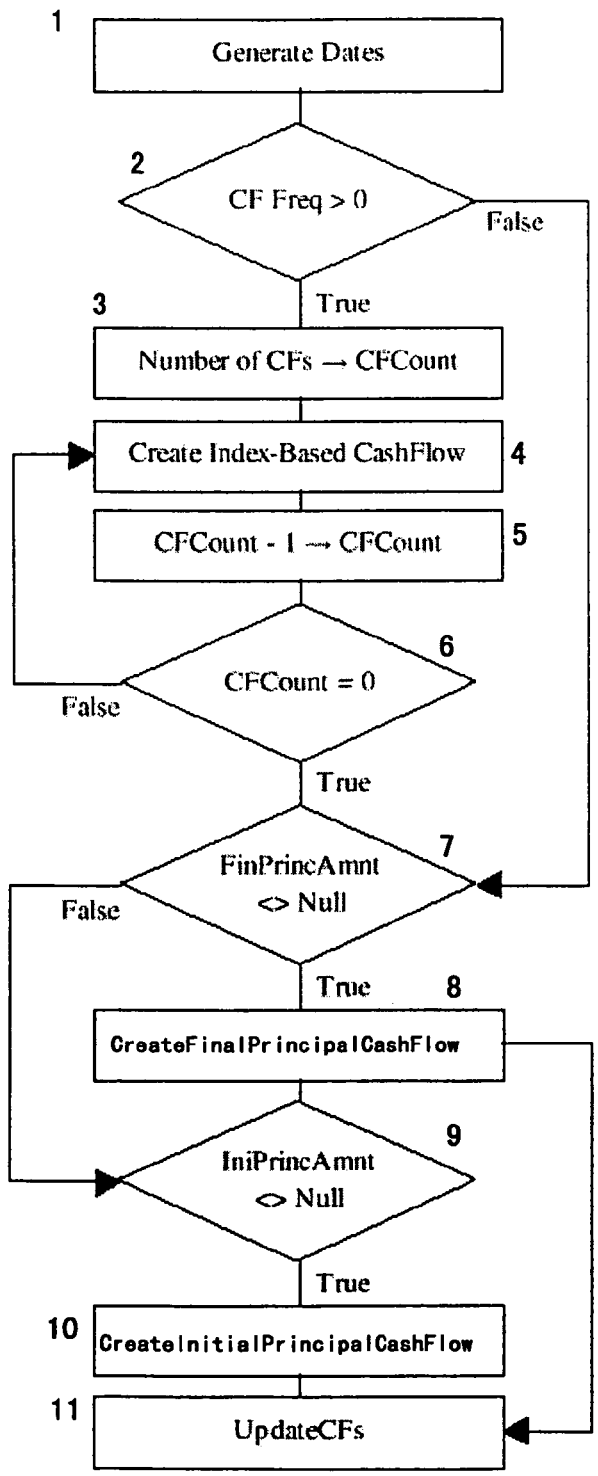
FIG. 19 is a flowchart of the process of the TCFChain.BuildCF method.

FIG. 19 shows the process flow of the BuildCF method issued to each TCFChain instance of the RecCashFlows and the PayCashFlows through the TCFSwap instance.

First, in the generate Dates process in step 1, the procedure of generating a date group required to process a transaction such as a receipt/payment date, calculation period start/end date, etc. Since the algorithm of generating the date group required to process financial transactions is well known, the details of the algorithm are omitted here. As the outline of the algorithm, the period information about each cash flow element is computed based on each attribute value (shown in FIG. 14) of PaymCenters, FixCenters, EDate, TDate, FDate, BDConv, EndEnd. AdjTDate, CFFeq, ResetFrq, FixingOffset, FixingBasis, and PayIn.

Next, in step 2, it is determined whether or not a value larger than 0 is set as a CF Freq attribute value shown in FIG. 14. The user sets a value larger than 0 as a receipt/payment frequency when a cash flow type transaction such as various swaps, etc. is generated in the user interface described later, and sets 0 as a receipt/payment frequency when other simple transactions such as an foreign exchange, etc.

When it is determined that the CF Freq attribute value is larger than 0 in step 2, each TCF instance corresponding to each CashFlowLet excluding the first and last CashFlowLets is generated in steps 3 through 6.

First, in step 3, the receipt/payment frequency (number of elements of CashFlowLets excluding the first and last CashFlowLets) is computed according to the period information generated in the Generate Dates process in step 1 and the receipt/payment frequency information (CF Freq attribute) set by the user, and the result is set in the member variable CFCount in the TCFChain class.

Next, in step 5, one or more TCF instances are generated in step 4 based on the attribute value set in the TCFChain instance and each of the index values until it is determined in step 6 that the value of the member variable CFCount has reached 0 while it is decreased by one at a time.

Actually, each attribute value (FIG. 14) of FloatIndex and NotionalAmnt of the TCFChain instance of the current side (receipt side or payment side) set by the user is set as each attribute value (FIG. 16) of FloatIndex and NotionalAmint of the newly generated TCF instance.

Next, each of the attribute values (FIG. 16) of DateFrom, DateTo, PreFixing, Fixing, Days, Years, and Paymdate is computed and set for the newly generated TCF instance based on the period information about each cash flow element generated in the Generate Dates process in step 1, and the value of the member variable CFCount of the TCFChain instance sequentially updated in step 5.

Then, each of the attribute values (FIG. 16) of IntRate or Margin of the newly generated TCF instance is set based on the IndexVal attribute value (FIG. 14) of the TCFChain instance of the current side (receipt side or payment side) set by the user. The default of the Weight attribute is 1, and can be individually amended using the magic sheet described later.

The attribute value NonIndexCF_FV (FIG. 16) of the newly generated TCF instance is set to 0.

The attribute value DF of the newly generated TCF instance is computed and set by following the GetFactor method of the DiscCurve instance corresponding to the attribute value DiscCurve (FIG. 14) of the TCFChain instance set by the user using the attribute value PaymDate set in the newly generated TCF instance as au argument.

Each of the attribute values of PrePrice, Price, Return, IndexCF_FV, MarginCF_FV, TotalCF_FV, and TotalCF_PV of the newly generated TCF instance is computed in the update procedure of the TCF instance described later.

The UpdateCF method of the newly generated TCF instance is a method for following the update procedure of the TCF instance described later.

All TCF instances to be linked to the TCFChain instance of the current side (receipt side or payment side) is generated by repeatedly performing in the loop process in steps 4 through 6 the operation of generating the above described TCF instance performed in step 4.

When it is determined in step 6, as a result of the above described loop process, that the value of the member variable CFCount is 0, or the attribute value CF Freq corresponding to the receipt/payment frequency set by the user in step 2 is 0, it is determined by the user in step 7 whether or not the attribute value FinPrincAmnt of the TCFChain instance is set (Null or not).

If the determination in step 7 is true, then the last TCF instance is generated in step 8. The generating method is generally the same as in step 4, but a process of setting the attribute value FinPrincAmnt (FIG. 14) of the TCFChain instance set by the user as a attribute value NonIndexCF_FV (FIG. 16) of the newly generated TCF instance is added.

If the determination in step 7 is false, then it is determined in step 9 whether or not the attribute value IniPrincAnmt of the TCFChain instance has been set by the user (Null or not).

If the determination in step 9 is false, it indicates an error (not shown in the attached drawings).

If the determination in step 9 is true, then the first TCF instance is generated in step 10. The generating method is generally the same as in step 4, but a process of setting the attribute value FinPrincAmnt (FIG. 14) of the TCFChain instance set by the user as a attribute value NonIndexCF_FV (FIG. 16) of the newly generated TCF instance is added.

In step 11 after step 8 or 10, the UpdateCFs method is followed by the TCFChain instance of the current side (receipt side or payment side). When the method is followed, an UpdateCF method (to be described later) for performing a current price evaluating operation is issued to all TCF instances linked to the TCFChain instance.

Since a number of inter-bank transactions are formatted, transaction objects can be easily generated by the user setting necessary parameters in the above described series of processes through a common user interface described later regardless of the type of cash flow transaction.

On the other hand, when the user requests to generate a non-formatted transaction, the attribute of the TCF instance group is easily amended or the TCF instance can be individually generated such that the feature of an object transaction can be reflected, and then the result is added to the TCFChain instance through the user interface referred to as a magic sheet described later after generating the TCFChain instance in the same procedure as in the case of the above described formatted transaction. In this case, after the amendment or addition, the user explicitly instructs to follow the above described UpdateCFs method.

The typical example of such a non-formatted transaction is an amortized/accumulation swaps that have no systematic schedule of notional principal. However, in this case, since regularity normally exists in the configuration of an interest payment date, a computation period, etc., the user only has to amend the attribute the TCF instance not corresponding to the rules after issuing the BuildCF method. Therefore, individually generating the TCF instance is limited to a transaction of extremely irregular cash flow configuration.

As described above, the TCFChain class functions as a template for automatically generating a set of a cash flow for a formatted transaction frequently used in actual financial transactions. The function of the TCFChain class is to collectively generate a set of TCF instances, and the attribute values stored therein are not used in the arithmetic operations for measuring risks. The TCFChain class can be considered a class for absorbing the difference in various transactions based on the exchanging in a cash flow.

3. Update Method of the TCF Instance

The Update method implemented for the TCF class has the function of performing a current price evaluating operation in a unit transaction period corresponding to the class.

This method is activated through the UPdateCFs method of the TCFChain class at an instruction to follow the GetNPVO method in the TVirtualContract instance or the TCFSwap instance when a user updates any parameter through the user interface described later and it becomes necessary to perform a risk management operation. That is, according to the present embodiment, a current price evaluating operation for each unit transaction period is performed independently by the Update method of the TCF class corresponding to each unit transaction period.

In this Update method, a current price evaluating operation is performed based on the future value index computed based on one of the three types of indices, that is, an interest, an earning rate, and a price in a unit transaction period, and an evaluation value independent of any of the indices of an interest, an earning rate, and a price. The present value obtained by multiplying the above described operation result by a predetermined discount rate is defined as a 1.5 result of the current price evaluating operation.

The feature of this method resides in that the update algorithm of the cash flow conventionally prescribed for each transaction type can be expressed by only the three type of indices, that is, an interest, an earning, and a price. When any of the indices is specified, a cash flow can be finally determined at a current price ratio of the DateFrom (calculation period starting date) and the DateTo (calculation period ending date).

The financial transactions for payment are not limited to currencies, but an foreign exchange, bonds, shares, commodities, etc. are acceptable. In this case, the above described Update method is used in computing the future value index by computing the current price ratio in accordance with the interest, earning rate, or price in the unit (for example, the number of shares) of the financial transactions for payment in the corresponding unit transaction period. That is, according to the present embodiment, the exchanging-based cash flow type transaction can be generally processed whatever unit of financial transactions is to be processed for payment.

Figure 20:
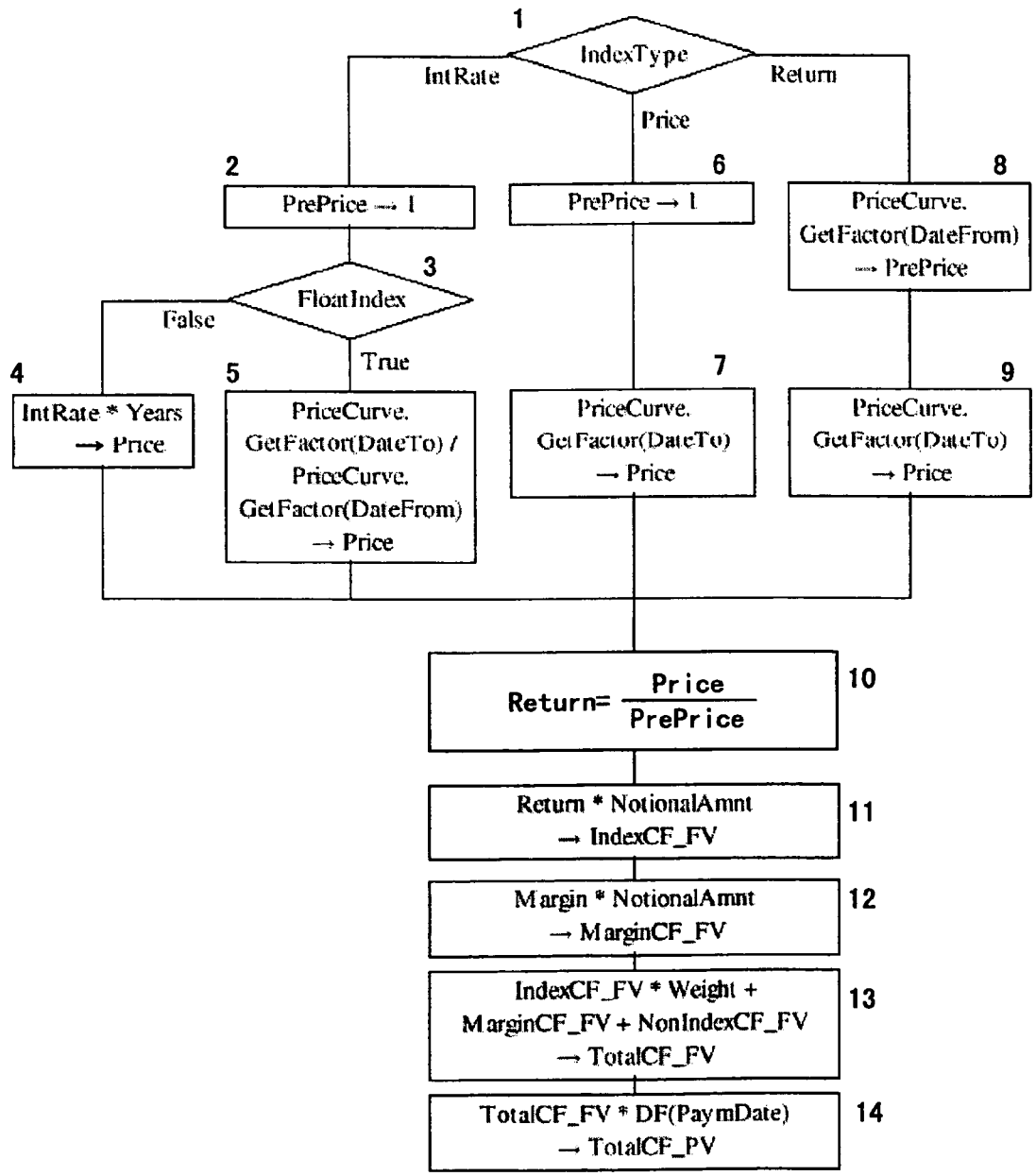
FIG. 20 is a flowchart of the process of the TCF.Update method.
Figure 24:
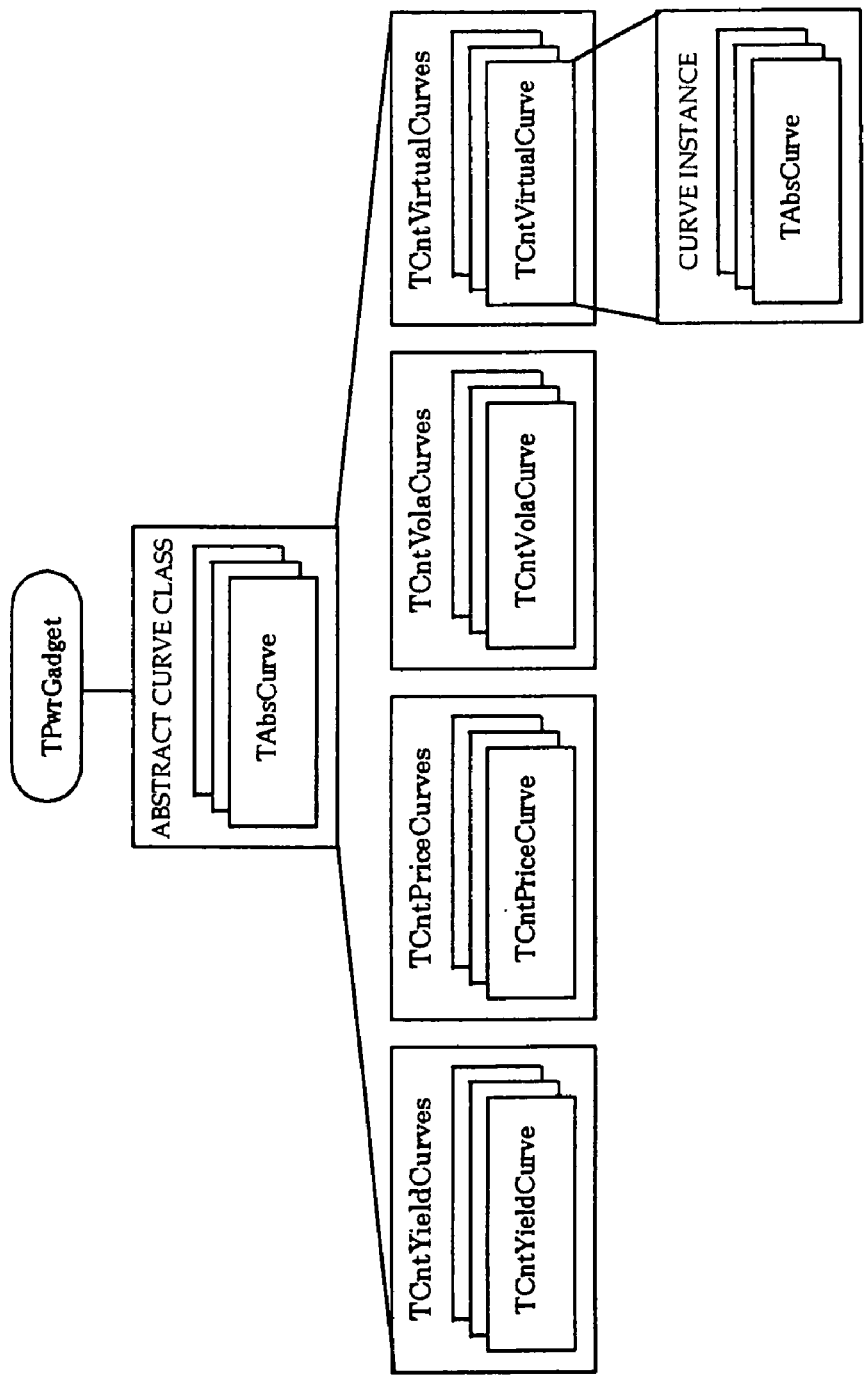
FIG. 24 shows the data structure of the TPwrGadget class.

FIG. 20 is a process flowchart of the Update method of one TCF class (hereinafter referred to as a current TCF class).

In step 1, it is determined whether the IndexType attribute value (FIG. 14) of the TCFChain class on the side to which the current TCF class specified by the user through the user interface described later belongs is an interest (IntRate), an earning rate (Return), or price (Price).

If it is determined that the IndexType attribute value is an interest (IntRate), then the previous term price index attribute value PrePrice (FIG. 16) of the current TCF class is set to 1 in step 2.

In step 3, it is determined whether or not the FloatIndex attribute value (FIG. 14) of the TCFChain class on the side to which the current TCF class belongs is set by the user through the user interface described later.

If the FloatIndex attribute value is not set, the IntRate attribute value is multiplied by the Years attribute value in the current TCF class in step 4, and the multiplication result is defined as the current price index attribute value Price of the current TCF class. The IntRate attribute value of the current TCF class is copied from the IndexVal attribute value (FIG. 14) of the TCFChain class on the side to which the current TCF class belongs. The IndexVal attribute value is set by the user through the user interface described later. In addition, the Years attribute value indicates the number of years of the unit transaction period (accounting period) corresponding to the current TCF class set for the current TCF class in step shown in FIG. 19. The Years attribute value is computed in the Generate Dates process in step shown in FIG. 19 based on each of the attribute values (FIG. 14) of the PaymCenters, FixCenters, EDate, TDate, FDate, BDConv, EndEnd, AdjTDate, CFFrq, ResetFrq, FixingOffset, FixingBasis, and PayIn, which are set by the user through the user interface described later, of the TCFChain class on the side to which the current TCF class belongs.

Thus, when the user specifies a fixed interest, then the value obtained by multiplexing the user-specified fixed interest value IntRate by the number of accounting-period years Years is defined as the current price index attribute value Price of the current TCF class. Then, in step 10, the value obtained by dividing the current price index attribute value Price of the current TCF class by the previous term price index attribute value PrePrice of the current TCF class is obtained by as the current price ratio attribute value Return (FIG. 16) in the current TCF class. In this case, since the previous term price index attribute value PrePrice of the current TCF class is set to 1 in step 2, the current price index attribute value Price of the current TCF class obtained by multiplying the user-specified fixed interest value IntRate by the number of accounting-period years Years of the current TCF class is defined as the current price ratio attribute value Return of the current TCF class.

On the other hand, if it is determined in step 3 that the FloatIndex attribute value is set by the user, then the value obtained by dividing the value of the price curve on the calculation period ending date DateTo of the current TCF class by the value of the price curve on the calculation period starting date DateFrom of the current TCF class is defined as the current price index attribute value Price of the current TCF class in step 5. The value of each price curve can be computed by invoking the GetFactor method of the PriceCurve instance (FIG. 13) referred to by the TCFChain class on the side to which the current TCF class belongs using the calculation period starting date DateFrom or the calculation period ending date DateTo as an argument. The price curve can be defined and specified by the user through the user interface described later.

Thus, when the user specifies a variable interest, the current price ratio of the price curve specified by the user in the unit transaction period (accounting period) corresponding to the current TCF class is defined as the current price index attribute value Price of the current TCF class. Then, in step 10, the value obtained by dividing the current price index attribute value Price of the current TCF class by the previous term price index attribute value PrePrice of the current TCF class is obtained as the current price ratio attribute value Return in the current TCF class. In this case, since the previous term price index attribute value PrePrice is set to 1 in step 2, the current price index attribute value Price of the current TCF class obtained as a current price ratio in the unit transaction period from the price curve is defined as the current price ratio attribute value Return of the current TCF class.

In step 2 described above, if it is determined that the IndexType attribute value specified by the user is an earning rate (Return), then the value of the price curve on the calculation period starting date DateFrom of the current TCF class is defined as the value of the previous term price index attribute value PrePrice of the current TCF class in step 8. The method of computing the price curve value is the same as in step 5 above.

Then, in step 9, the value of the price curve on the calculation period ending date DateTo of the current TCF class is defined as the value of the current price index attribute value Price. The method of computing the value the price curve is the same as in step 5 above.

Then, in step 10, the value obtained by dividing the current price index attribute value Price of the current TCF class by the previous term price index attribute value PrePrice of the current TCF class is obtained as the current price ratio attribute value Return. In step 1 above, if it is determined that the user specified IndexType attribute value is the price (Price), then the previous term price index attribute value PrePrice of the current TCF class is set to 1 in step 6.

Then, in step 7, the value of the price curve on the calculation period ending date DateTo of the current TCF class is defined as the value of the current price index attribute value Price. The method of computing the value of the price curve is the same as in step 5 above. Then, in step 10, the value obtained by dividing the current price index attribute value Price of the current TCF class by the previous term price index attribute value PrePrice of the current TCF class is obtained as the current price ratio attribute value Return. In this case, since the previous term price index attribute value PrePrice is set to 1 in step 6, the value of the price curve on the calculation period ending date DateTo of the current TCF class is defined as the current price ratio attribute value Return of the current TCF class.

As described above, the current price ratio attribute value Return in the unit transaction period of the current TCF class can be finally obtained whichever the user specifies among an interest, earning rate, and price.

Next, in step 11 shown in FIG. 20, the value obtained by multiplying the current price ratio attribute value Return computed as described above by the notional principal amount attribute value NotionalAmnt of the current TCF class is defined as the receipt/payment amount attribute value IndexCF_FV (FIG. 16) based on the index in the current TCF class. The notional principal amount attribute value NotionalAmnt in the current TCF class is copied from the notional principal amount attribute value NotionalAmnt, which is set by the user through the user interface described later, of the current TCF class on the side to which the current TCF class belongs.

Then, in step 12, the value obtained by multiplying the margin attribute value Margin in the current TCF class by the notional principal amount attribute value NotionalAmnt in the current TCF class is defined as the receipt/payment amount attribute value MarginCF_FV (FIG. 16) based on the margin in the current TCF class. The margin attribute value Margin of the current TCF class is copied from the IndexVal attribute value of the TCFChain class on the side (receipt or payment side) to which the current TCF class belongs. When the user specifies a variable interest for the side to which the current TCF class belongs through the user interface described later, a margin value can be specified as the IndexVal attribute value of the TCFChain class on the above described side.

In step 13, the value obtained by multiplying the receipt/payment amount attribute value IndexCF_FV based on the index in the current TCF class computed in step 11 by the weight attribute value of the current TCF class, the receipt/payment amount attribute value MarginCF_FV based on the margin computed in step 12, and the receipt/payment amount attribute value NonIndexCF_FV (FIG. 16) independent of the index of the current TCF class are added up, and the sum is defined as the total receipt/payment amount attribute value TotalCF_FV (FIG. 16) of the current TCF class. Although the default of the Weight attribute of the current TCF class is 1, the user can individually amend the value using the magic sheet which is the user interface described later. In addition, the receipt/payment amount attribute value NonIndexCF_FV independent of the index of the current TCF class is copied from the initial principal exchange amount IniPrincAmnt or the final principal exchange amount FinPrincAmnt, which is specified by the user through the user interface described later, of the TCFChain class on the side to which the current TCF class belongs (refer to step 8 or 10 shown in FIG. 19).

Last, in step 14, the total receipt/payment amount attribute value TotalCF_FV of the current TCF class computed in step 13 is multiplied by the discount factor attribute value DF (PaymDate), and the multiplication result is defined as the total receipt/payment amount present value TotalCF_PV (FIG. 16). The discount factor attribute value DF (PaymDate) of the current TCF class is preliminarily computed by invoking the GetFactor method of the DiscCurve instance (FIG. 13) referred to by the TCFChain class on the side to which the current TCF class belongs using the receipt/payment date attribute value PaymDate of the current TCF class when the current TCF class is generated (refer to steps 4, 8, and 10 shown in FIG. 19). It is a factor for use in discounting the total receipt/payment amount attribute value TotalCF_FV as a future value to the present value.

The computed total receipt/payment amount present value TotalCF_PV of the current TCF class is returned to the TVirtualContract instance or the TCFSwap instance as a return value of the GetNPV( ) method in the TVirtualContract instance or the TCFSwap instance through the UpdateCFs method of the TCFChain class.

In the GetNPV( ) method in the TVirtualContract instance or the TCFSwap instance, the total receipt/payment amount present value TotalCF_PV returned from the current TCF class belonging to each side is added on each side (receipt side and payment side), that is, for each TCFChain class. Each present value PV which is the sum on each side and a total present value NPV which is obtained by adding each of the present values are displayed on the user interface described later.

As described above, when the user amends any parameter through the user interface described later, a new present value can be immediately recomputed, thereby realizing efficient risk management.

The procedure of designing and generating a TCFSwap class for realizing cash flow type transactions has been described. The actual generation of an instance for cash flow type transaction is classified and described below.

As described above, the TCFSwap can generate most transactions in which cash flows are exchanged. However, it is necessary to classify the transactions to be processed depending on the basic characteristics when the transactions are actually generated.

The cash flow type transactions are classified as follows based on each characteristic.
1) Exchanging principal of different types
   In the explanation, the principal indicates NonIndexCF#FV set for the TCFChain class, that is, indicates a cash flow determined independently of indices.
2) Exchanging principals of the same type on a time axis
3) Exchanging a cash flow generated using indices of different types
4) Exchanging a cash flow generated using indices with a principal on a time axis FIG. 21 is a table showing the above described classification associated with the typical transactions in the market. On the table, the shares and forward goods transactions are displayed with the classification number 2 and 4, because these transactions can be expressed by either aspect.

Depending on the recognition of a transaction, other classification can be realized. The classification is not fixed, but can be variable as long as the features of each transaction can be effective. Furthermore, some transactions can be obtained as a combination of classes. Currency swaps, etc. correspond to this type of transaction, and can be expressed as a combination of classification numbers 1 and 3.

4. TOption Container Class for Realizing Option Type Transactions

Described below is the frame of the TOption container class as the fourth feature of the present invention.

4.1 Feature of the TOption Container Class

The cash flow type transaction expresses a number of transactions realized by diversifying the format of a set of simple cash flow elements (CashFlowLet). On the other hand, the option type transaction expresses transactions by diversifying a method. That is, the price evaluation (current price evaluation) of the cash flow type transaction can be defined in an integrated method while the option type transaction indicates a different price evaluation model for each transaction type, and also indicates different evaluation models even for the same transaction type.

Implementing different evaluation methods on each price evaluation model provides a virtual method for price evaluation for an abstract option class. An actual price evaluation method can be easily realized by implementing the virtual method in the entity class of an inheriting option.

The outstanding feature of the option class realized according to the present embodiment resides in the process of original assets. It is common that the entity class of an option is provided with an attribute of defining the original assets in addition to the attribute of the corresponding option. In this system, for example, the following option classes can be provided.

1) Black sholes model class for foreign exchange
2) Black sholes model class for shares
3) Black sholes model class for commodities That is, the 'original assets+evaluation model' defines one option class. On the other hand, according to the present embodiment, the original asset attribute is implemented in an abstract option class as a reference to a link list. That is, the abstract option class has the function of a container for storing any number of arbitrary original asset instances.

4.2 Data Structure of TOption Container Class

TOption refers to an abstract class inheriting the abstract contract class TContract (refer to FIGS. 5 and 8). FIG. 22 shows the structure and an instance image of the TOption. FIG. 23 shows the outline of each attribute and method.

In FIG. 22, the TOption instance stores a link list named 'Underlying' which refers to the structure of a list storing a set of TContract classes that are original asset classes.

The TOption instances store references to an instance of the TCntYirldCurve class named 'DiscCurve', and an instance of the TCntVolaCurve class named 'VolaCurve' inherited from the TPwrGadget class.

As clearly indicated in these figures and tables, the TOption instance stores an attribute essentially required as an option, and any number of arbitrary original asset instances (TContract), and after specifying any of the variable parameters of the original asset to be compared with a strike, instructs the original asset instance to perform a necessary arithmetic operation. A variable parameter refers to an index by which an interest, an earning rate, a price, etc. are multiplied, and a rate to be compared with the strike of an option such as an exchange rate, NPV, etc.

4.3 Advantage by Utilizing a TOption Container Class

The advantage by utilizing a TOption container class is the following two points.

4.3.1 Reduction of the Code Size and the Number of Classes
    4.3.2 High-Speed Simulation Each of the advantageous points is described below.

4.3.1 Reduction of the Code Size and the Number of Classes

Since the TOption instance can store any original asset instance at a run-time, a process is required to determine which is the parameters to be compared with the strike in the stored instances. When it is determined, the TOption instance invokes a GetA™ method for computing the at-the-money (hereinafter referred to as an ATM) level to be implemented in an instance of the original asset class. A resultant return value is passed to the parameter of the GetNPV method of the TOption instance, thereby terminating the execution of the price evaluating method.

Thus, the TOption class only instructs the original asset instance held by the TOption class to present an ATM level, and an actual ATM operation is performed by the original asset instance. It is important that the ATM level operation is not only required for the original asset of an option, but also is required when it independently exists (not held by the option instance) at the run-time of pricing, etc.

That is, the TOption instance can efficiently implement its own price evaluating method by utilizing a method preliminarily provided for the original asset instance.

In addition, the entity classes of the option inherited and implemented only has to be provided with an evaluation equation unique to its price evaluation model by implementing the procedure of obtaining an ATM level on the TOption. That is, it also can be assumed that these entity classes exist to present reference to a code area in which each price evaluating method is stored in memory. With the similar background, the classification described in 1) through 3) in 4.1 above is not required, but only a Black-Sholes class is required, thereby reducing the number of classes.

4.3.2 High-Speed Simulation

It is a common process of analyzing a risk of an option to set an evaluation date to a future point and the option value at the point is computed. According to the present embodiment, since a system of generating and holding an original asset instance when a TOption instance is generated is adopted, a high performance can be presented at a run-time of the above described future price simulation.

A problem with the above described simulation arises when a set future date comes when or after the corresponding option enters an in-the-money state. In this case, the price fluctuation analysis is not performed as an option, but, assuming that the right is effected, the price should be analyzed on a generated original asset.

At this time, in the system according to the present embodiment, since the original asset instance is preliminarily generated and held, the corresponding TOption instance only has to make the original asset instance outstand when the in-the-money state is entered. That is, in the out-of-the-money state, the original asset instance exists, but the current price of the instance is ignored, and is replaced with the current price of the TOption instance. When the in-the-money state is entered, the process of replacing the current price of the TOption instance with the current price of the original asset instance.

When this method is not adopted, it is necessary to follow the procedure of generating an original asset when the option enters the in-the-money state, thereby performing an operation with a heavy load. This is the advantage of the system according to the present embodiment.

5. Function of Defining a Financial Curve

As described above, the TCFChain instance or TOption instance belonging to the TCFSwap instance holds reference to each curve instance inherited from the TPwrGadget class, and the provided financial curve characteristic can be utilized (FIGS. 13 and 22).

The TPwrGadget class optionally defines, generates, and holds the information about the yield curve (TCntYieldCurve class), a price curve (TCntPriceCurve class), a volarity curve (TCntVolaCurve class), transaction units (TUnit class) such as currencies, goods, policies, etc., and a holiday exclusion city (TCenter class).

As described by referring to FIG. 13, the TCFChain container class storing a set of instances of the TCF class which is CashFlowLet holds reference to a TCntYieldCurve instance in a DiscCurve (discount curve), and a TCntPriceCurve instance in a PriceCurve (price curve), and obtains a discount factor and a price index on each request date by the GetFactor method implemented in the TCntYieldCurve and the TCntPriceCurve.

Furthermore, as described by referring to FIG. 22, the TOption class holds reference to the TCntYieldCurve in the DiscCurve (discount curve), and to the TCntVolaCurve instance in the VolaCurve (volarity curve), and obtains a discount factor and a volarity in the GatFactor method and the GetVola method.

In addition, in the TPwrGadget class according to the present embodiment, a 'virtual curve' method expressed in the container class TCntVirtualCurve in which any number of curve instances can be held is adopted. By providing a computing method for a virtual curve, a specific operation can be performed on a discount factor or a price index obtained in the GetFactor method of each curve instance held in a container (for example, averaging a price index). Thus, the present embodiment can also provide the function of combining a plurality of curve instances.

Although not shown in the attached drawings, the functions of combining the yield curve (TCntYieldCurve) with the Futures (TCntFuturesCurve), and the price curve (TCntPriceCurve) with the add-on (TCntAddOn) can also be added according to the present embodiment.

6. User Interface 6.1 Outline of User Interface

The present embodiment can provide a user interface capable of easily changing a parameter for risk management and displaying a simulation result.

In this embodiment, a new concept of providing an input form with the classification of 1) Cash Flows, and 2) options, and 3) Listed is adopted. For example, in the conventional system, an input form (or screen) has been provided for each transaction type such as a spot foreign exchange transaction, an foregn exchangey swap transaction, an interest rate swap transaction, etc. On the other hand, the present embodiment inputs these transactions through one interface for 'Cash Flows' transactions.

Unlike a common general management system in which operations are performed with more difficulty and with more complicated financial transactions, the user of the system is presented with excellent convenience that the user can access a desired form only by specifying the category of an object transaction.

6.2 Outline of the Procedure of Inputting a Cash Flow Transaction

First, in the following explanation, a 'left click' or a 'right click' refers to an operation of one clicking of the left or right mouse button. A 'left double click' refers to an operation of two quick clickings of the mouse button. 'Dragging and dropping the mouse from A to B' refers to pressing the left mouse button at the position A, moving the cursor to the position B with the button pressed, and releasing the pressed left button at the position B.

Figure 25:
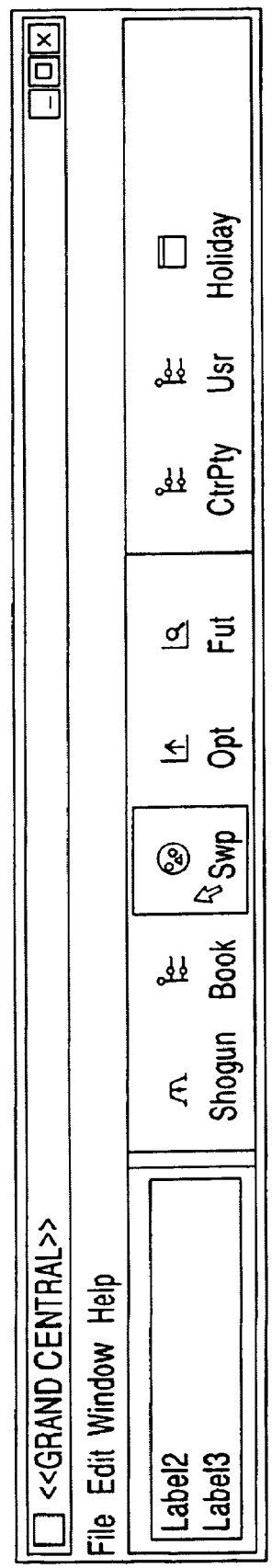
FIG. 25 shows an example of a screen of the main control panel.

FIG. 25 shows the main control panel according to the present embodiment.

Figure 26:
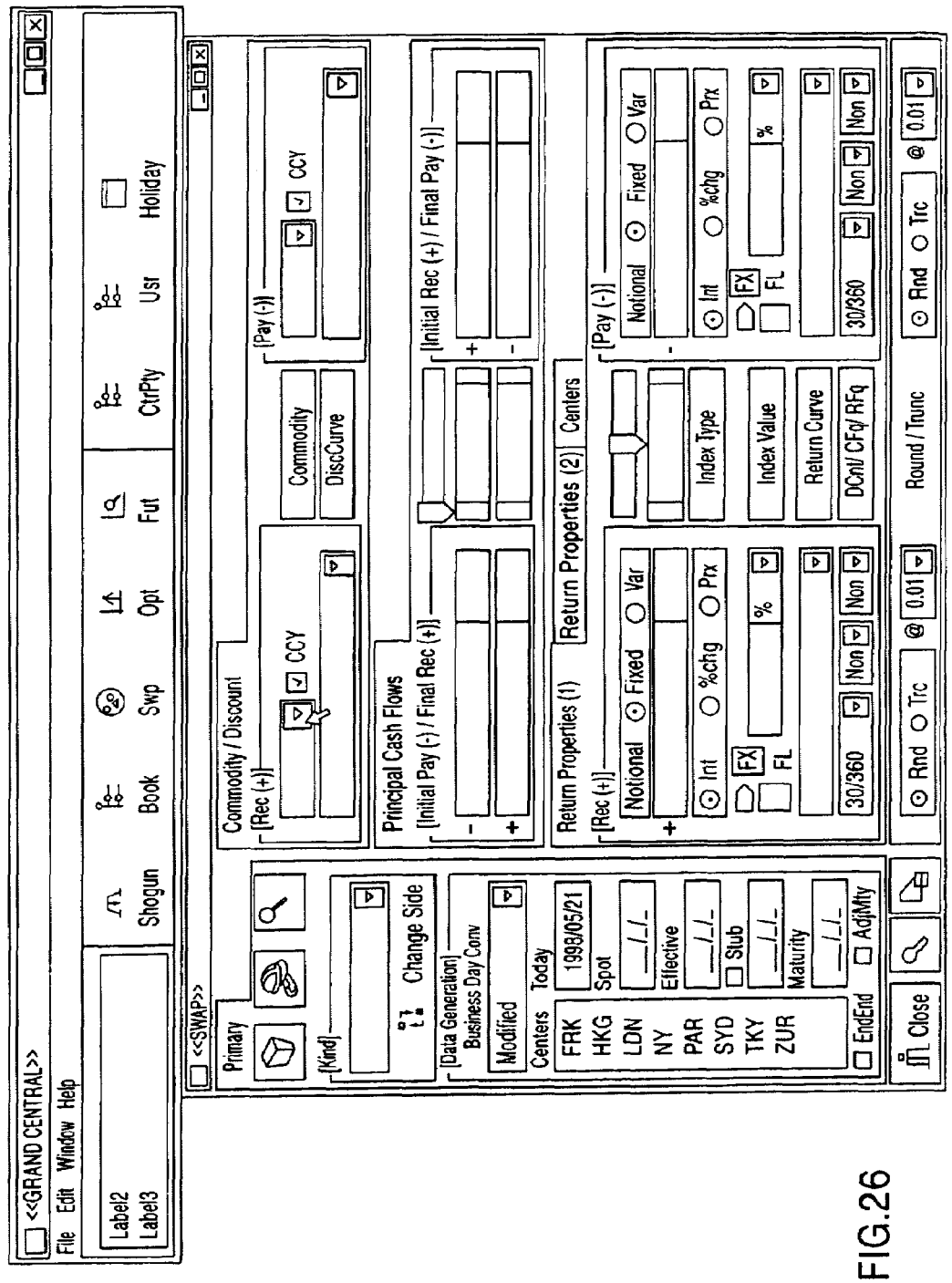
FIG. 26 show an example of an initial screen on which a cash flow transaction is processed.

FIG. 26 shows the initial window screen on which a cash flow transaction is processed.

Figure 27:
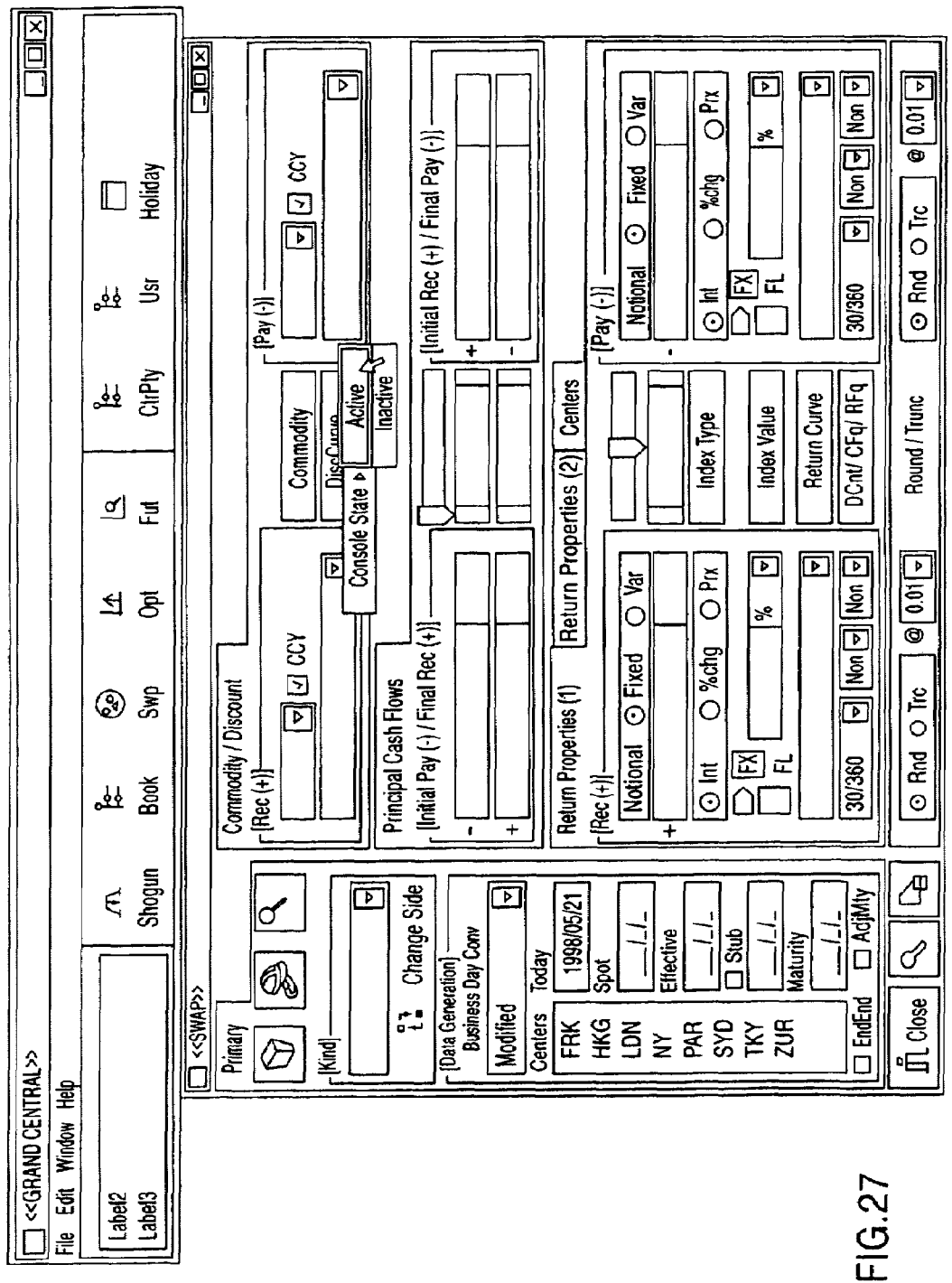
FIG. 27 shows an example (1) of a screen on which an interest rate swap transaction is processed.

FIG. 27 clearly emphasizes each portion shown in FIG. 26.

First, each tab area is described.

In a 'Primary' tab area, a parameter for use in prescribing a transaction type and generating a date is specified.

In a 'Commodity/Discount' tab area, a receipt/payment currency (or a unit of goods) and a discount curve are specified.

A 'Principal Cash Flows' tab area is used when the initial and final exchange principals of an foreign exchange, an foreign exchange swap, and a currency swap are input in the area where the amount of principal which is to be directly exchanged and is not related to a notional principal is specified.

In a 'Return Properties (1)' tab area, the basic conditions of a cash flow generated by multiplying a notional principal by any index of an interest, an earning rate, and a price is specified. According to the present embodiment, this cash flow is referred to as an 'IndexCF'.

In a 'Return Properties (2)' tab area, the extension conditions for processing a cash flow not processed in the 'Return Properties (1)' tab area are specified, and non-daily items such as a receipt/payment date and a price determination date are generated.

In a 'Centers' tab area, a holiday exclusion city to be referred to when a receipt/payment day and a price determination day are determined is specified independently between a reception side and a payment side.

Then, each of the icons, buttons, and fields in each of the above described tab areas is described below.

The object currently being generated can be deleted by dragging and dropping the mouse from the helmet icon in the 'Primary' tab area to the dust box icon in the area.

A transaction object can be designed and stored by a left double click on the helmet icon in the 'Primary' tab area.

A magic sheet indicating the details of a transaction object can be displayed by dragging and dropping the mouse from the shake-hands icon (a variation from the helmet icon but not shown in the drawings) to the magnifying glass in the 'Primary' tab area.

A list of transaction type definitions can be displayed by a left click on the list field in the 'Kind' area in the 'Primary' tab area, thereby selecting a defined transaction type. When a transaction type is selected, the necessary input fields on the form are highlighted, and the initial value is assigned in each field. The user can freely add and amend an invoked transaction type definition.

By a left click of the 'Change Side' button in the 'Primary' tab area, a group of parameters specified by the receipt side and the payment side described later can be collectively exchanged on both sides. For example, if the button is clicked when a parameter group of 'selling dollars/buying yen' is specified on the form, the 'buying dollars/selling yen' parameter setting state is entered.

In the 'Business Day Conv' field in the 'Data Generation' area of the 'Primary' tab area, a holiday exclusion system can be specified, and 'Modified', 'following', 'Preceding', or 'No Adust' can be specified. The set values are set as the BDConv attribute values (FIG. 14) of each TCFChain class on the receipt side and the payment side.

In the 'Centers' field in the 'Data Generation' area of the 'Primary' tab area, a holiday exclusion city can be displayed. The city information can be preliminarily defined by the 'TPwrGadget' function described later. The set value is set as a PaymCenters attribute value (FIG. 14) in each TCFChain class on the receipt side and the payment side.

In the 'Today' field in the 'Data Generation' area of the 'Primary' tab area, an evaluation base date (transaction date/today) can be specified.

In the 'Spot' field in the 'Data Generation' area of the 'Primary' tab area, a spot date (Spot Date/Settlement Date) can be specified.

In the 'Effective' field in the 'Data Generation' area of the 'Primary' tab area, an effective date can be specified. The set value is set as an EDate attribute value (FIG. 14) of each TCFChain class on the receipt side and the payment side.

In the 'Stub' field in the 'Data Generation' area of the 'Primary' tab area, the next receipt/payment date can be specified. The set value is set as an FDate attribute value (14) of each TCFChain class on the receipt side and the payment side.

In the 'Maturity' field in the 'Data Generation' area of the 'Primary' tab area, a termination date can be specified. The set value is set as a TDate attribute value (FIG. 14) of each TCFChain class on the receipt side and the payment side.

In the 'EndEnd' check box in the 'Data Generation' area of the 'Primary' tab area, an end-of-month roll specification can be designated. The set value is set as an EndEnd attribute value (FIG. 14) of each TCFChain class on the receipt side and the payment side.

In the 'AdjMty' check box in the 'Data Generation' area of the 'Primary' tab area, a termination date shift specification can be designated. The set value is set as an AdjTDate attribute value (FIG. 14) of each TCFChain class on the receipt side and the payment side.

Then, in the 'Commodity' field in the 'Rec(+)' area and the 'Pay(−)' area in the 'Commodity/Discount' tab area, a receipt/payment currency or a unit of goods can be specified. The currency or the unit can be preliminarily defined by the defining function ('PwrGadget' function) of the financial characteristic described later. The set value is set as an AppliedUnit attribute value (FIG. 14) of the TCFChain class corresponding to the receipt side or the payment L side (hereinafter referred to as a target side) corresponding to the 'Rec(+)' area or the 'Pay(−)' area.

In the 'DiscCurve' field in the 'Rec(+)' area and the 'Pay(−)' area in the 'Commodity/Discount' tab area, an yield curve for discount of a cash flow group in each of the receipt side and the payment side can be specified. In addition. when a target transaction id a spot exchange, and the evaluation base date set in the 'Today' field in the 'Data Generation' area of the 'Primary' tab area is today, a curve for discount from the spot date to today set in the 'Stub' field in the area can be specified. These curves can be preliminarily defined by the defining function ('PwrGadget' function) of the financial characteristic described later. The set value is set as a DiscCurve attribute value (FIG. 14) of the TCFChain class corresponding to the target side.

Then, the arrow gauge at the center of the 'Principal Cash Flows' tab area can prescribe the base currency side when a principal is exchanged. For example, when Rec: 'USD'/Pay: 'JPY' (buying dollars/selling yen) is specified, the dollar base is adopted as '1 USD=130.05JPY' if the 'Rec' is specified as the base side. On the other hand, if the 'Pay' is specified as the base side, then the yen base is adopted as '1JPY=0.0076894USD.

In the field in line 1 below the arrow gauge, the initial principal exchange rate is displayed, and the final term principal exchange rate is displayed in the field in line 2. Based on the gauge specification and the rate displayed in these fields, the amount of a currency based on the base currency is automatically computed.

In each field in line 1 of the 'Initial: Pay(−)/Final: 'Rec(+)' area and the 'Initial: Rec(+)/Final: 'Pay(−)' area in the 'Principal Cash Flows' tab area, an actual amount of a principal to be exchanged (initial principal exchange amount) on the effective date set in the 'Effective' field in the 'Data Generation' area of the 'Primary' tab area can be specified for exchange swaps and currency swaps. The set value is set as an IniPrincAmnt attribute value (FIG. 14) of the TCFChain corresponding to the target side.

In each field in line 2 of the 'Initial: Pay(−)/Final: 'Rec(+)' area and the 'Initial: Rec(+)/Final: 'Pay(−)' area in the 'Principal Cash Flows' tab area, an actual amount of a principal to be exchanged (final principal exchange amount) on the maturity date set in the 'Maturity' field in the 'Data Generation' area of the 'Primary' tab area can be specified for exchange swaps and currency swaps. The set value is set as an FinPrincAmnt attribute value (FIG. 14) of the TCFChain corresponding to the target side.

Next, the arrow gauge at the center of the 'Return Properties (1)' tab area prescribes the base currency side at the exchange of a notional principal when a coupon swap, etc. is input. The function is the same as in the case of the arrow gauge at the center in the 'Principal Cash Flows' tab area.

In the field of the above described arrow gauge, a notional principal exchange rate is displayed. Based on the above described gauge specification and the rate displayed in these fields, the amount of a currency based on the base currency is automatically computed.

Using each 'Notional' radio button in the 'Rec(+)' area and the 'Pay(−)' in the 'Return Properties (1)' tab area, a notional principal definition of either the fixed principal system ('Fixed': 'Fixed Notional Principal') or the variable principal system ('Var': 'Variable Notional Principal') can be specified. The set value is set as a VarNotional attribute value (FIG. 14) of the TCFChain class corresponding to the target side.

In the 'Notional' field in the 'Rec(+)' area and the 'Pay(−)' in the 'Return Properties (1)' tab area, the notional principal amount can be specified when the plain vanilla transaction is processed, and the initial notional principal can be specified when the notional principal is not constant. The set value is set as a NotionalAmnt attribute value (FIG. 14) of the TCFChain class corresponding to the target side.

Using each 'IndexType' radio button in the 'Rec(+)' area and the 'Pay(−)' in the 'Return Properties (1)' tab area, an index of an interest ('Int'), an earning rate ('% chg'), or a price ('Prx') can be defined. The set value is set as an IndexType attribute value (FIG. 14) of the TCFChain class corresponding to the target side.

In each 'Index/Value' field in the 'Rec(+)' area and the 'Pay(−)' in the 'Return Properties (1)' tab area, an index value and its unit ('%', 'bp', 'dec') can be specified. The set value is set as an IndexVal attribute value and an IndexUnit attribute value (FIG. 14) of the TCFChain class corresponding to the target side.

Each gauge on the left side of each of the above described 'Index/Value' fields can specify either the fixed ('FX') or the variable ('FL') index definition. The set value is set as a FloatIndex attribute value (FIG. 14) of the TCFChain class corresponding to the target side.

In each 'ReturnCurve' field in the 'Rec(+)' area and the 'Pay(−)' in the 'Return Properties (1)' tab area, a forward price curve or an yield curve in each of the receipt side and the payment side can be specified. The forward price curve is specified when a transaction such as 'Forward Forex', 'Equity Swaps', 'Commodity Swaps', etc. is defined. The yield curve is specified when a transaction such as 'Interest Rate Swaps', etc. is defined. These curves can be preliminarily defined by the defining function ('PwrGadget' function) of the financial characteristic described later. The set value is set as a PriceCurve attribute value (FIG. 14) of the TCFChain class corresponding to the target side.

In each of the 'D-Cnt+C/R-Frq' field group in the 'Rec(+)' area and the 'Pay(−)' in the 'Return Properties (1)' tab area, a daily value computation system ('Act/360', 'Act/365Fixed', 'Act/Act', '30/360', '30E/360'), a receipt/payment frequency (payment intervals), and a reset frequency can be specified. The set value is set as a DayCount attribute value, a CFFrq attribute value, and a ResetFrq attribute value (FIG. 14) of the TCFChain class corresponding to the target side.

In the 'Round/Trunc' field group, a rounding-off ((Rnd')/ truncation ('Trc'), and their effective digits can be specified. The set value is set as a Rounding attribute value and a DecPlaces attribute value (FIG. 14) of the TCFChain class corresponding to the target side.

FIG. 27 shows the activation of necessary parameters. First, after a left click on the key icon at the lower left on the screen, a right click is made on a desired parameter, a left click is made on the 'Active' property, and then the result is checked. A large number of portions are made active for interest rate swaps.

6.3 Procedure of Generating Interest Rate Swaps

In this step, interest rate swaps which refer to exchange between yen and yen in the cash flow, that is, yen/yen swaps are performed.

First, a currency is selected in each 'Commodity' field in the 'Rec(+)' area and the 'Pay(−)' in the 'Commodity/Discount' tab area at the upper half on the screen.

Then, in the 'DisCurve' field in each area, 'LIBOR&SWAP' is specified as an yield curve characteristic corresponding to the selected currency.

Then, In each 'ReturnCurve' field in the 'Rec(+)' area and the 'Pay(−)' in the 'Return Properties (1)' tab area at the lower half on the screen, 'LIBOR&SWAP' is specified as a return curve characteristic. The return curve is a forward cash flow, that is, the base in computing the future interest.

In each 'D-Cnt+C/R-Frq' field group in the 'Rec(+)' area and the 'Pay(−)' in the 'Return Properties (1)' tab area, each value is set according to the market convention.

Figure 28:
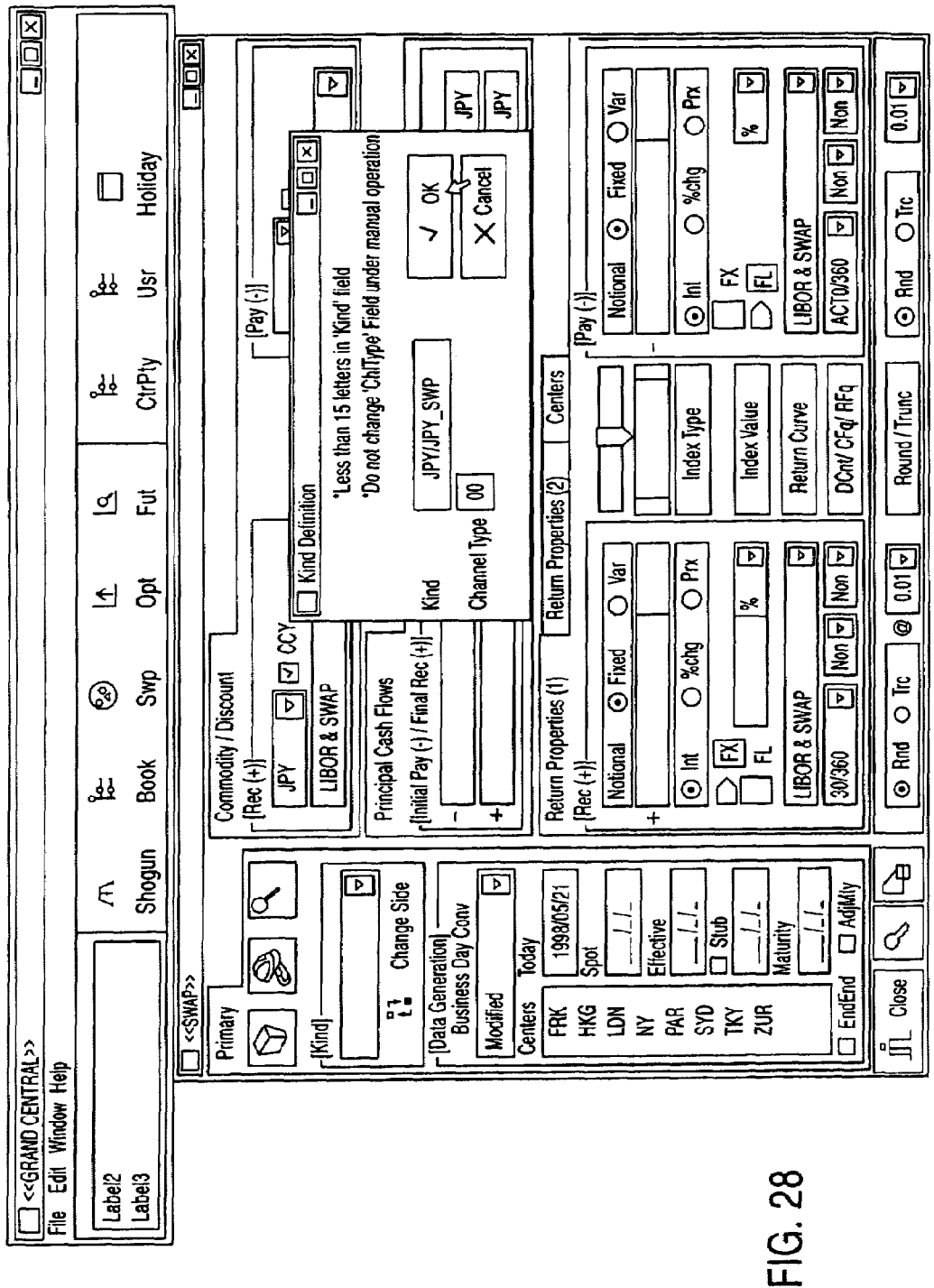
FIG. 28 shows an example (2) of a screen on which an interest rate swap transaction is processed.

Thus, the generated parameter set can be assigned a name using a dialog box displayed by a left click on the icon to the right of the key icon at the lower left on the screen as shown in FIG. 28. In this example, for example, the name 'JPY/JPY#SWP' is assigned. This name is entered in the list field in the 'Kind' area of the 'Primary' tab area at the upper left on the screen. Afterwards, when the name is selected, the corresponding parameter set can be invoked.

Figure 29:
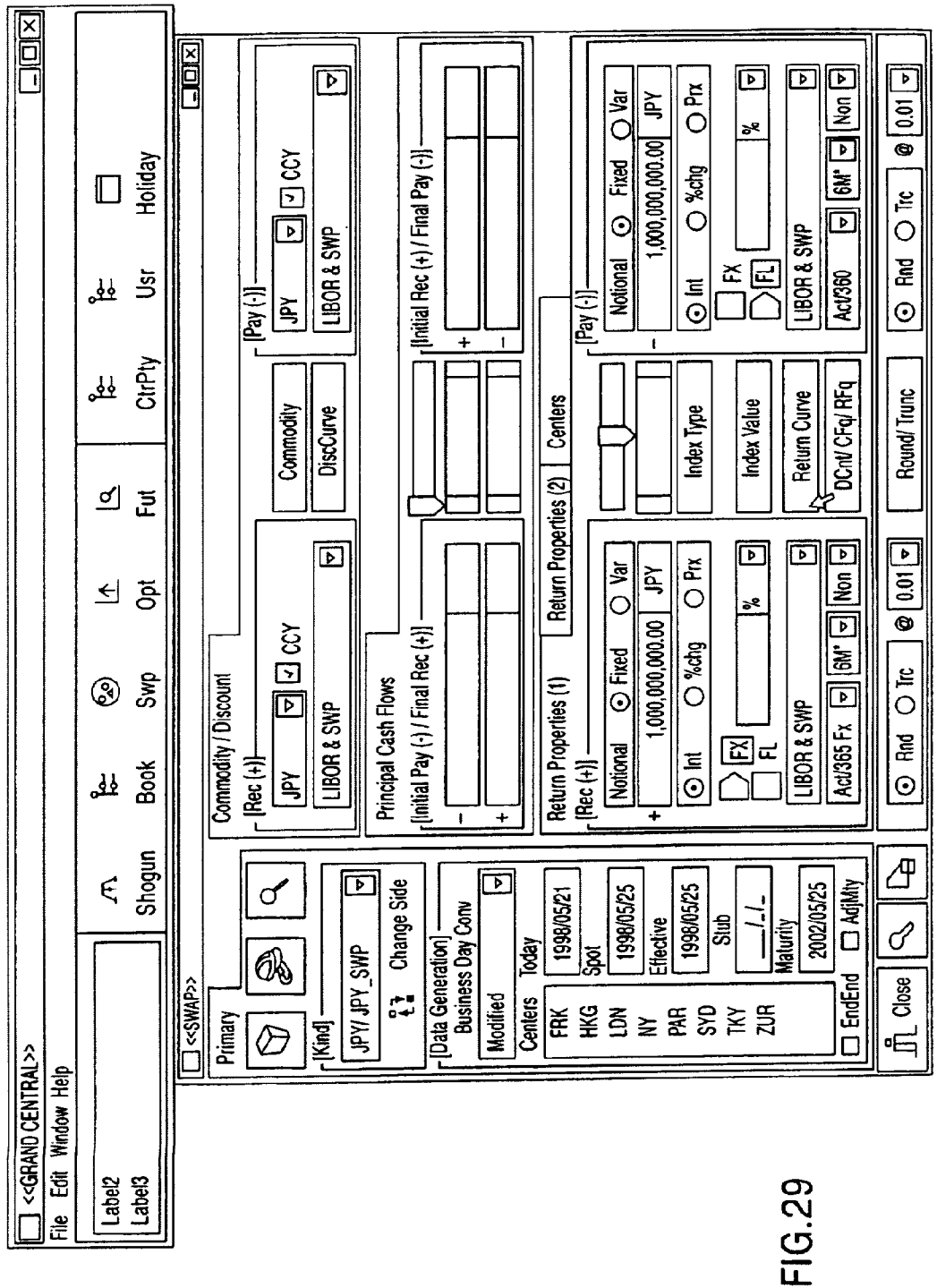
FIG. 29 shows an example (3) of a screen on which an interest rate swap transaction is processed.

Now, 4-year-term interest rate swap goods are generated. First, as shown in FIG. 29, the 'Today' field, 'Spot' field, 'Effective' field, and 'Maturity' field in the 'Data Generation' area at the left on the screen are sequentially set.

Figure 30:
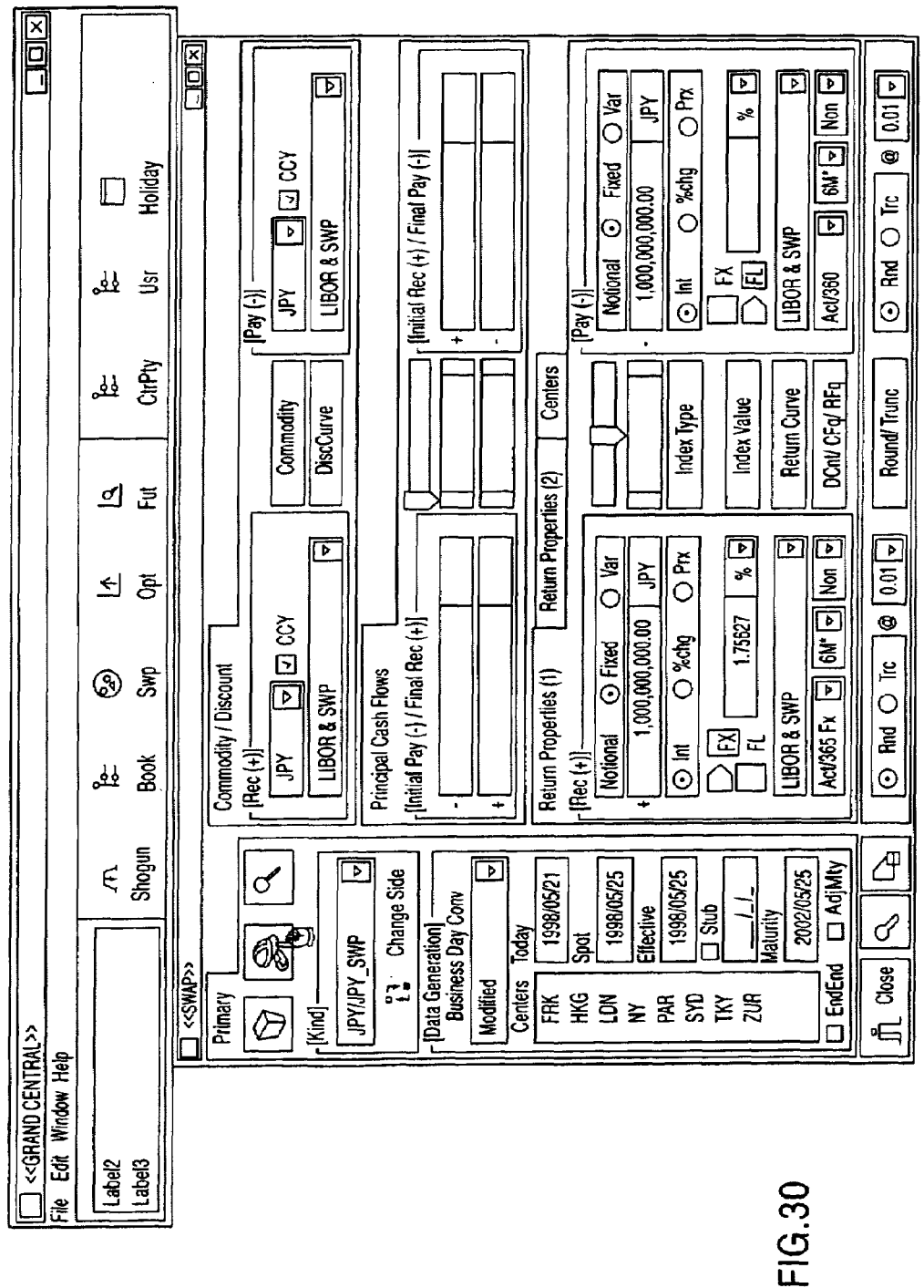
FIG. 30 shows an example (4) of a screen on which an interest rate swap transaction is processed.

Then, as shown in FIG. 30, In each 'Notional' field in the 'Rec(+)' area and the 'Pay(−)' in the 'Return Properties (1)' tab area at the lower half on the screen, 1,000,000,000 Japanese Yen is set.

In addition, based on the fixed rate (fixed interest) (selecting 'FX' in the 'Rec(+)' area of the 'Return Properties (1)' tab area), the interest rate swap by paying a float (selecting 'FL' in the 'Pay(−)' area) is set. In this case, in each 'Index/Value' field in the 'Rec(+)' area in the 'Return Properties (1)' tab area, the pricing of, for example, 1.75527% is set as a fixed rate. This means the PB of the payment amount equals the PB of the receipt amount in the transaction if the 'LIBOR' rate for the future 4 year float is paid and, in return, the fixed interest of 1.75527% is received.

Figure 31:
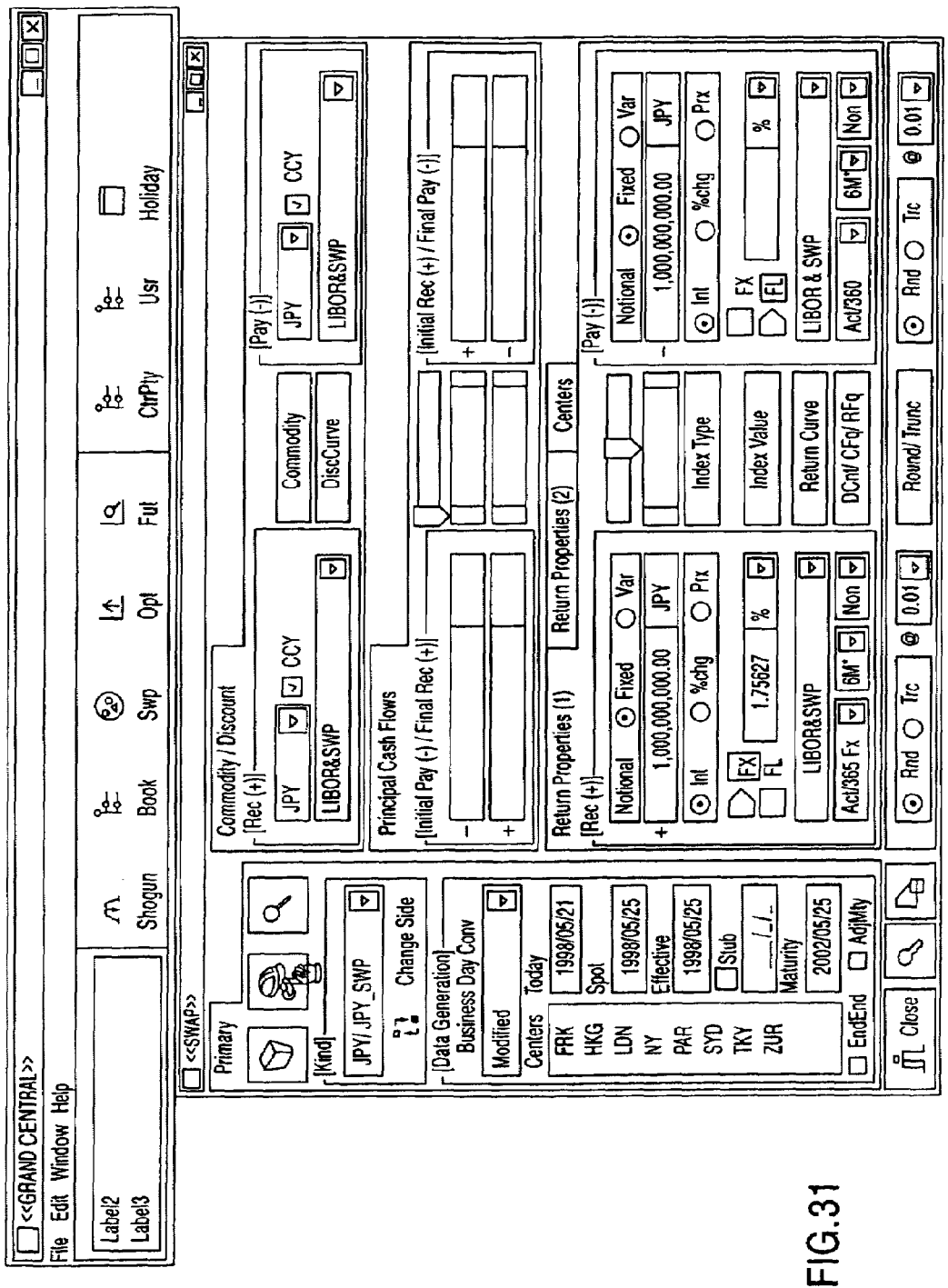
FIG. 31 shows an example (5) of a screen on which an interest rate swap transaction is processed.

Then, by a left double click on the helmet icon in the 'Primary' tab area at the upper left on the screen shown in FIG. 30, the icon changes into the shake-hands icon as shown in FIG. 31, and the cash flow object can be set for the above defined swaps. In this example, the procedure of generating the TCFSwap/TCFChain/TCF instance described in 2 and 3 above is followed.

Figure 32:
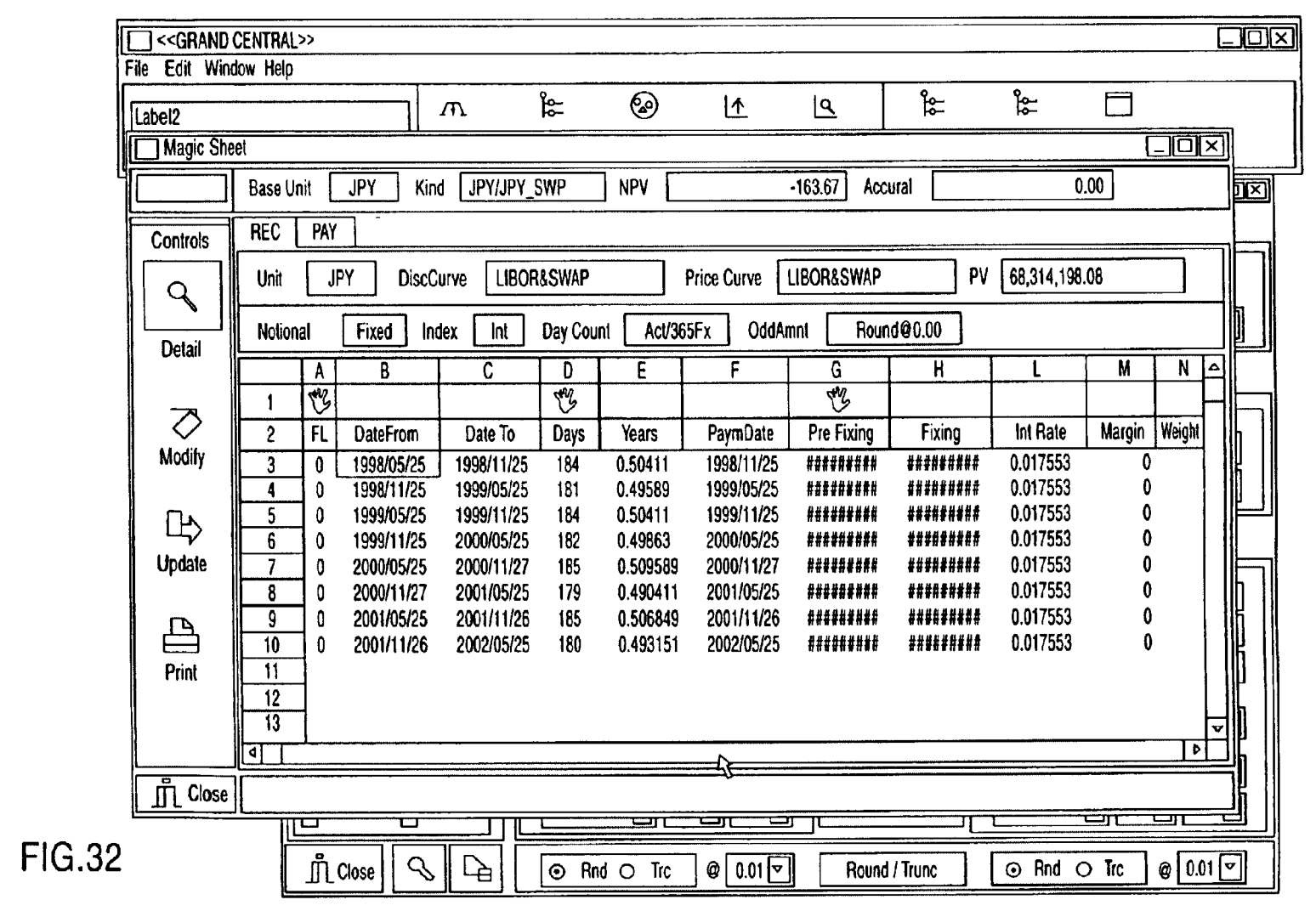
Figure 33:
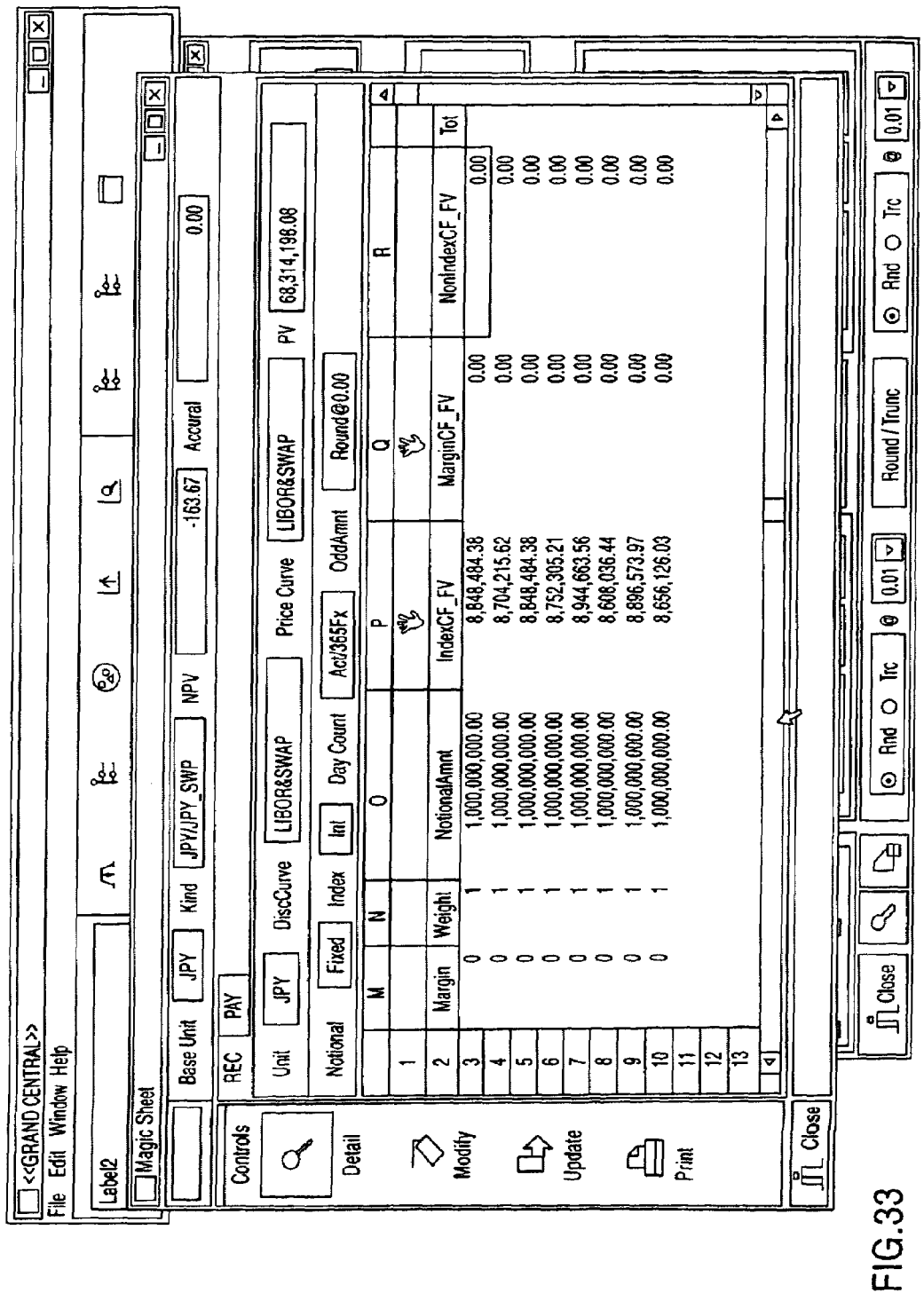
FIG. 33 shows an example (7) of a screen on which an interest rate swap transaction is processed.
Figure 34:
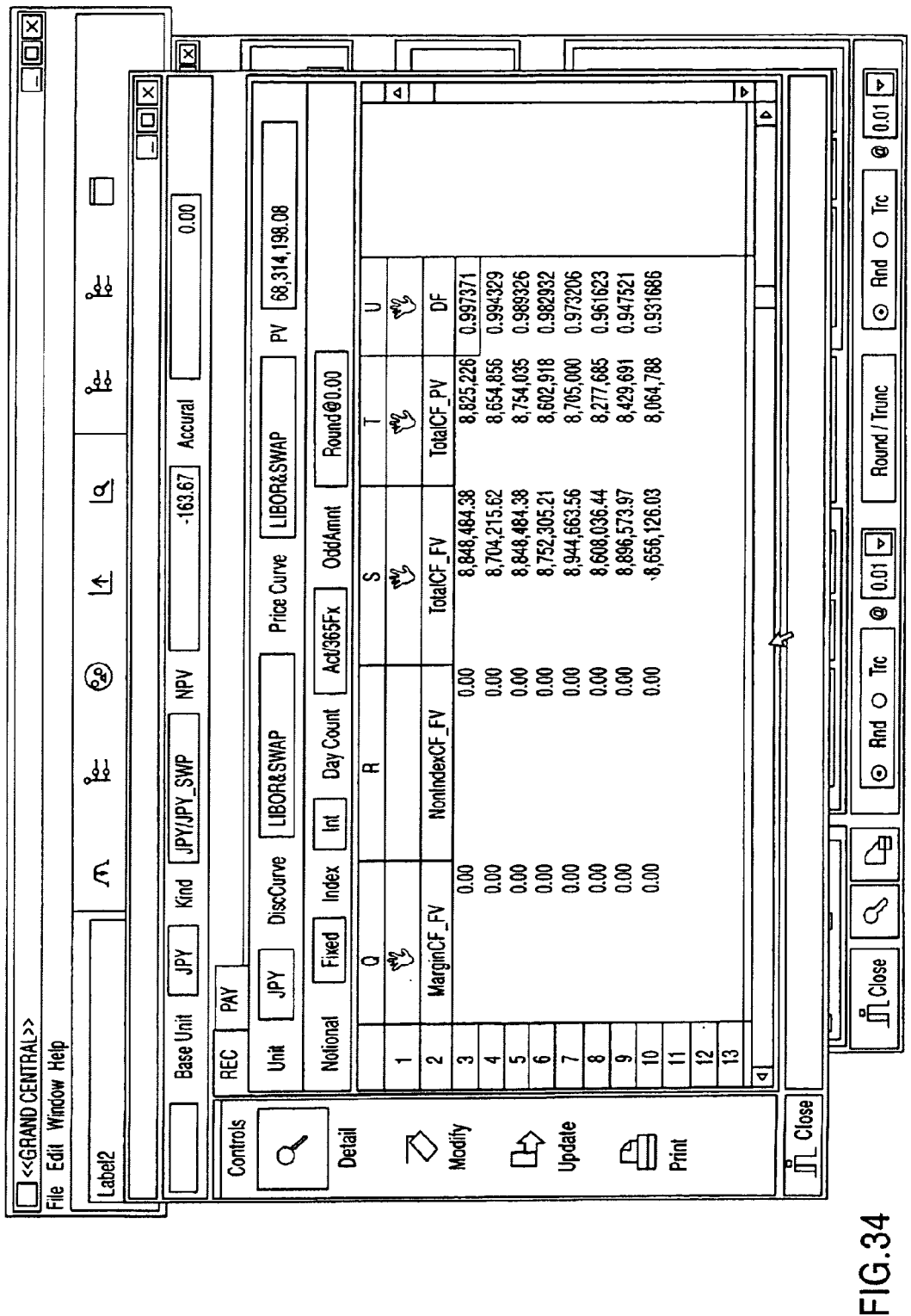
FIG. 34 shows an example (8) of a screen on which an interest rate swap transaction is processed.

The details of the cash flow object can be confirmed and changed through the magic sheet displayed as shown in FIGS. 32 through 34 by dragging and dropping the mouse from the shake-hands icon to the magnifying glass icon in the 'Primary' tab area at the upper left on the screen shown in FIG. 31. In each area of the 'REC' tab and the 'PAY' tab, the details can be confirmed and amended for each cash flow period within a specified period (four years in this example) on the receipt side and the payment side.

Each line displayed here corresponds to each TCF instance referred to from the TCFChain instance corresponding to each of the receipt side and the payment side. Each field in each line corresponds to each attribute value (refer to FIG. 16) held by each TCF instance. When a field has no hand mark added in line 1, the value can be updated for new pricing. For example, when a value of the 'NotionalAmnt' field (equivalent to the "Notional" field) is changed, and the 'Update' icon is left-clicked, a new pricing is performed. In this case, the update method of the TCF instance described in 3 above is followed.

Figure 35:
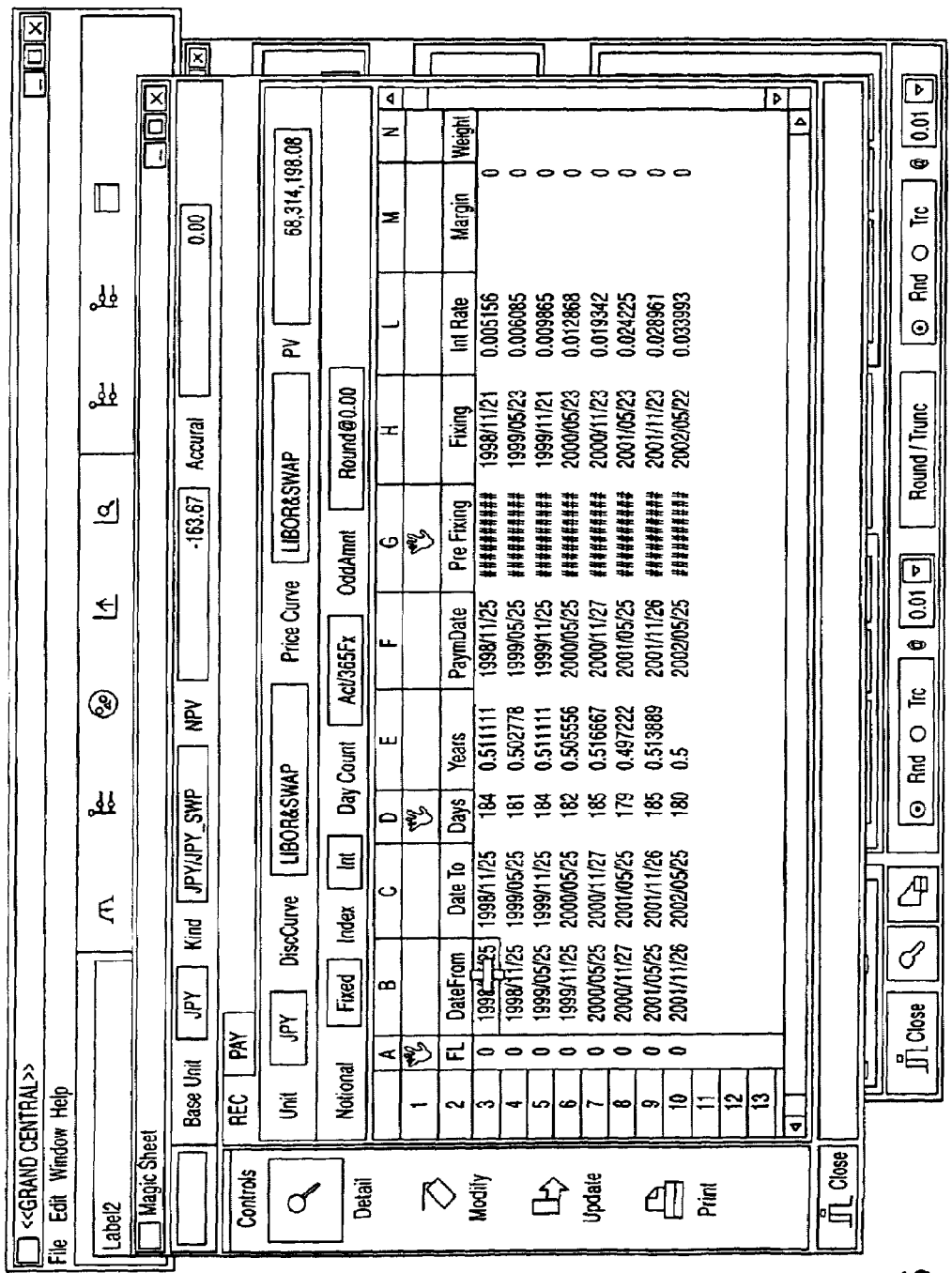
FIG. 35 shows an example (9) of a screen on which an interest rate swap transaction is processed.

In FIGS. 32 through 34, a magic sheet of the 'REC' tab area on the receipt side is displayed. In FIG. 35, a magic sheet of the 'PAY' tab area on the payment side is displayed.

6.4 Procedure of Generating Equity Swap Transactions

Figure 36:
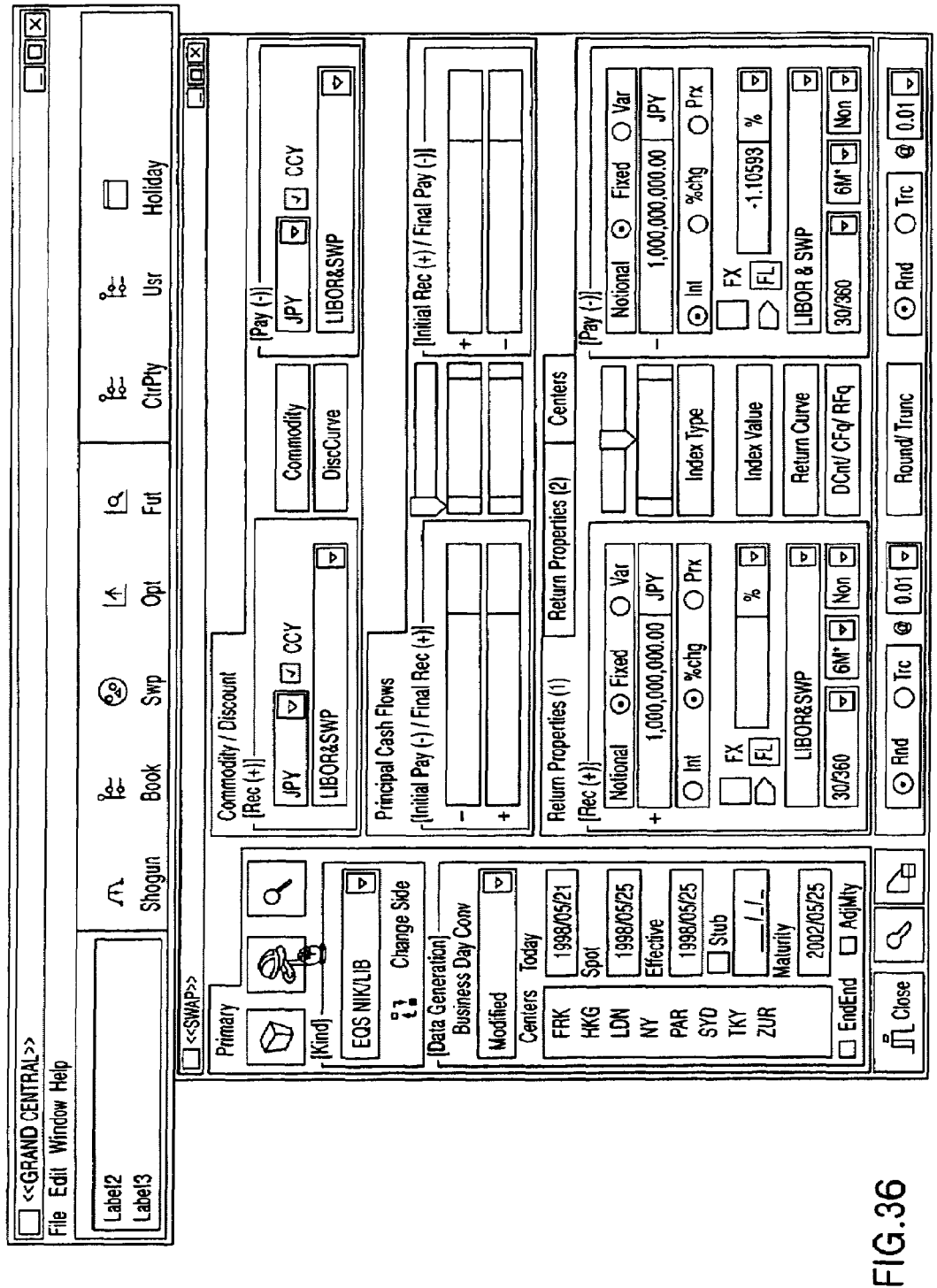
FIG. 36 shows an example (1) of a screen on which an equity swap transaction is processed.

Next, an equity swap transaction is generated. FIG. 36 shows an example of the setting screen. In this example, at the float rate (variable interest) depending on the 'Nikkei Forward', which is a return curve characteristic set in the 'ReturnCurve' field (selecting the 'FL' in the 'Rec(+)' area of the 'Return Properties (1)' tab area), the swap in which the floating 'LIBOR' rate (similarly selecting the 'FL' in the 'Pay(−)' area) is paid is set. In this case, in each 'Index/Value' field in the 'Pay(−)' area in the 'Return Properties (1)' tab area, a margin rate of, for example, −1.10993% can be set for pricing.

Figure 37:
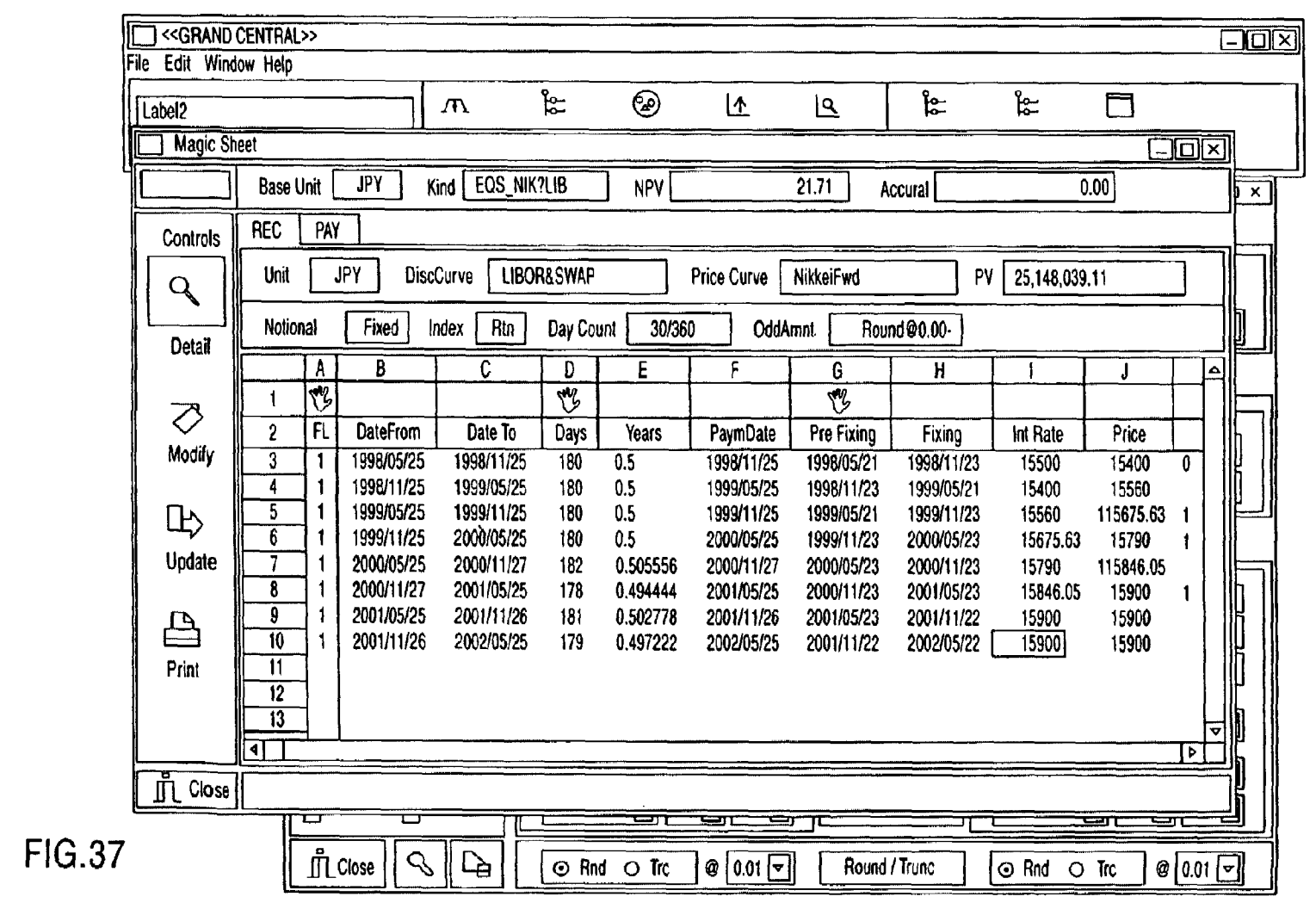

FIG. 37 shows a magic sheet of the equity swap object generated as described above. In this example, each value of the 'PrePrice' field can be computed based on the return curve characteristic 'Nikkei Forward' (refer to step 8 shown in FIG. 20).

6.5 Procedure of Generating Foreign Exchange Transactions

Figure 38:
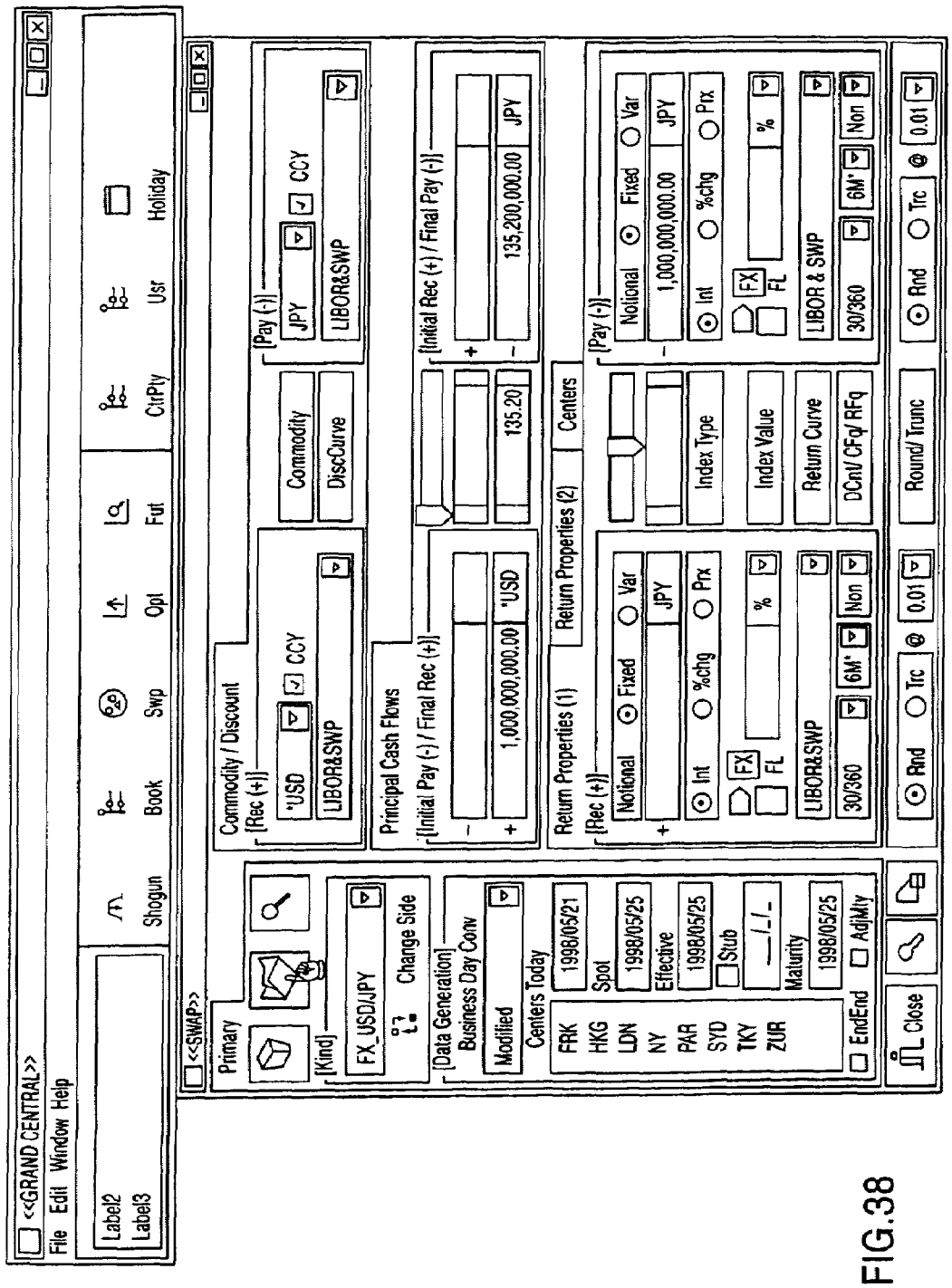
FIG. 38 shows an example (1) of a screen on which an foreign exchange transaction is processed.

Then, foreign exchange transactions are generated. FIG. 38 shows a screen on which foreign exchange transactions are generated. In this example, the US dollars set in the field (final principal exchange amount field) in line 2 of the 'Initial: Pay(−)/Final: 'Rec(+)' area are to be bought. When a left double click is made on the no-name field at the center of the 'Principal Cash Flows' tab area, the current exchange rate is displayed. If the rate is acceptable, the amount in Japanese Yen set in the field (final principal exchange amount field) in line 2 of the 'Initial: Rec(+)/Final: 'Pay(−)' area in the 'Principal Cash Flows' tab area is to be paid.

Figure 39:
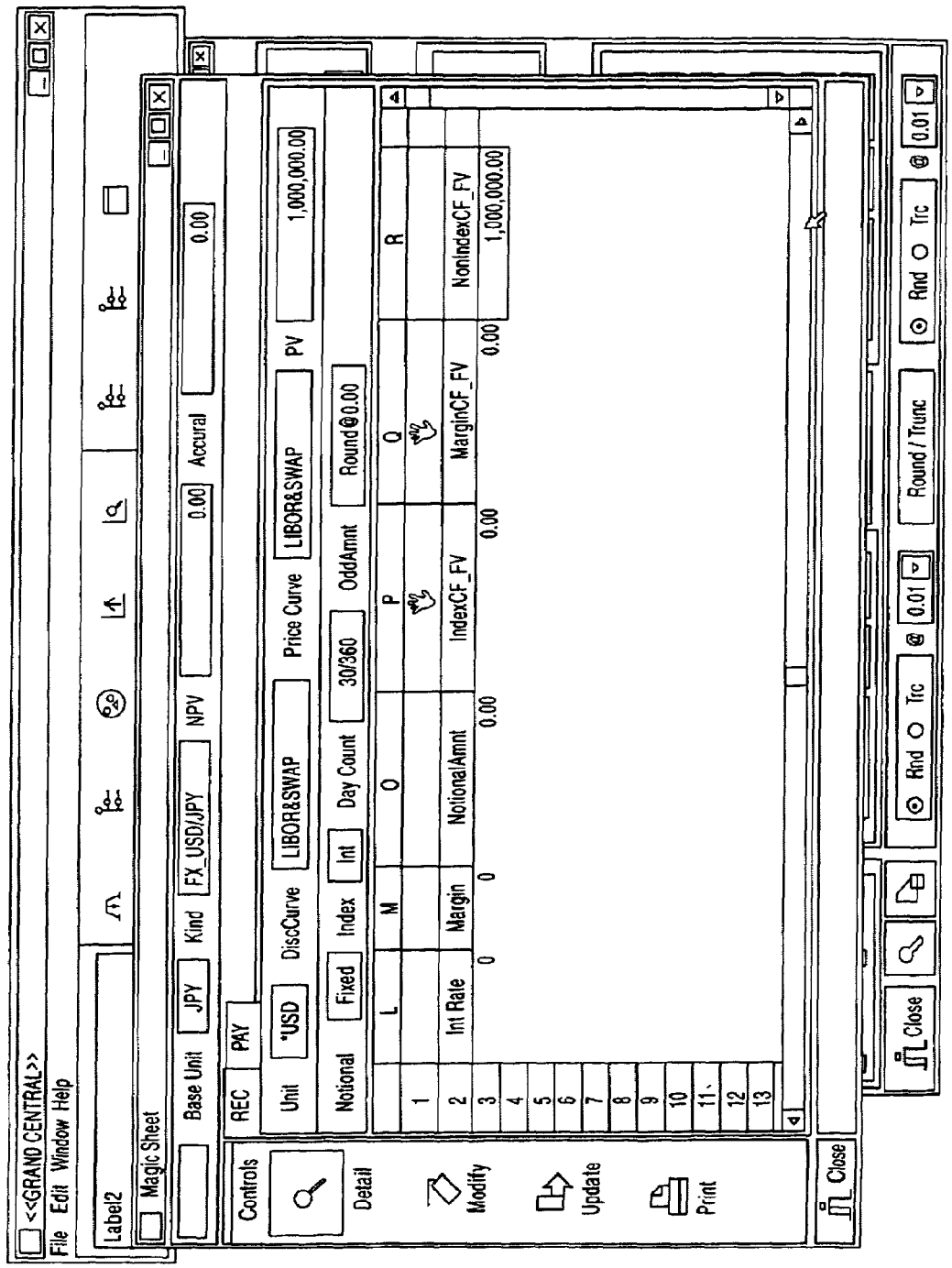
FIG. 39 shows an example (2) of a screen on which an foreign exchange transaction is processed.
Figure 40:
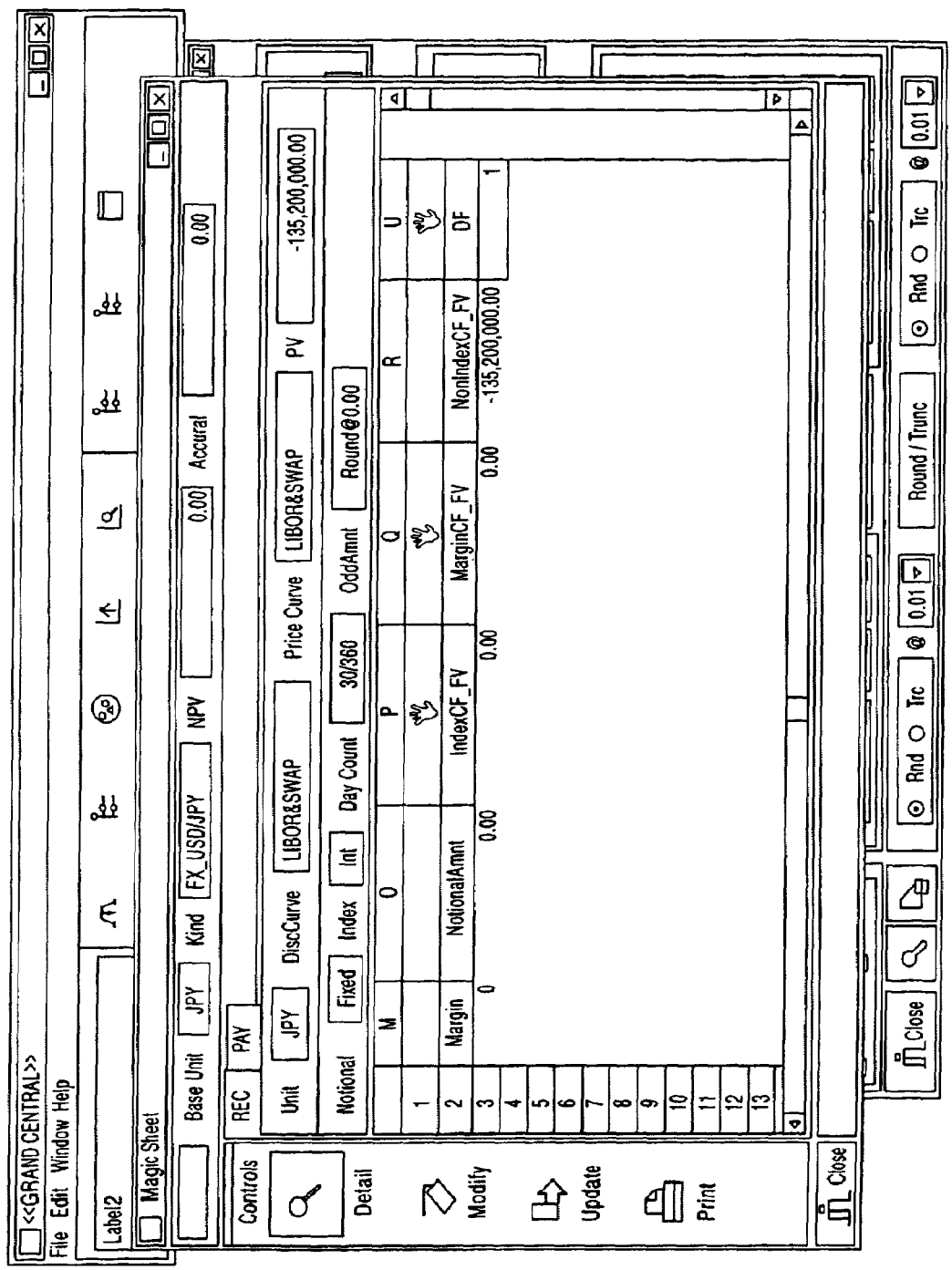
FIG. 40 shows an example (3) of a screen on which an foreign exchange transaction is processed.

FIGS. 39 and 40 show a magic sheet of foreign exchange transactions generated as described above. The data structure is the same as in the swap transactions. However, an foreign exchange transaction contains only one cash flow (1). According to the characteristics of foreign exchange transactions, no values are stored in the 'NotionalAmnt' field and the 'IndexCF#FV' 1 field, etc. computed based on the 'NotionalAmnt' field. Instead, as shown in FIG. 39, the value of the US dollar set in the field (final principal exchange amount field) in line 2 of the 'Initial: Pay(−)/Final: 'Rec(+)' area of the 'Principal Cash Flows' tab area is set in the 'NonIndexCF#FV' field of the 'REC' tab area. In addition, as shown in FIG. 40, a minus value in Japanese Yen set in the field (final principal exchange amount field) in line 2 of the 'Initial: Rec(+)/Final: Pay(−)' area is set in the 'NonIndexCF#FV' field of the 'PAY' tab area. The value in the 'NPV' field is as the balance between the PV value (FIG. 39) on the receipt side and the PV value (FIG. 40) of 0 on the payment side.

6.6 Procedure of Defining Financial Characteristics ('PwrGadget' function)

Figure 41:
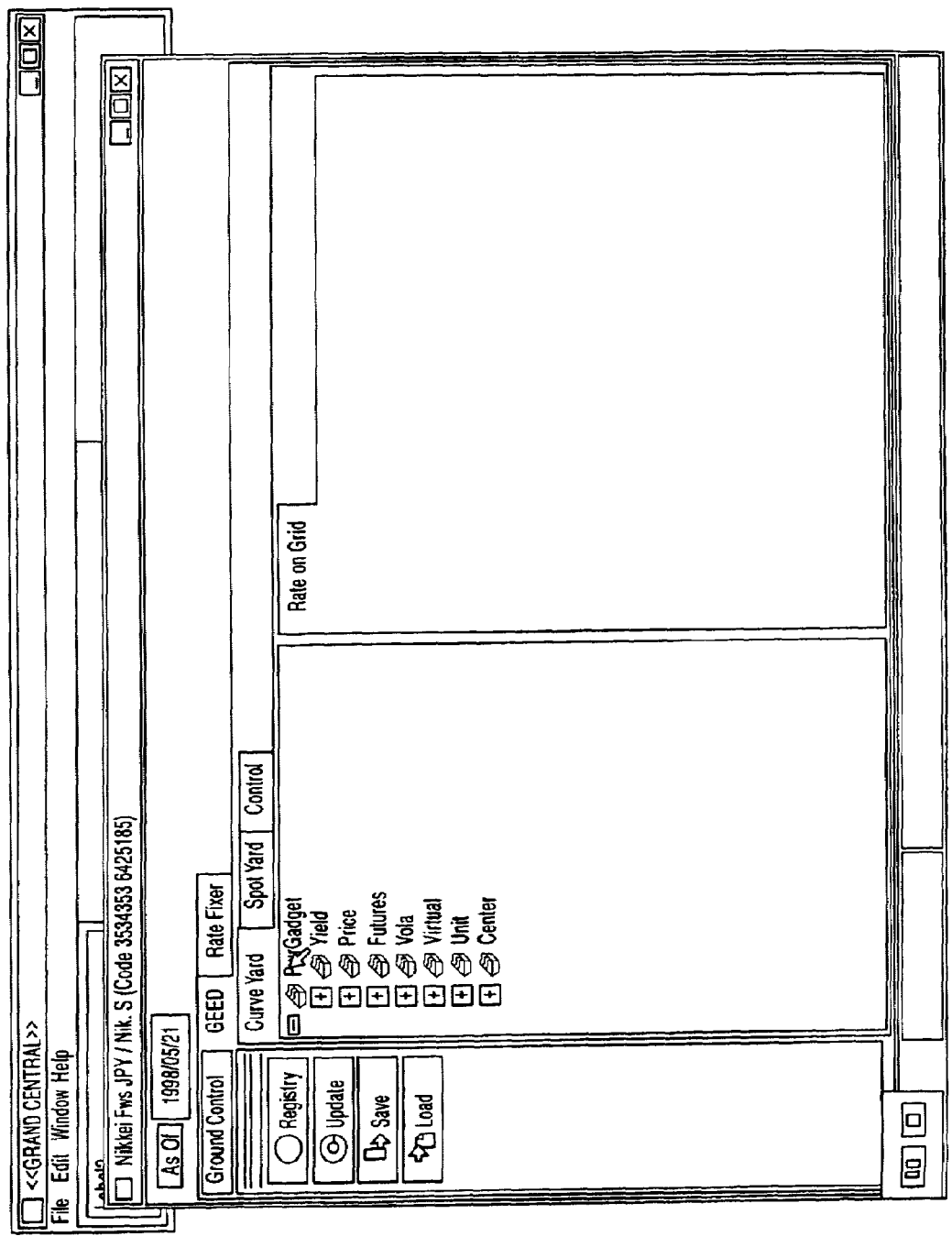
FIG. 41 shows an example of an initial screen for the PwrGadget function.

Described below is the procedure of defining various financial characteristics ('PwrGadget' function). FIG. 41 shows an initial screen of the 'PwrGadget' function. Displayed in the 'Curve Yard' tab area on the screen are: the 'Yield' item for definition of an yield curve; the 'Price' item for definition of a price curve; the 'Future' item for definition of a future curve; the 'Vola' item for definition of a volatility curve; the 'Virtual' item for definition of a virtual curve; the 'Unit' item for definition of a transaction unit; and the 'Center' item for definition of a holiday exclusion city.

Figure 42:
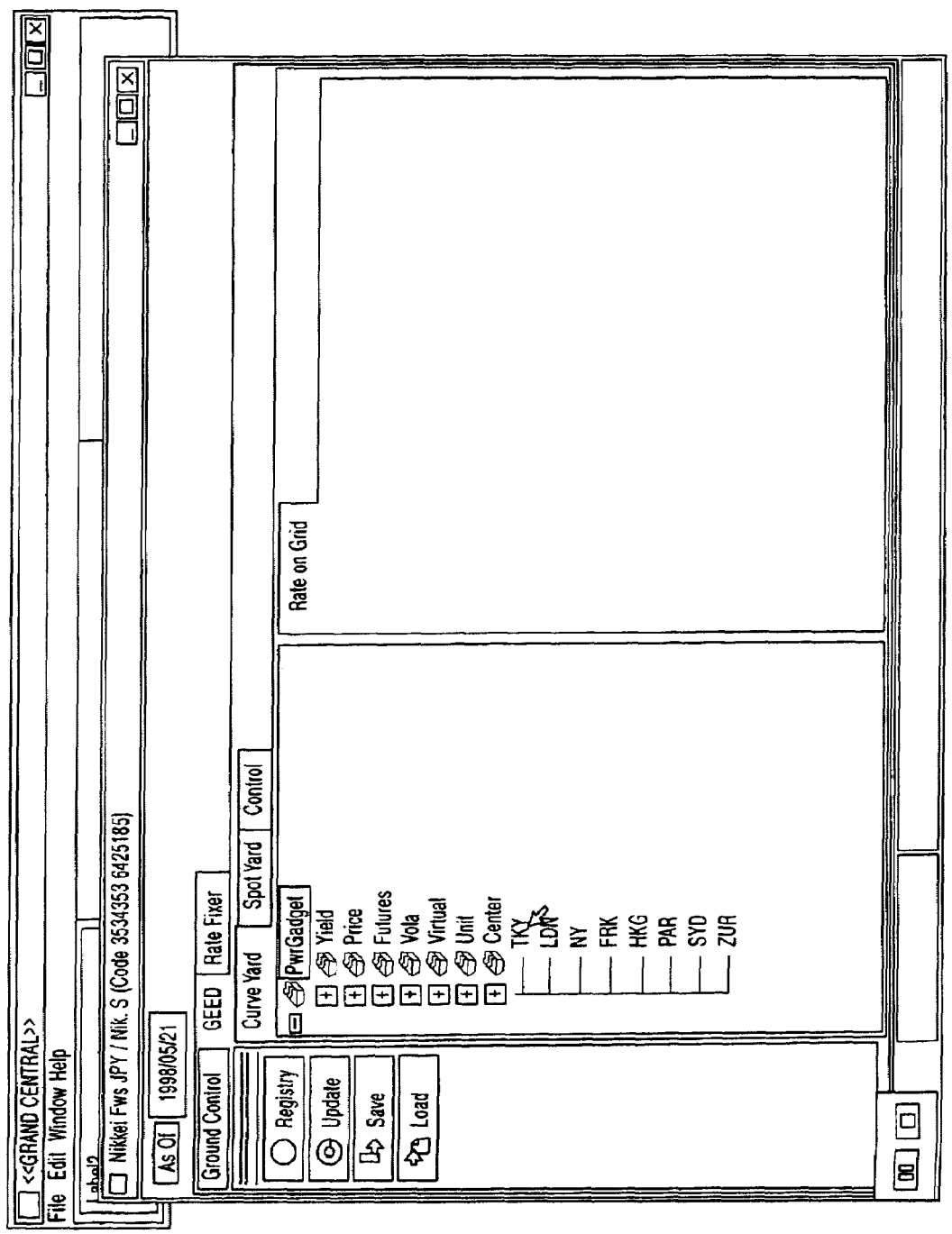
FIG. 42 shows an example of a definition screen for a holiday exclusion city.

When a left double click is made on the 'Center' item of the 'Curve Yard' area, the detailed items for definition of holiday exclusion city are displayed as shown in FIG. 42. In this example, holiday exclusion information can be defined for each city.

Figure 43:
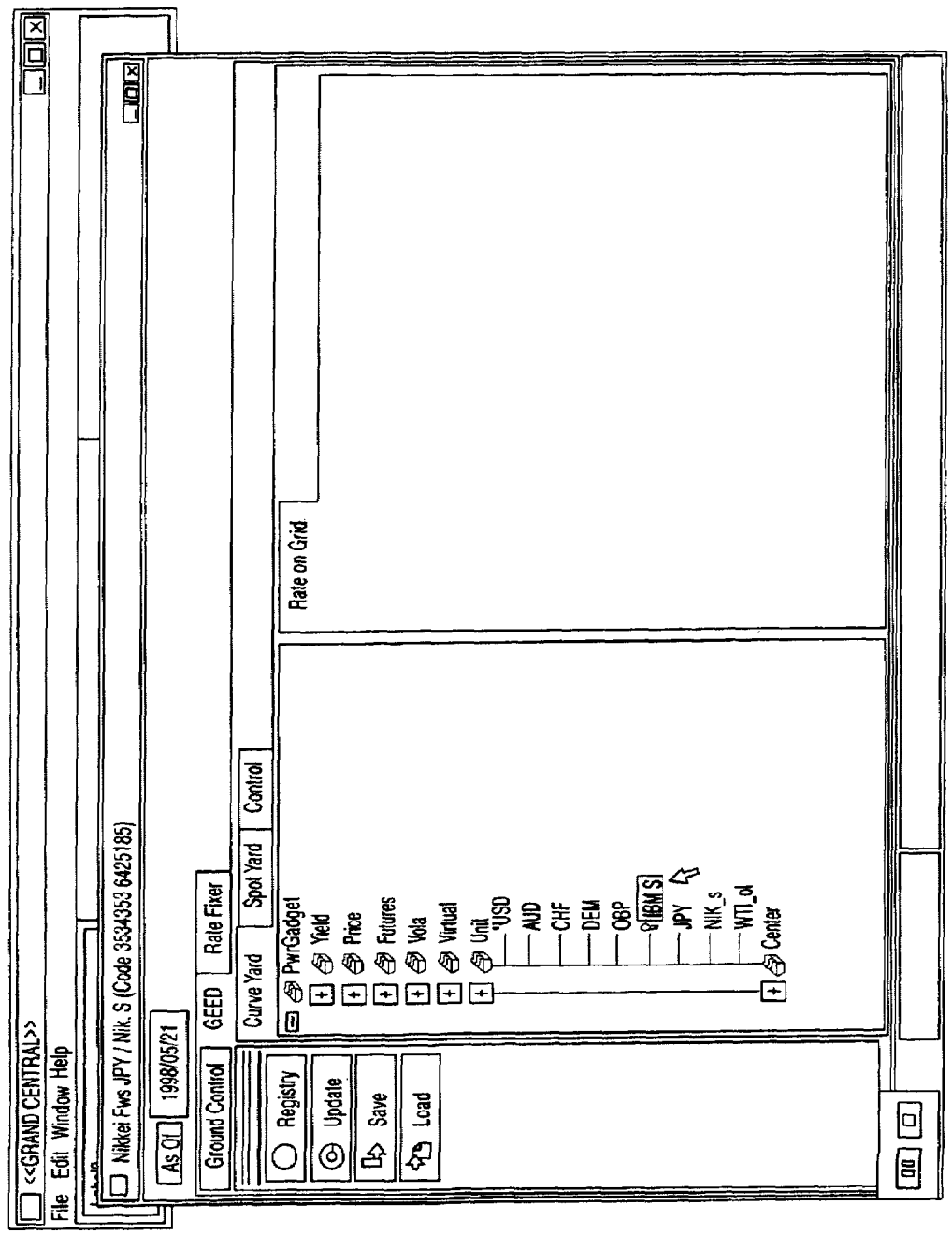
FIG. 43 shows an example of a definition screen for a transaction unit.

When a left double click is made on the 'Unit' item of the 'Curve Yard' area, the detailed items for definition of transaction units are displayed as shown in FIG. 43. In this example, a currency transaction unit, a unit of shares of a specific company, an oil unit, credits, etc. can be freely defined.

Figure 44:
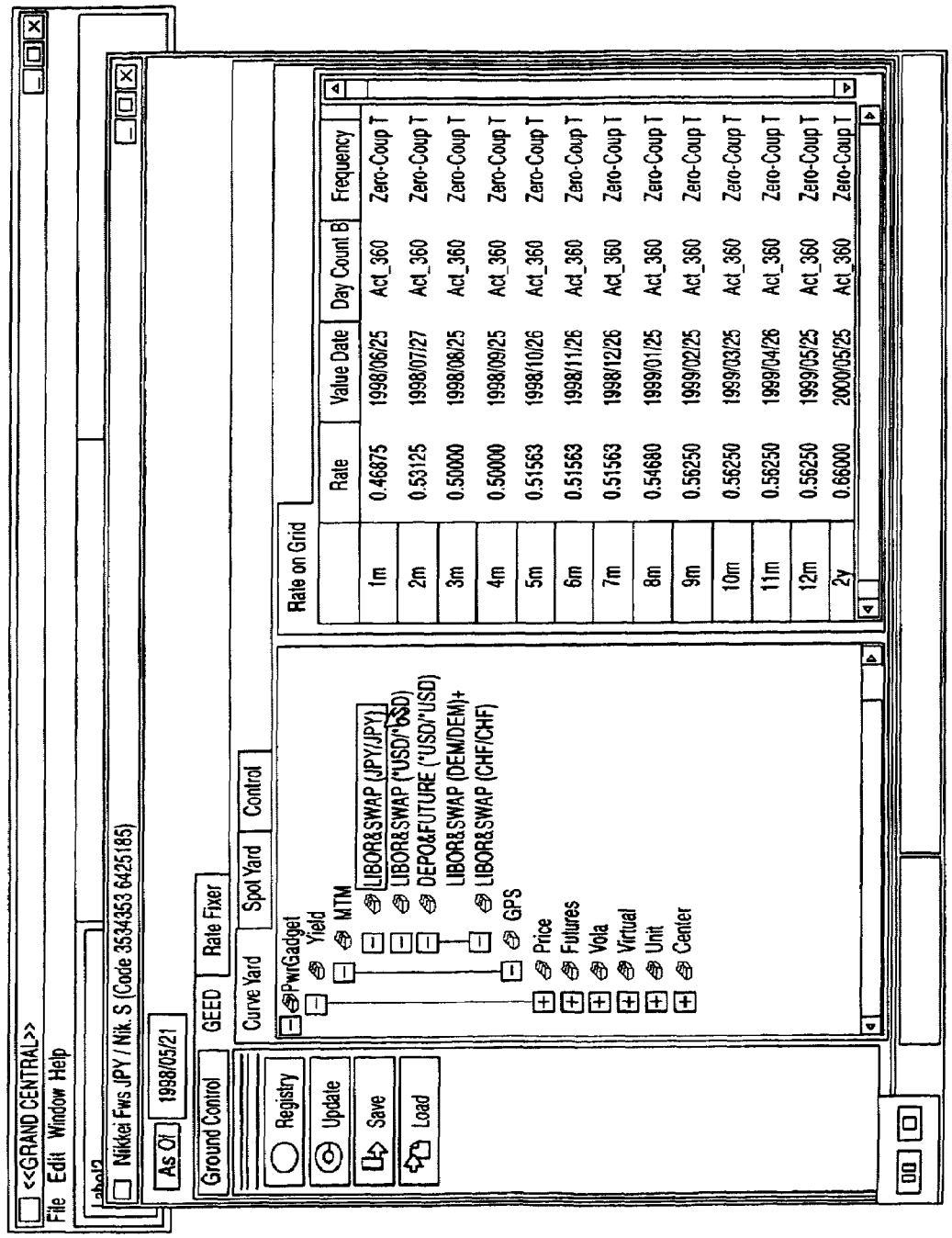
FIG. 44 shows an example (1) of a definition screen for an yield curve.
Figure 45:
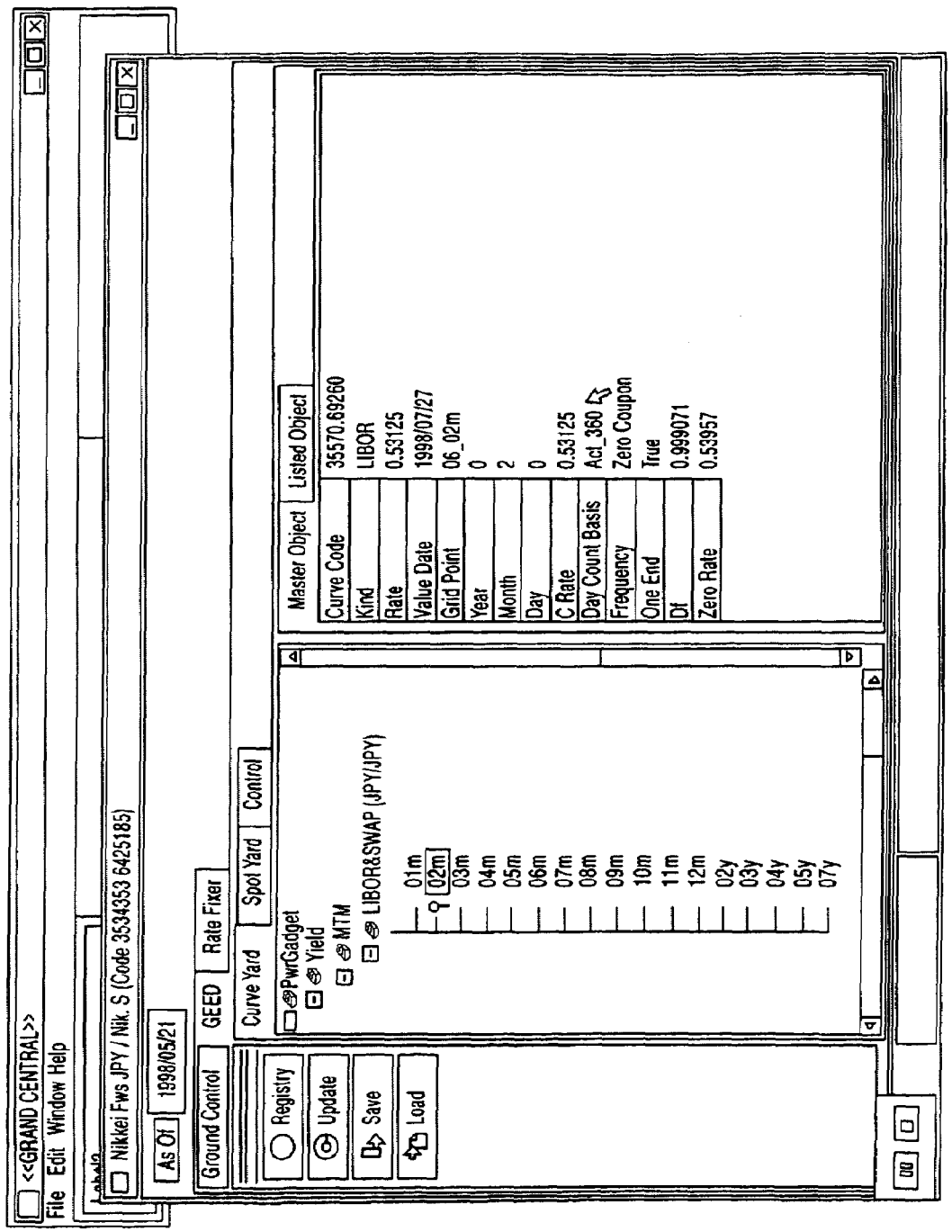
FIG. 45 shows an example (2) of a definition screen for an yield curve.

When a left double click is made on the 'Yield' item of the 'Curve Yard' area, the detailed items for definition of an yield curve are displayed as shown in FIG. 44. In the 'Rate on Grid' tab area shown in FIG. 44, the screen for definition of an yield curve named 'LIBOR&SWAP(JPY/JPY) is displayed. First, as shown in the 'Curve Yard' tab area shown in FIG. 45, a grid for every two months, every two years, etc. can be freely defined. In this case, the details of the attribute of each grid are omitted here, but can be defined in the 'Linked Object' tab area shown in FIG. 45. Then, for each grid displayed in the 'Rate on Grid' tab area, a rate can be defined in the 'Rate' field, thereby defining a curve.

The rate for the 'Rate' field can manually set, but can also be set by, for example, periodically obtaining the rate through a network (digital feed).

Figure 46:
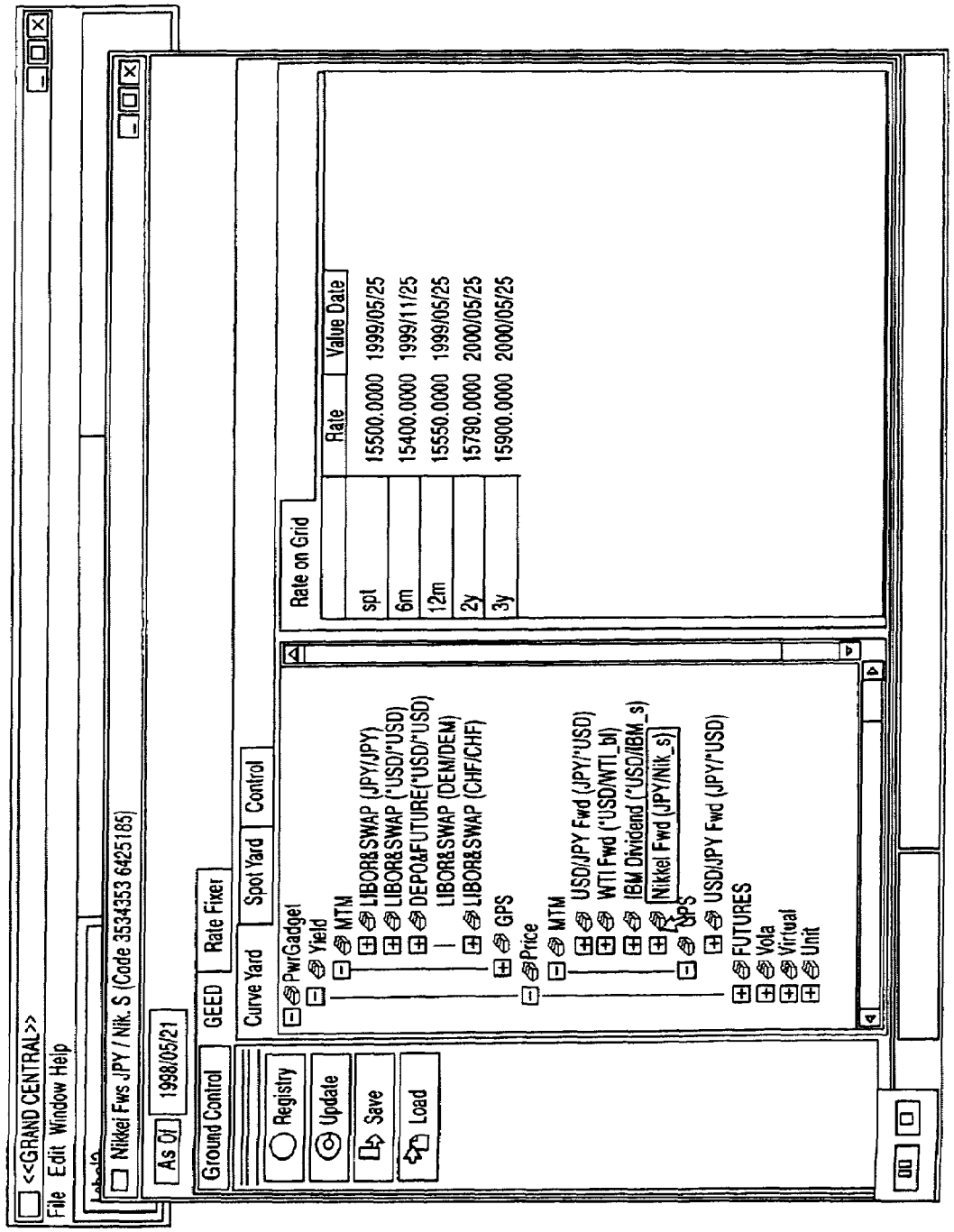
FIG. 46 shows an example (1) of a definition screen for a price curve.
Figure 47:
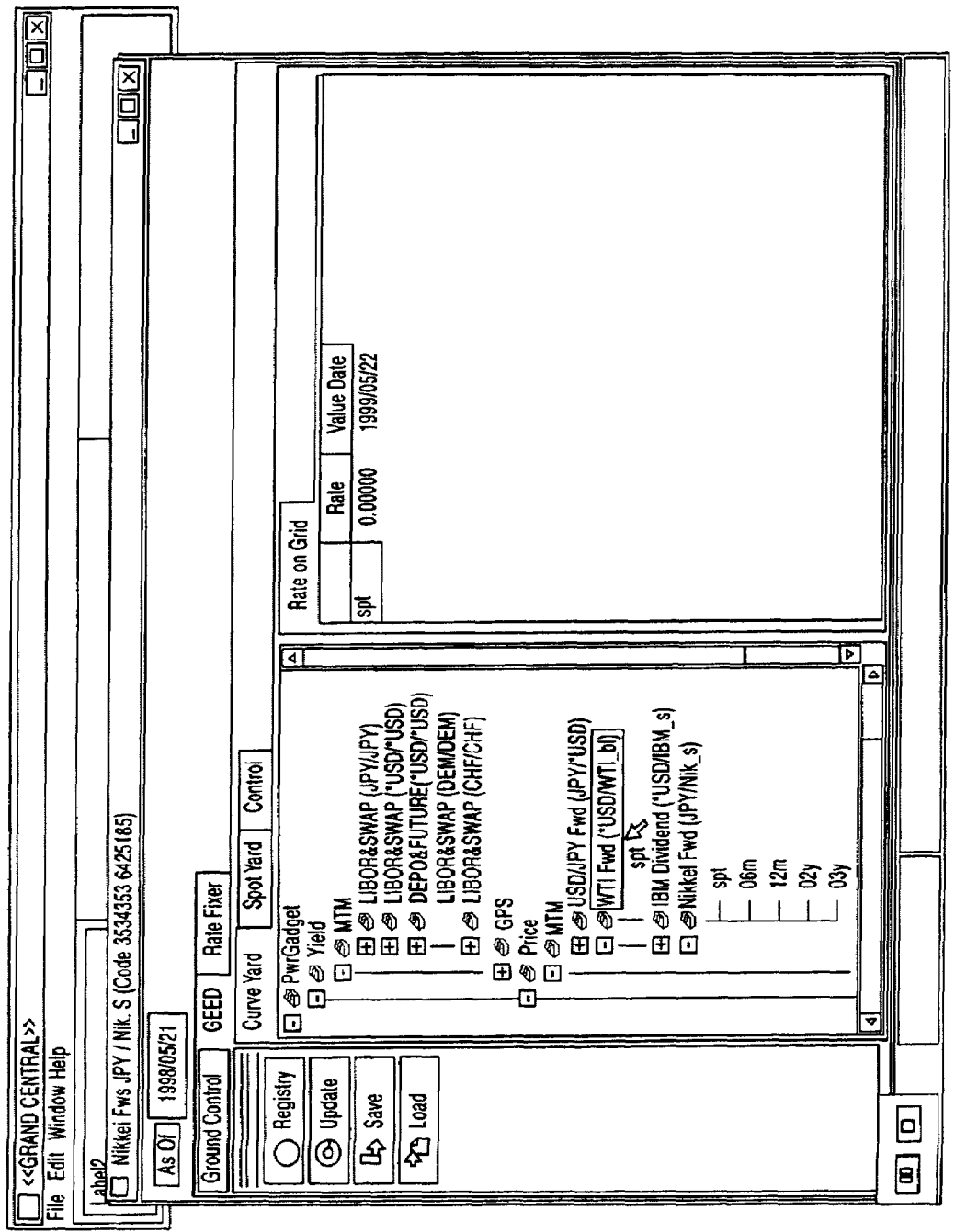
FIG. 47 shows an example (2) of a definition screen for a price curve.

When a left double click is made on the 'Price' item of the 'Curve Yard' area, detailed items for definition of a price curve are displayed as shown in FIG. 46. In this example, a curve such as the Nikkei Index, etc. with which the future value can be directly observed can be defined as in the yield curve shown in FIGS. 44 and 45. In this case, a price is directly input to the 'Rate' field of the 'Rate on Grid' tab area.

FIG. 37 shows the screen on which a price curve is defined for a commodity (goods) such as oil, etc. In a commodity, a spot price is not associated with a future price. Then, as shown in the 'Rate on Grid' tab area, only the 'spt' grid is defined.

Figure 48:
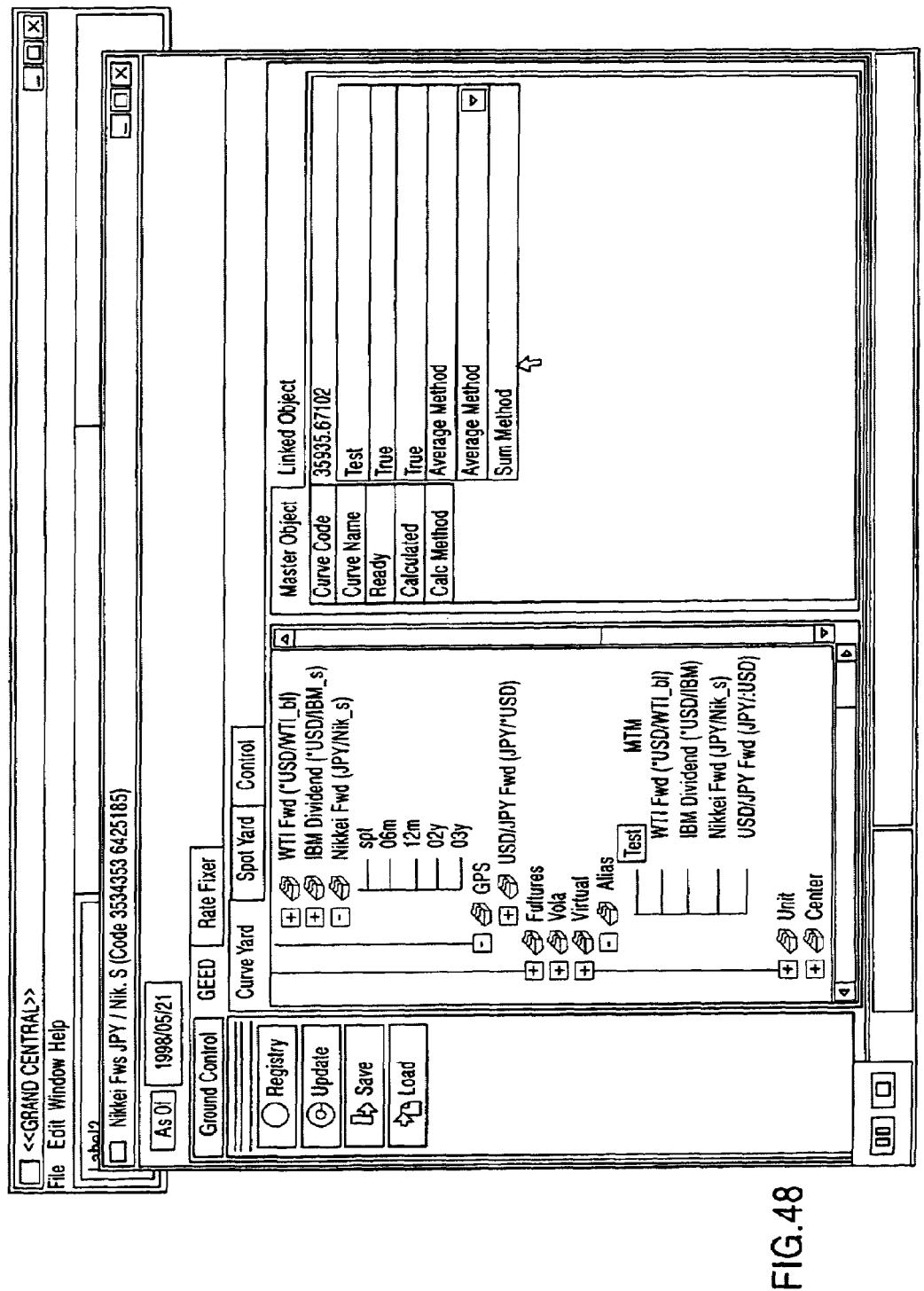
FIG. 48 shows an example of a definition screen for a virtual curve.

When a left double click is made on the 'Virtual' item of the 'Curve Yard' area, the detailed items for definition of a virtual curve are displayed as shown in FIG. 48. In this example, as shown below the 'Test' item of the 'Curve Yard' tab area, other plural curves such as the yield curve, the price curve, etc. are collectively entered in a container, and a function (operations method) among the plurality of curves is defined, thereby defining a new virtual curve. For example, in FIG. 48, in the 'GalcMethod' field in the 'Linked Object' tab area, the operations among the curves can be defined. For example, the 'AverageMethod' method performs an operation for an averaging the corresponding values of a plurality of curves. The 'SumMethod' method performs an operation for obtaining a sum of the corresponding values of a plurality of curves. In the virtual curves defined as described above, if the configuration rate, etc. of the original curve entered in the container has been changed by the above described digital feed, etc., then the change can be automatically reflected on the virtual curve. Using such a virtual curve, a new financial transaction that has not been conventionally processed can be defined.

6.7 Procedure of Generating Option Transactions

Described below is the procedure of generating a transaction Swaption which is one of the option transactions and is a transaction for an option about swaps.

Figure 49:
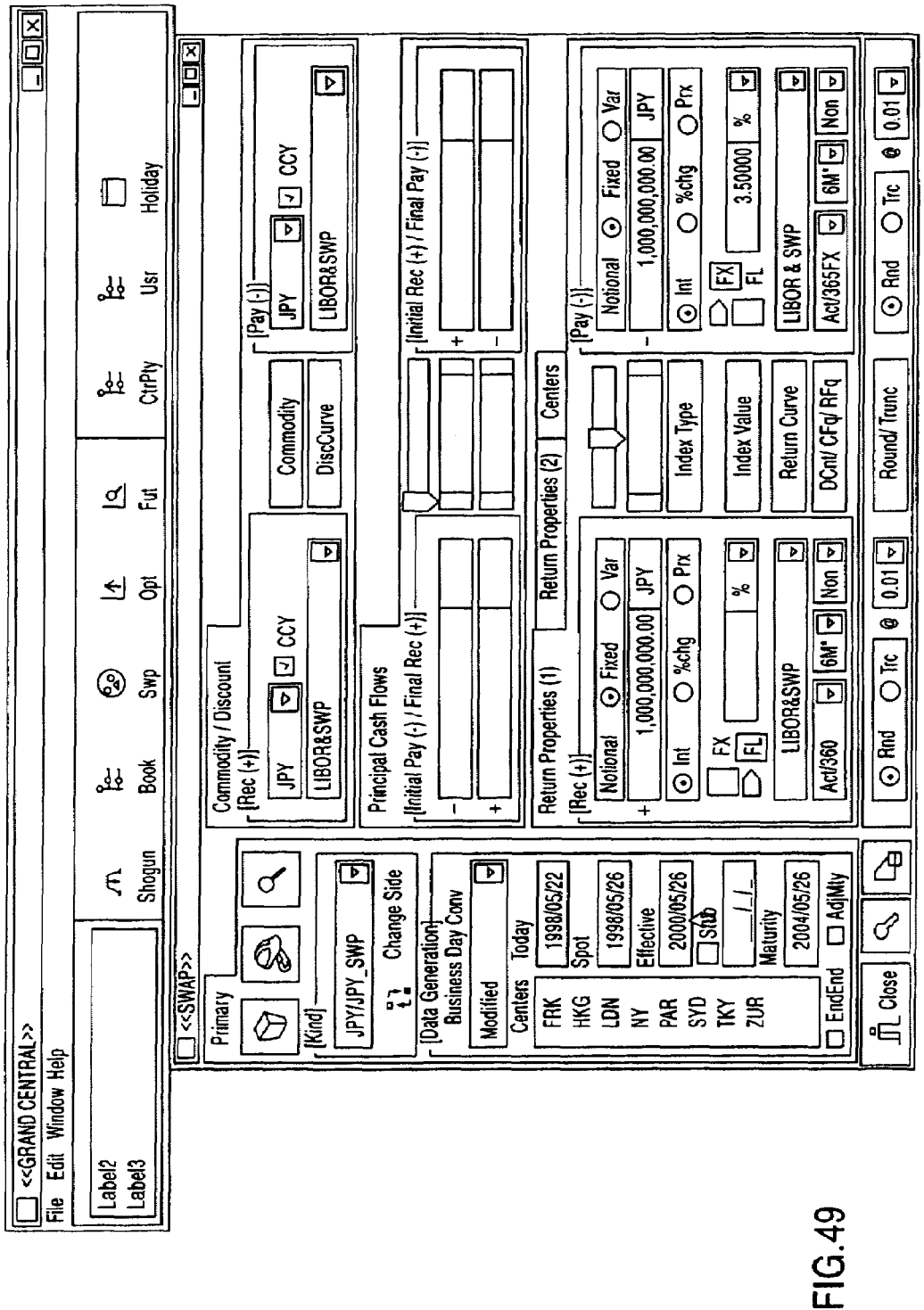
FIG. 49 shows an example of a screen on which a swap transaction, which is an original asset in an option transaction, is processed.

First, a swap, that is, an original asset, is defined. FIG. 49 shows an example of the generation screen. This example shows a swap to be started in the future as a 4-year-term swap starting in two years. In the swap, payment is made at a fixed rate in response to the float rate of the 'LIBOR'.

An option about the above described swap refers to a transaction in which a contractor determines at the starting year, month, and day the situation at that point, and has the right to select whether or not the swap should be performed.

By making a left double click on the helmet icon in the 'Primary' tab area at the upper left on the screen shown in FIG. 49 after defining the swap as described above, the cash flow transaction about the swap can be first designed, and the helmet icon is changed into the shake-hands icon.

Figure 50:
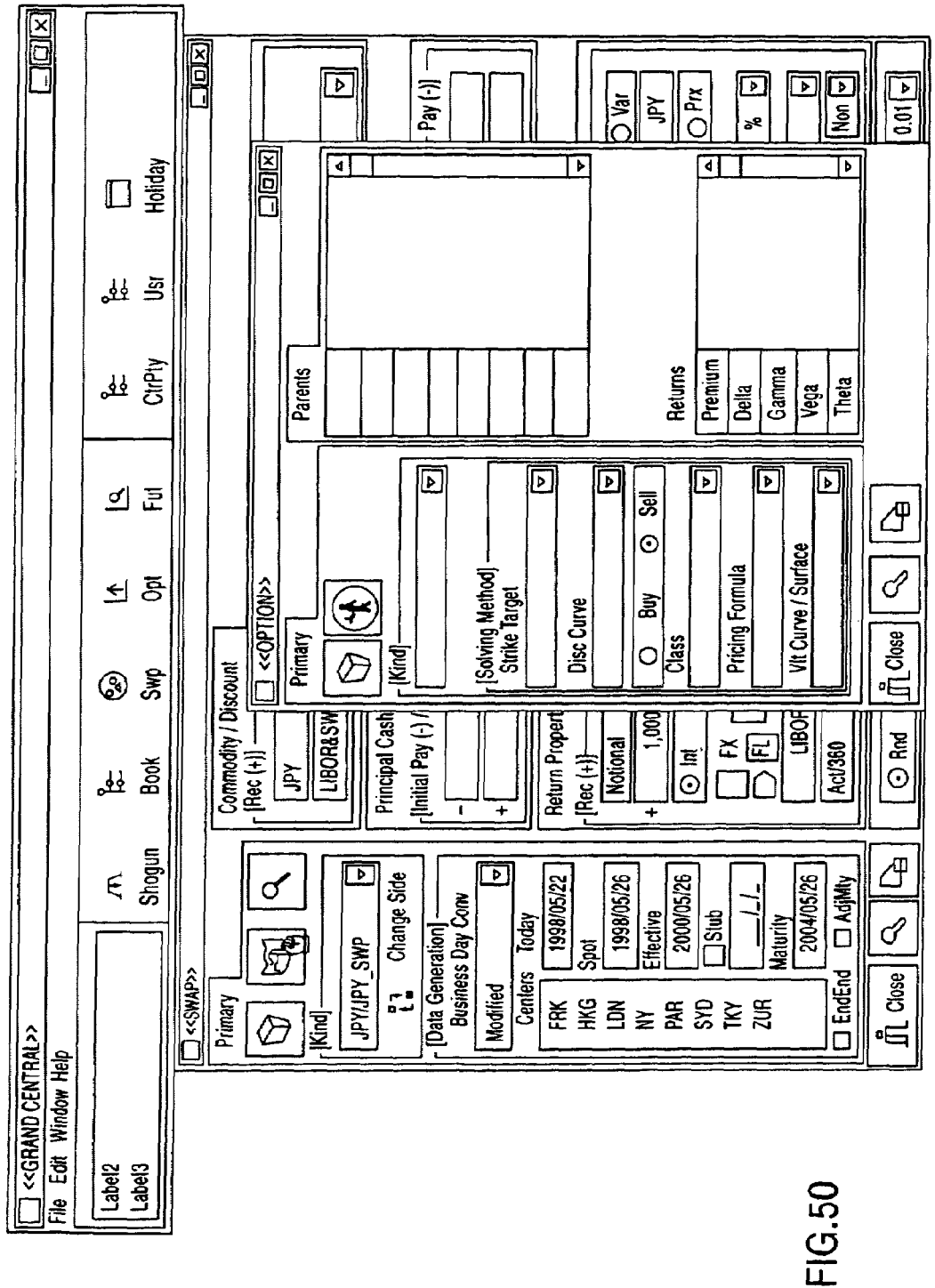
FIG. 50 shows an example of a definition window for an option transaction.
Figure 51:
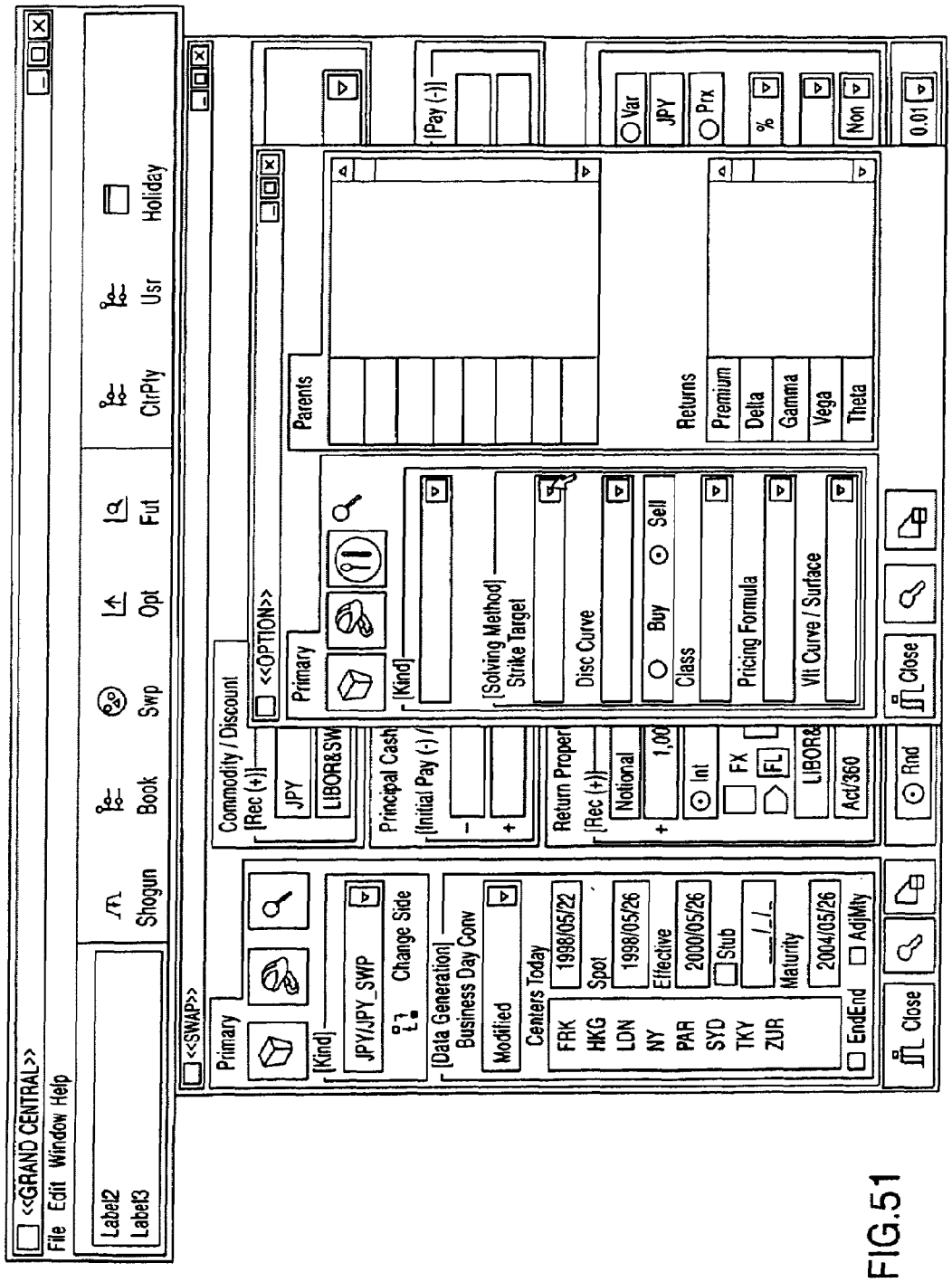
FIG. 51 shows an example (1) of a screen on which an option transaction is processed.

Then, by making a left click on the 'Opt' icon of the main control panel, an option definition window is displayed as shown in FIG. 50. When the mouse is dragged and dropped from the shake-hands icon in the 'Primary' tab area in the swap definition window to the person icon in the 'Primary' tab area in the option definition window, the screen display in the option definition window changes as shown in FIG. 51. As a result, the TOption instance stores in the container an instance of the swap object defined as described above.

Figure 52:
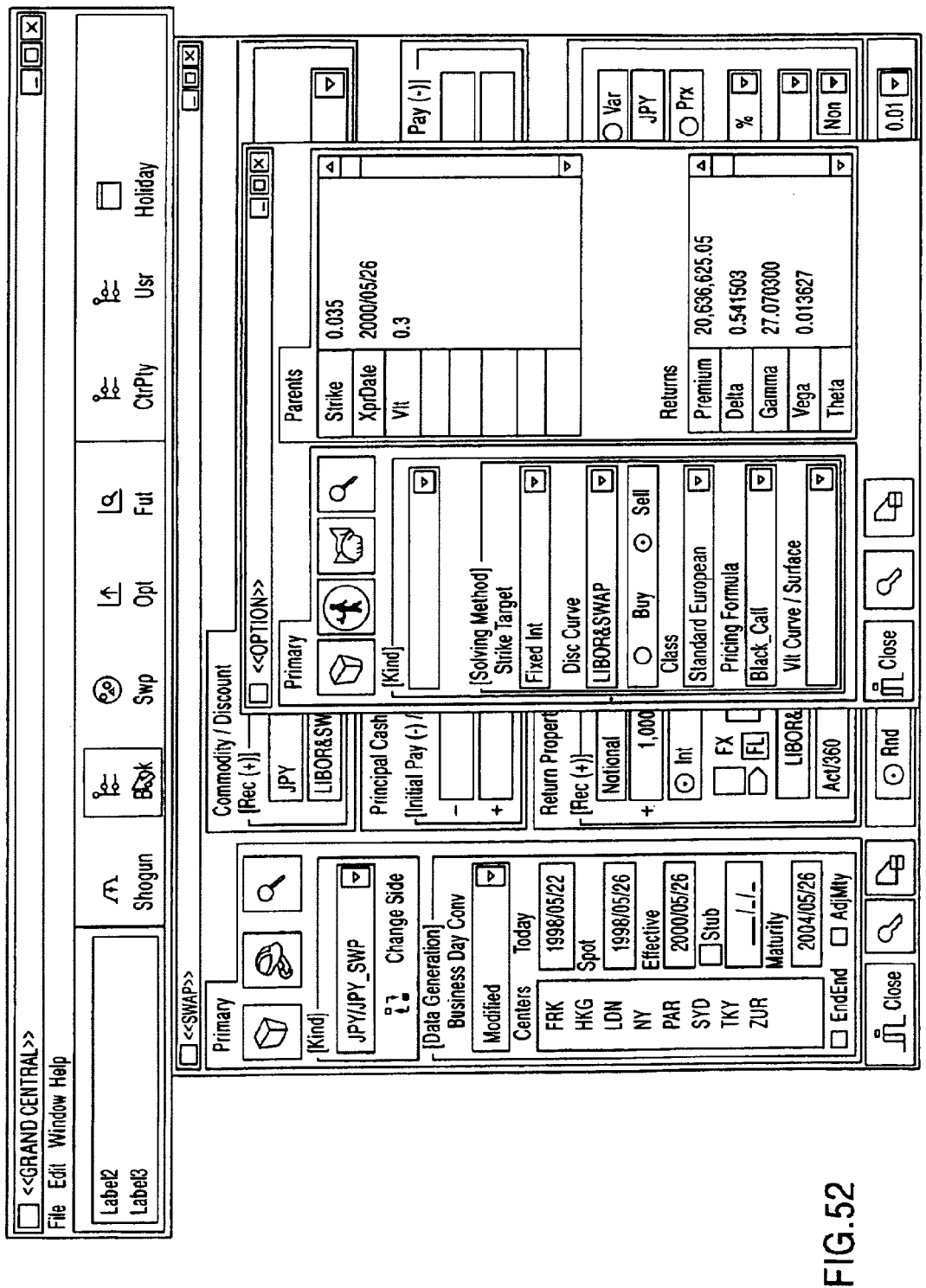
FIG. 52 shows an example (2) of a screen on which an option transaction is processed.

When a left double click is made on the helmet icon in the 'Primary' tab area in the option definition window after setting a parameter corresponding to each option in the option definition window, the icon is changed into the shake-hands icon as shown in FIG. 52, and the TOption instance for the defined option can be set. In this case, a class is generated for each model of the option, and the setting form of the parameter required for the class can be automatically displayed when a model is specified by selecting a parameter during the process.

6.8 Procedure of Combining Financial Transactions

As described above, the individually generated financial transactions can be arbitrarily combined to form a virtual transaction.

Figure 53:
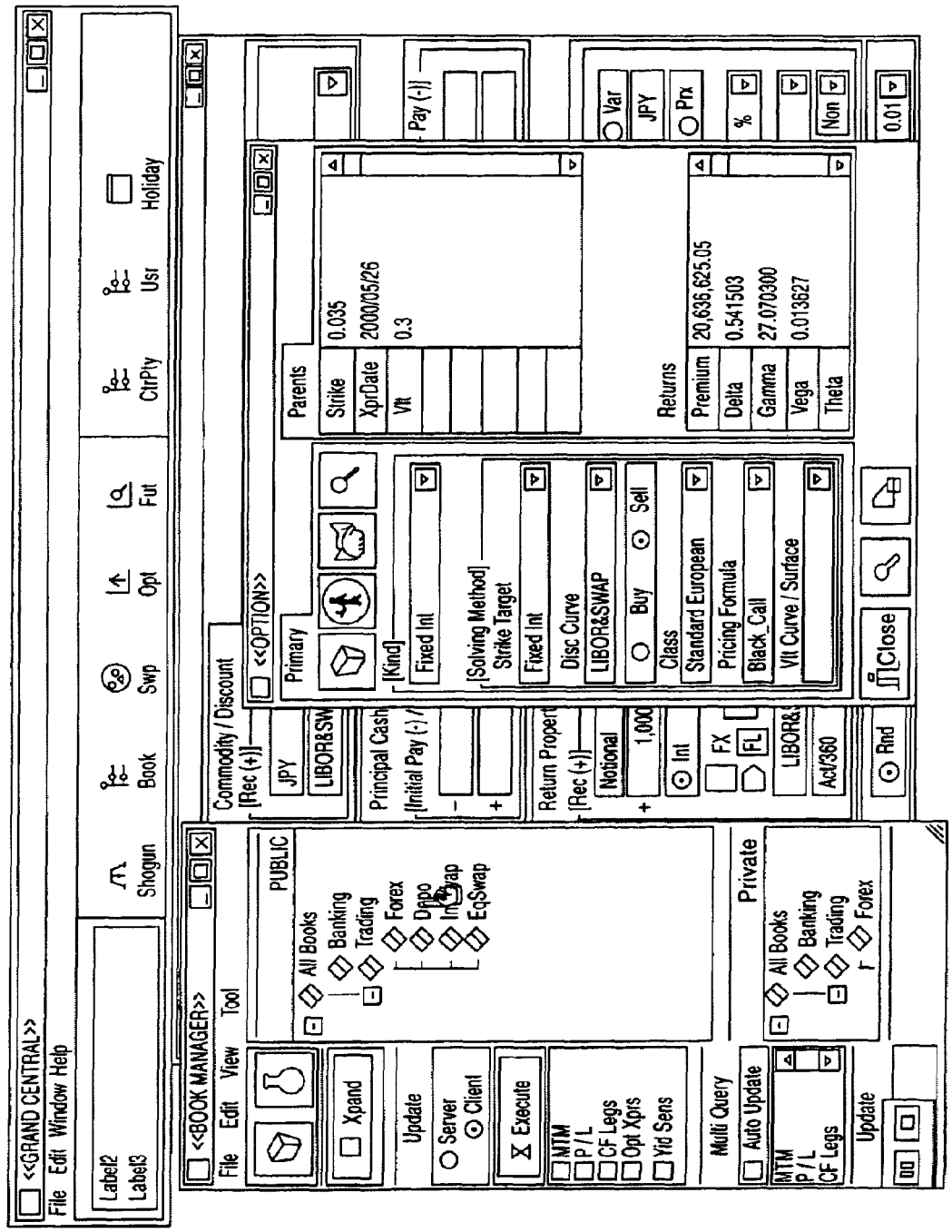
FIG. 53 shows an example (1) of a screen for a financial transaction composing procedure.

After each object is set in the swap definition window and the option definition window, and the helmet icon in the 'Primary' tab area is changed into the shake-hands icon, the 'Opt' icon on the main control panel is left-clicked. As a result, a book manager (BOOK MANAGER) window is displayed as shown in FIG. 53.

When an operation of dragging and dropping the mouse from the shake-hands icon in the 'Primary' tab area in the swap or option definition window to the flask icon in the book manager window is performed on a plurality of set objects, the objects can be collectively processed as one virtual transaction.

Figure 54:
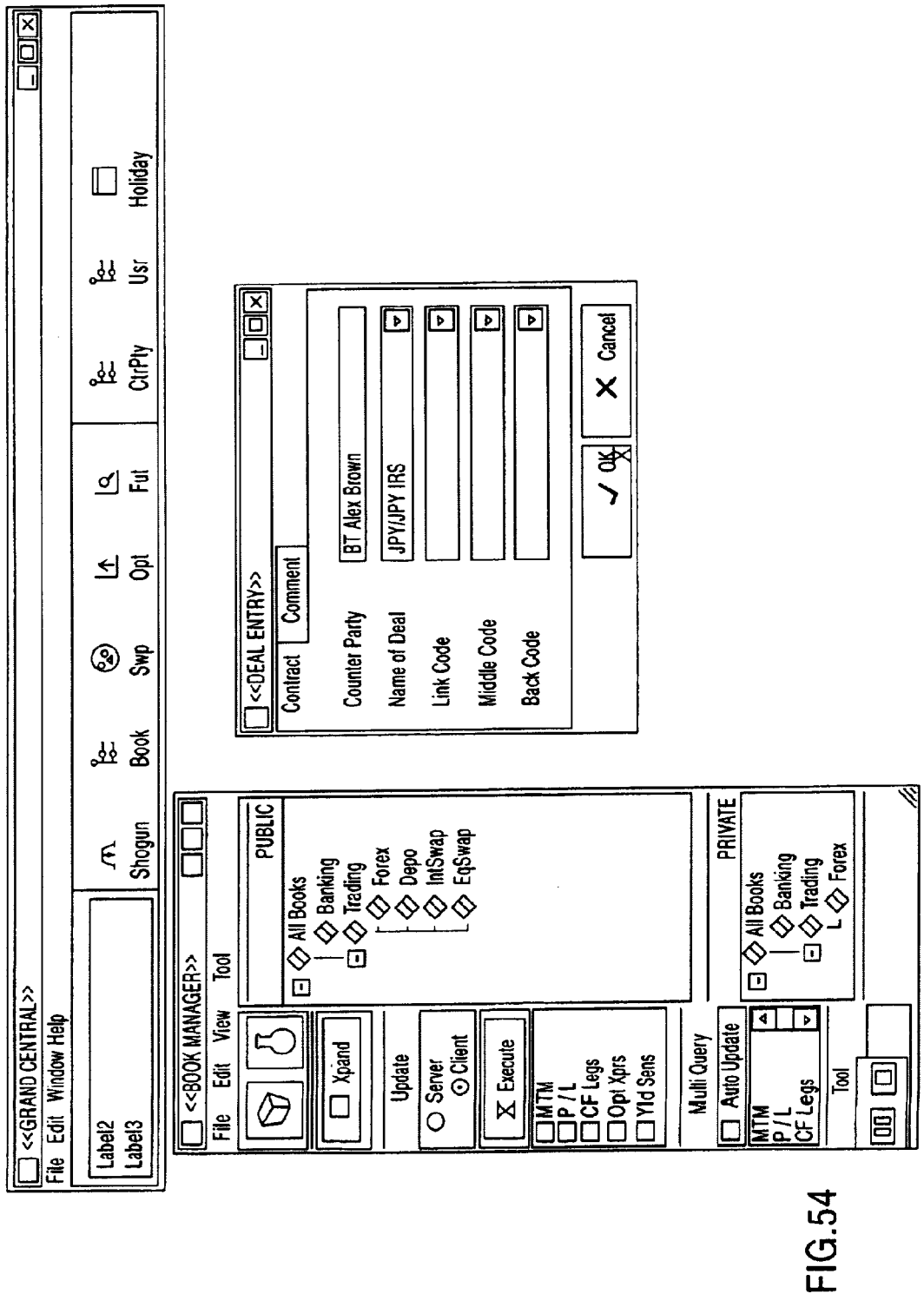
FIG. 54 shows an example (2) of a screen for a financial transaction composing procedure.

Furthermore, a virtual transaction which is a compound transaction collectively processed as one financial transaction in the flask icon can be managed using database as an arbitrarily named tree structure in the book manager window. To attain this, the mouse is dragged and dropped from the flask icon to any tree element in the tree structure in the book manager window. In this case, using a transaction entry (DEAL ENTRY) window displayed as shown in FIG. 54, attributes such as a contractor, a transaction type name, etc. can be set for a financial transaction which is a compound transaction.

Figure 1:
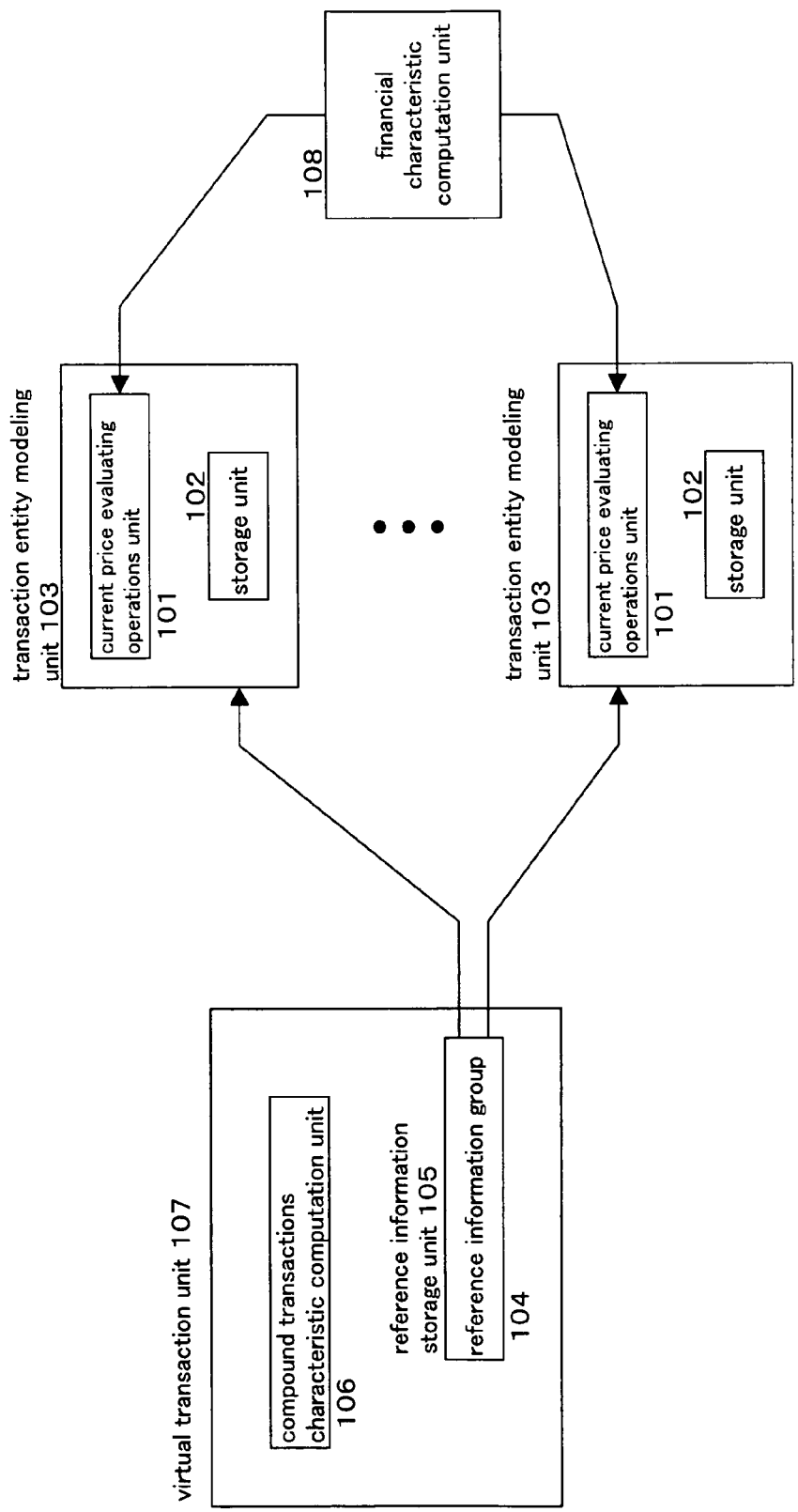
FIG. 1 is a block diagram (1) showing the present invention.
Figure 2:
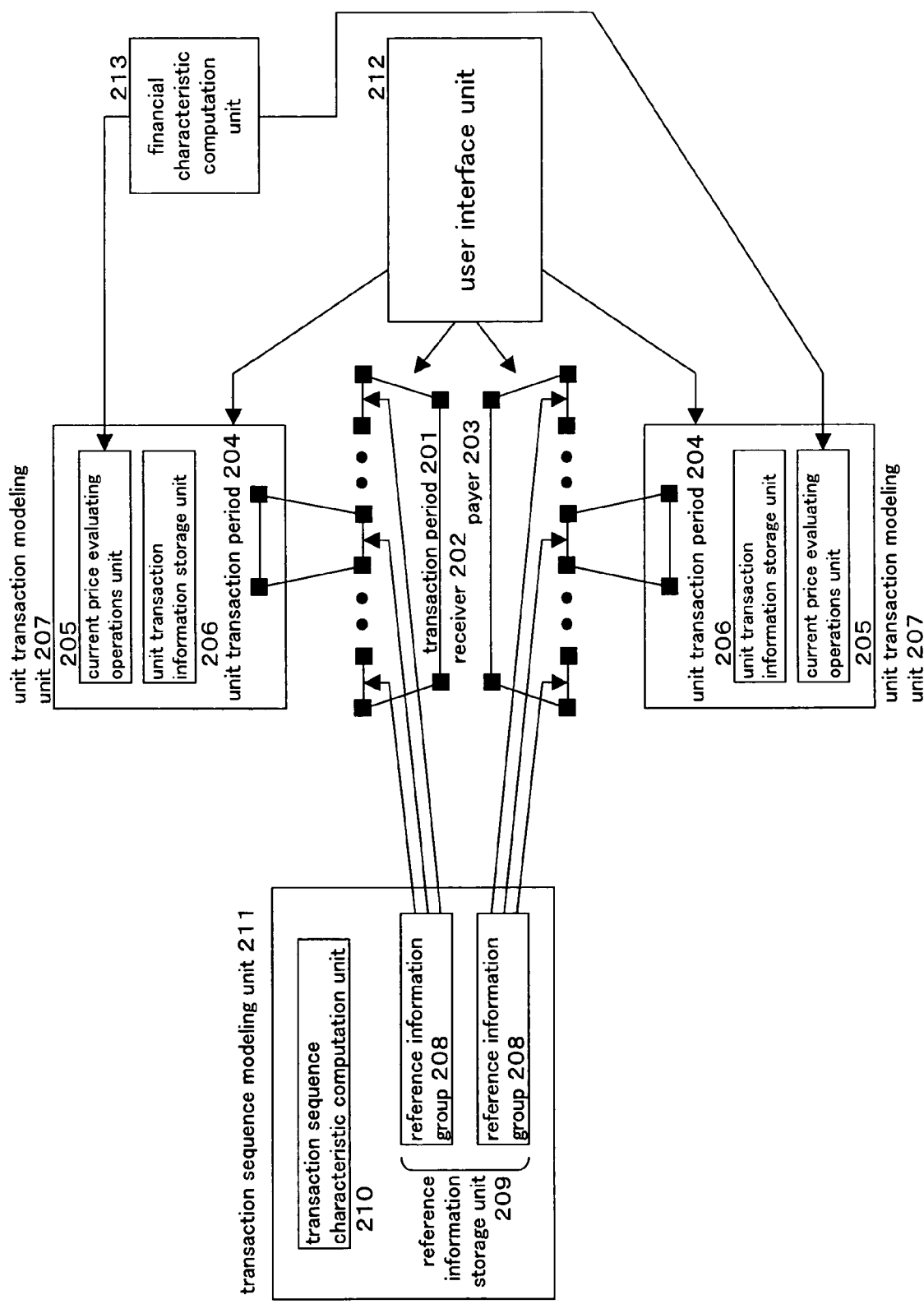
FIG. 2 is a block diagram (2) showing the present invention.
Figure 3:
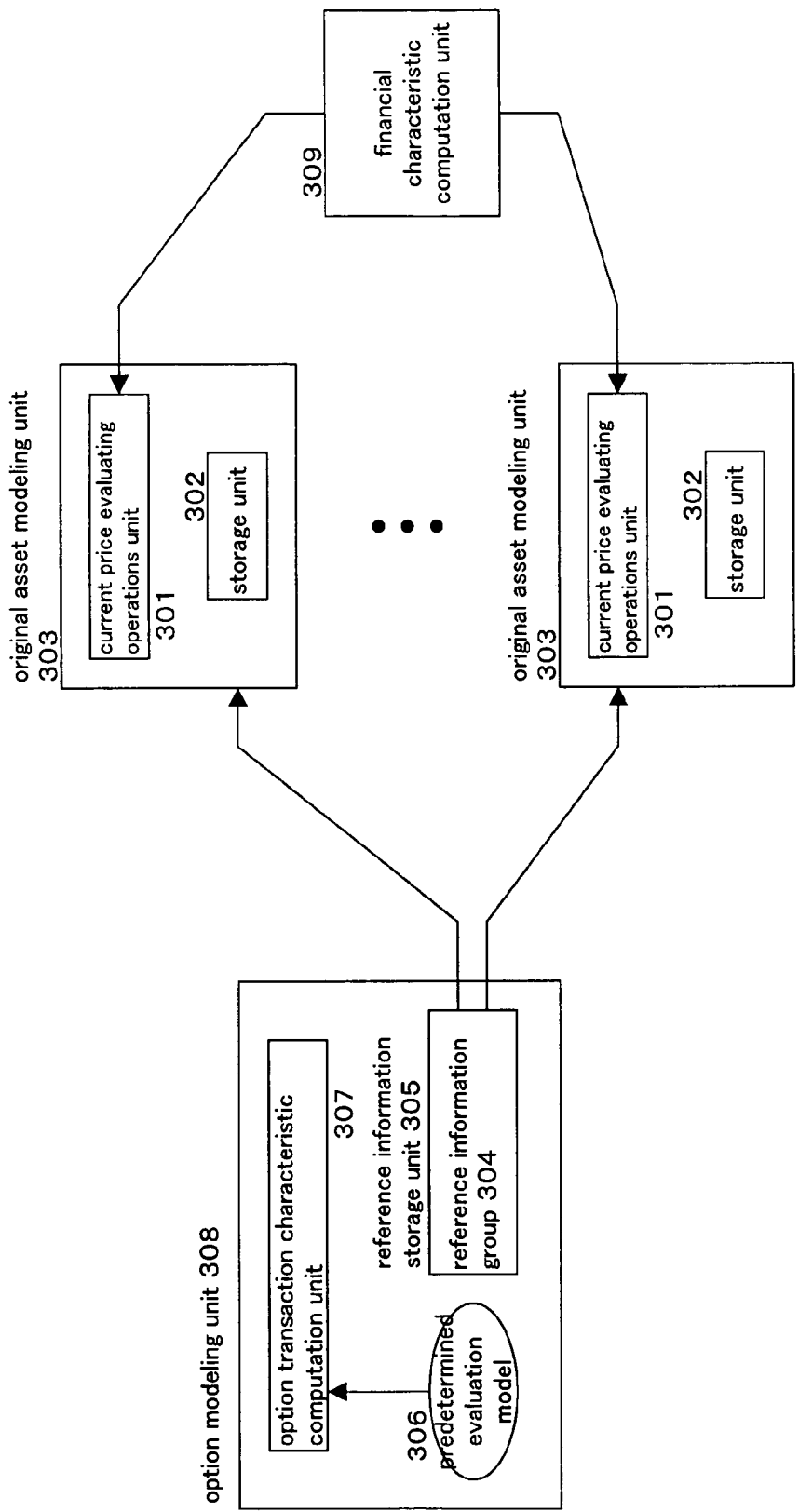
FIG. 3 is a block diagram (3) showing the present invention.
Figure 55:
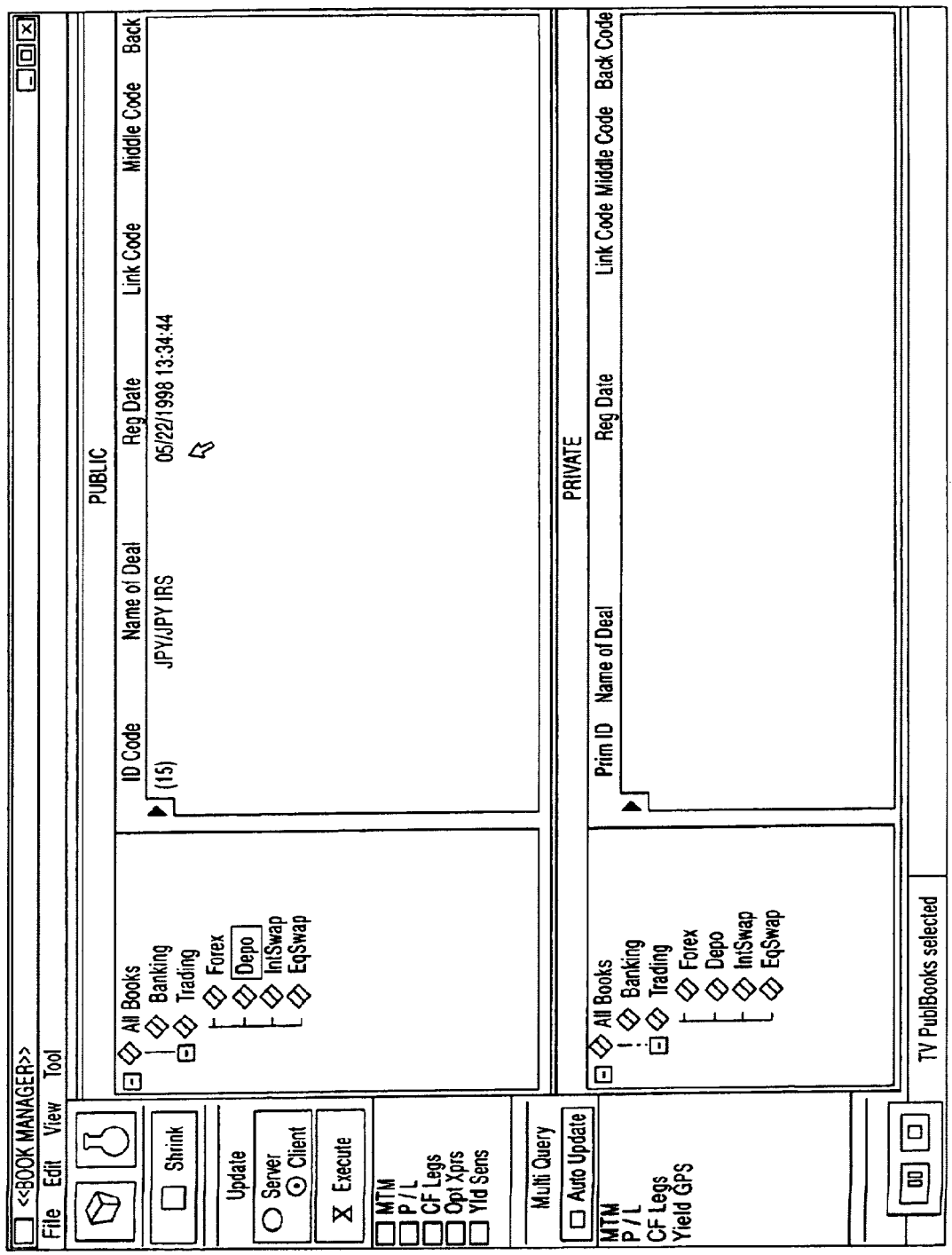
FIG. 55 shows an example (3) of a screen for a financial transaction composing procedure.

As a result, as shown in FIG. 55, a virtual transaction which is a compound transaction displayed as an ID (15) in the tree structure is stored. It forms the TVirtualContract shown in, for example, FIG. 2.

Figure 56:
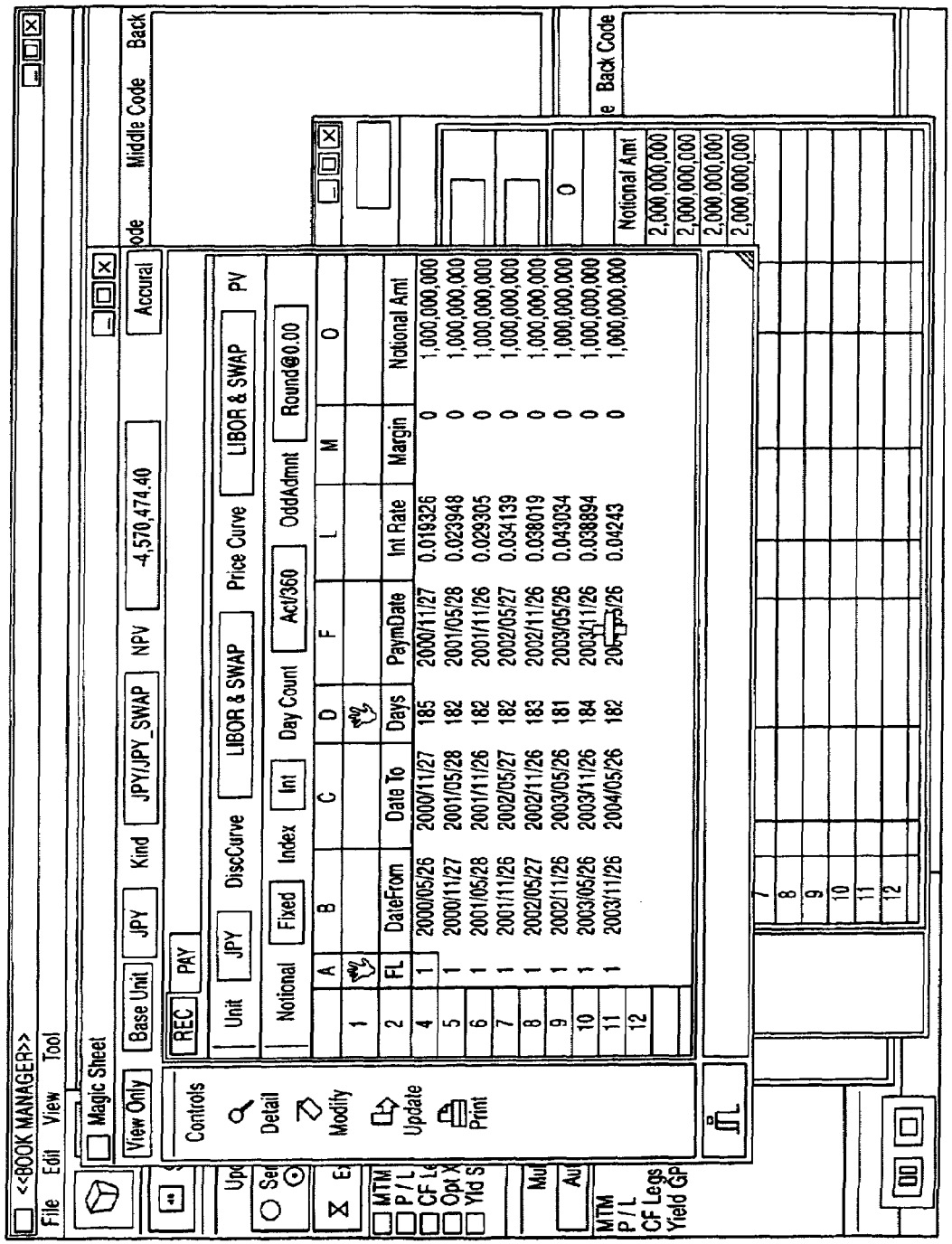
FIG. 56 shows an example (4) of a screen for a financial transaction composing procedure.
Figure 57:
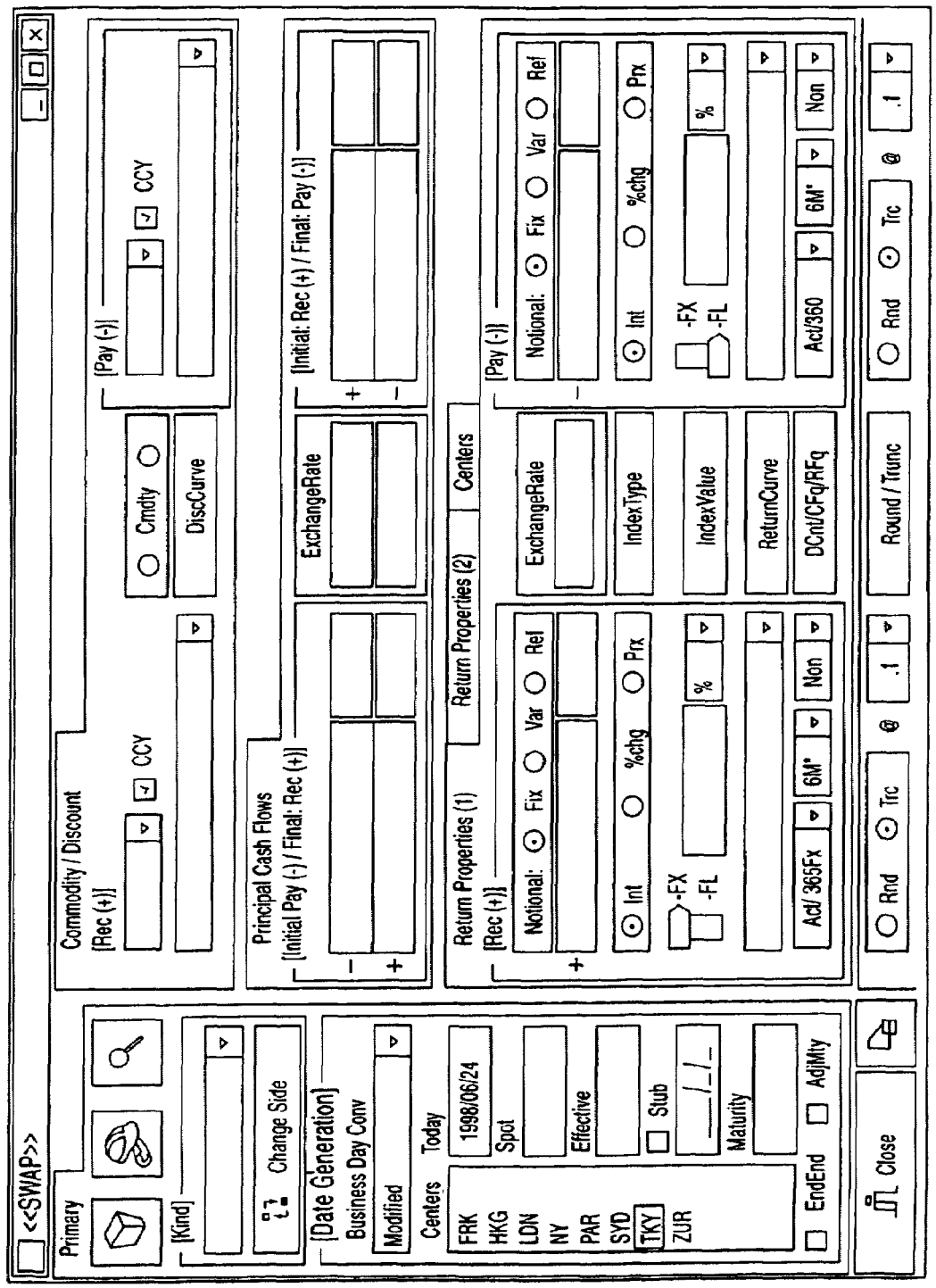
FIG. 57 shows an example of an initial screen (for emphasis).

When a left double click is made on the financial transaction in the tree structure, two magic sheets are displayed as shown in FIG. 56. As a result, it is apparent that the financial transaction is a compound transaction comprising two transaction entities.

7. Supplementary Descriptions about a Storage Medium Storing a Program for Realizing the Aspects of the Present Embodiments The present invention can also be designed as a computer readable storage medium used to direct a computer to perform the functions realized by each configuration of the above described embodiments of the present invention.

In this case, a program for realizing various functions according to the embodiments of the present invention is executed after being loaded onto the memory of the computer using portable storage media such as a floppy disk, a CD-ROM disk, an optical disk, etc. and through a network circuit.

With the configuration shown in FIG. 5, the class module 501 for operating each class instance in the memory, the RDB module 503 for set a relational database in an auxiliary storage device, the RDBMS module 502 for managing the transmission of data between the class module 501 and the RDB module 503, etc. are implemented as the hardware functions of the computer. The RDBMS module 502 implements a TQuery method for controlling the issue of an SQL, a TStored-Proc method for controlling the stored procedure, etc.

What is claimed is:

1. A financial transactions modeling apparatus for modeling a transaction sequence settled by settling financial transactions in a predetermined transaction period, comprising:
  (1) one or more unit transaction modeling means comprising:
    (i) unit transaction information storage means, provided at each of a receipt side and a payment side of the financial transactions for one or more unit transaction period into which the predetermined transaction period for each receipt or payment is divided, for individually storing information about a unit transaction, and
    (ii) current price evaluation operation means for evaluating a current price of the financial transactions in the unit transaction period; and
  (2) transaction sequence modeling means comprising
    (i) reference information storage means for holding a reference information group for reference to said unit transaction modeling means corresponding to each of the receipt side and the payment side of the financial transactions, and
    (ii) transaction sequence characteristic computation means for sequentially referring to said unit transaction modeling means from the reference information group in each of the receipt side and the payment side of the financial transactions at a predetermined instruction, performing the current price evaluation operation means and obtaining operation results, and computing a characteristic of the transaction sequence based on each of the operation results.

2. The apparatus according to claim 1, wherein said predetermined transaction period is only a predetermined point in time.

3. The apparatus according to claim 1, wherein said financial transactions are financial goods other than a currency.

4. The apparatus according to claim 1, wherein said unit transaction modeling means is implemented as a list structure.

5. The apparatus according to claim 1, wherein:
  said unit transaction modeling means is a module for holding as a class member a parameter for use in a current price evaluating operation performed by said unit transaction information storage means in the unit transaction period, holding the current price evaluation operation means, and operating an instance of a predetermined class in an object-oriented concept; and
  said transaction sequence modeling means is a module for holding as a list member a reference information group in each of the receipt side and the payment side of the financial transactions, holding the transaction sequence characteristic computation means, and operating an instance of a predetermined container class in the object-oriented concept.

6. The apparatus according to claim 1, wherein
  the current price evaluation operation means of said unit transaction modeling means performs a current price evaluating operation based on a future value index computed based on any of three types of indices of an interest, an earning rate, and a price in the unit transaction period corresponding to said unit transaction modeling means, and an evaluation value independent of any indices of the interest, the earning rate, and the price.

7. The apparatus according to claim 6, wherein
the current price evaluation operation means of said unit transaction modeling means comprises discount rate multiplication means obtains as a current price evaluating operation result a current value by multiplying a current price evaluating operation performed by the current price evaluation operation means by a predetermined discount rate.

8. The apparatus according to claim 1, further comprising:
user interface means for computing one or more unit transaction periods into which the predetermined transaction period for each receipt or payment based on a setting of date information is divided, generating the unit transaction modeling means for each computed unit transaction period on each of the receipt side and the payment side of the financial transactions, and generating a reference information group in said transaction sequence modeling means corresponding to each of the receipt side and the payment side.

9. The apparatus according to claim 1, further comprising:
user interface means for changing a parameter for financial transactions to be modeled for each unit transaction modeling means, and issuing a predetermined instruction in response to the change.

10. The apparatus according to claim 1, further comprising:
financial characteristic computation means for computing financial characteristics in each current price evaluating operation performed by said current price evaluation operation means, and providing each current price evaluation operation means with the financial characteristics.

11. The apparatus according to claim 10, wherein:
said financial characteristic computation means is a module for modeling the financial characteristics, and operating an instance of a predetermined class in an object-oriented concept; and
said current price evaluation operation means contains reference information, contained in the instance of the predetermined class, for computing the financial characteristics.

12. The apparatus according to claim 10, wherein:
said financial characteristic computation means comprises:
a plurality of single financial characteristic computation means for computing a plurality of single financial characteristics in each current price evaluating operation performed by said current price evaluation operation means;
virtual financial characteristic computation means for computing a new virtual financial characteristic by combining said plurality of single financial characteristics, and providing said virtual financial characteristic for said current price evaluation operation means.

13. The apparatus according to claim 10, wherein
said single financial characteristic computation means is a module for modeling each unit financial characteristic, and operating each instance of a plurality of predetermined classes in the object-oriented concept;
said virtual financial characteristic computation means is a module for operating an instance of a predetermined super class inherited by the plurality of predetermined classes; and
said current price evaluation operation means contains reference information, stored by the instance of the predetermined super class for computing the virtual financial characteristics.

14. The apparatus according to claim 10, wherein
said financial characteristics are data items obtained on a real time basis input through a network.

15. The apparatus according to claim 10, further comprising:
financial characteristic definition means for defining the financial characteristics.

16. A computer-readable storage medium for storing a program used and read by a computer for performing:
one or more unit transaction modeling function, implemented for one or more unit transaction period into which a predetermined transaction period for each receipt or payment on each of a receipt side and a payment side of financial transactions is divided, for performing a current price evaluating operation in the unit transaction period; and
transaction sequence modeling function for holding a reference information group for reference to said unit transaction modeling function corresponding to each of a receipt side and a payment side of the financial transactions, sequentially referring to said unit transaction modeling function in the reference information group in each of the receipt side and the payment side of the financial transactions at a predetermined instruction, performing the current price evaluation operation, obtaining operation results, and computing a characteristic of the financial transactions based on each of the operation results.

17. A financial transactions modeling apparatus for modeling a transaction sequence settled by settling financial transactions in a predetermined transaction period, comprising:
(1) unit transaction modeling means comprising:
(i) unit transaction information storage means, provided at each of a receipt side and a payment side of the financial transactions, wherein the unit transaction information storage means stores a unit transaction period into which the predetermined transaction period is divided, and wherein the unit transaction information storage means stores information about a unit transaction, and
(ii) current price evaluation operation means for evaluating a current price of the financial transactions in the unit transaction period; and
(2) transaction sequence modeling means comprising
(i) reference information storage means for memorizing a reference information group corresponding to each of the receipt side and the payment side, the reference information group being provided for referring the unit transaction modeling means, and
(ii) transaction sequence characteristic computation means for sequentially referring to the unit transaction modeling means via the reference information group, to operate the current price evaluation operation means to produce operation results, wherein the operation results are used for producing a characteristic of a transaction sequence.

18. A computer-readable storage medium for storing a program used and read by a computer for performing:
(i) a unit transaction modeling function for evaluating a current price of financial transactions in a unit transaction period, wherein a predetermined transaction period is divided into the unit transaction period, wherein the unit transaction modeling function is provided as to the unit transaction period in the predetermined transaction period, and wherein the unit transaction modeling function is provided at each of a receipt side and a payment side of the financial transactions; and (ii) a transaction sequence modeling function for calculating a characteristic of the financial transaction, wherein the transaction sequence modeling function memorizes a reference information group, which is used for reference to the unit transaction modeling function, wherein the transaction sequence modeling function sequentially refers to the reference information group at the receipt side and the payment side, and wherein the transaction sequence modeling function obtains the current price via the reference information group, which are used for calculating a characteristic of the financial transaction.

* * * * *